(12) United States Patent
Marradi et al.

(10) Patent No.: US 10,276,058 B2
(45) Date of Patent: Apr. 30, 2019

(54) MUSICAL NOTATION, SYSTEM, AND METHODS

(71) Applicant: GIOVANNI TECHNOLOGIES, INC., Las Vegas, NV (US)

(72) Inventors: Giovanni Marradi, Huntington Beach, CA (US); Thomas Cain, Laguna Beach, CA (US)

( * ) Notice: Subject to any disclaimer, the term of this patent is extended or adjusted under 35 U.S.C. 154(b) by 0 days.

(21) Appl. No.: 15/212,096

(22) Filed: Jul. 15, 2016

(65) Prior Publication Data

US 2017/0018202 A1  Jan. 19, 2017

Related U.S. Application Data

(60) Provisional application No. 62/194,089, filed on Jul. 17, 2015, provisional application No. 62/276,188, filed on Jan. 7, 2016.

(51) Int. Cl.

| | |
|---|---|
| *G09B 15/08* | (2006.01) |
| *G09B 15/02* | (2006.01) |
| *G10G 1/02* | (2006.01) |
| *G10H 1/00* | (2006.01) |
| *G10H 1/36* | (2006.01) |

(52) U.S. Cl.
CPC .......... *G09B 15/08* (2013.01); *G09B 15/023* (2013.01); *G10G 1/02* (2013.01); *G10H 1/0016* (2013.01); *G10H 1/368* (2013.01); *G10H 2210/091* (2013.01); *G10H 2220/015* (2013.01); *G10H 2220/056* (2013.01); *G10H 2220/061* (2013.01); *G10H 2220/066* (2013.01); *G10H 2220/096* (2013.01); *G10H 2220/145* (2013.01); *G10H 2220/151* (2013.01); *G10H 2240/175* (2013.01)

(58) Field of Classification Search
CPC ........ G09B 15/08; G09B 15/023; G10G 1/02; G10H 1/0016; G10H 1/368
USPC .......................................................... 84/615
See application file for complete search history.

(56) References Cited

U.S. PATENT DOCUMENTS

| | | | | |
|---|---|---|---|---|
| 4,480,521 | A * | 11/1984 | Schmoyer | G09B 15/08 84/115 |
| 5,656,789 | A * | 8/1997 | Nakada | G09B 15/003 84/477 R |
| 5,907,115 | A * | 5/1999 | Matsunaga | G09B 15/003 84/464 A |
| 6,132,281 | A * | 10/2000 | Klitsner | A63H 5/00 446/397 |
| 6,225,545 | B1 * | 5/2001 | Suzuki | G09B 15/023 84/464 R |

(Continued)

*Primary Examiner* — Elvin G Enad
*Assistant Examiner* — Christina Schreiber
(74) *Attorney, Agent, or Firm* — Mintz Levin Cohn Ferris Glovsky and Popeo, P.C.

(57) ABSTRACT

In one aspect, provided herein is a device for notating a musical composition. The device, in various implementations, is structured so as to be less laborious to notate, easier to read, and more simple to employ in notating, reading, and/or playing the music of a given composition to be composed and/or played. Accordingly, in its most basic form, the device herein disclosed includes a template, upon which template one or more symbols may be notated, where such notation is configured in a manner that more closely relates the note to be played with the mechanical action needed to be performed so as to play that note, such as on an instrument to be or being played.

5 Claims, 31 Drawing Sheets

(56) References Cited

U.S. PATENT DOCUMENTS

| | | | | |
|---|---|---|---|---|
| 7,244,885 B2* | 7/2007 | Kageyama | G10H 1/0008 | 84/601 |
| 7,608,774 B2* | 10/2009 | Ohmura | G10H 1/0016 | 84/169 |
| 7,674,964 B2* | 3/2010 | Ohmura | G10H 1/0008 | 84/464 A |
| 7,745,713 B2* | 6/2010 | Fukada | G10H 1/0008 | 84/477 R |
| 8,076,564 B2* | 12/2011 | Applewhite | G10H 1/0058 | 84/470 R |
| 8,445,767 B2* | 5/2013 | Brow | A63F 13/814 | 84/478 |
| 8,692,099 B2* | 4/2014 | Sitrick | G09B 15/002 | 84/477 R |
| 8,901,405 B1* | 12/2014 | McCarthy | G09B 15/003 | 84/423 R |
| 9,029,678 B2* | 5/2015 | Ye | G10G 1/02 | 84/478 |
| 2001/0007219 A1* | 7/2001 | Uehara | G10H 1/0008 | 84/609 |
| 2001/0039870 A1* | 11/2001 | Shimaya | G09B 7/02 | 84/478 |
| 2002/0134216 A1* | 9/2002 | Shibukawa | G09B 15/026 | 84/477 R |
| 2003/0151628 A1* | 8/2003 | Salter | G09B 5/06 | 715/773 |
| 2004/0074376 A1* | 4/2004 | Varme | G10G 1/00 | 84/483.2 |
| 2006/0243119 A1* | 11/2006 | Rubang, Jr. | G09B 15/023 | 84/609 |
| 2009/0114079 A1* | 5/2009 | Egan | G09B 15/023 | 84/477 R |
| 2010/0300265 A1* | 12/2010 | Foster | G10H 1/0016 | 84/610 |
| 2010/0307319 A1* | 12/2010 | Kani | G10G 1/02 | 84/485 R |
| 2013/0157761 A1* | 6/2013 | Cichowlas | G09B 15/003 | 463/31 |
| 2013/0233152 A1* | 9/2013 | Pillhofer | G09B 15/002 | 84/470 R |
| 2014/0047970 A1* | 2/2014 | Yoshikawa | G10H 7/00 | 84/478 |
| 2014/0260898 A1* | 9/2014 | Bales | G09B 15/026 | 84/433 |
| 2015/0000506 A1* | 1/2015 | Ye | G09B 15/023 | 84/609 |
| 2017/0018202 A1* | 1/2017 | Marradi | G09B 15/08 | |

* cited by examiner

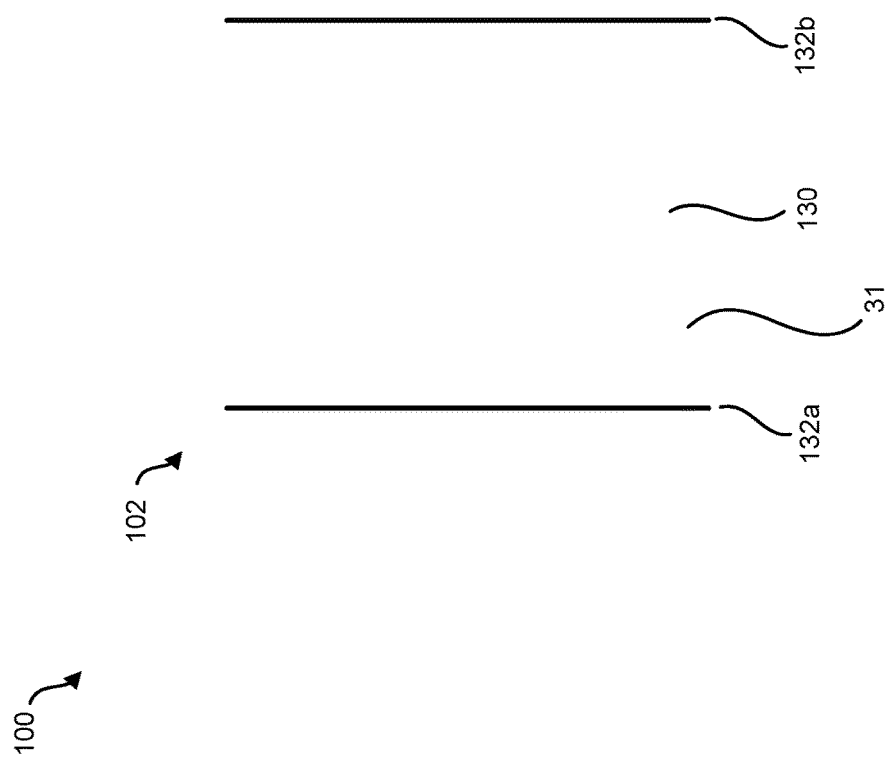

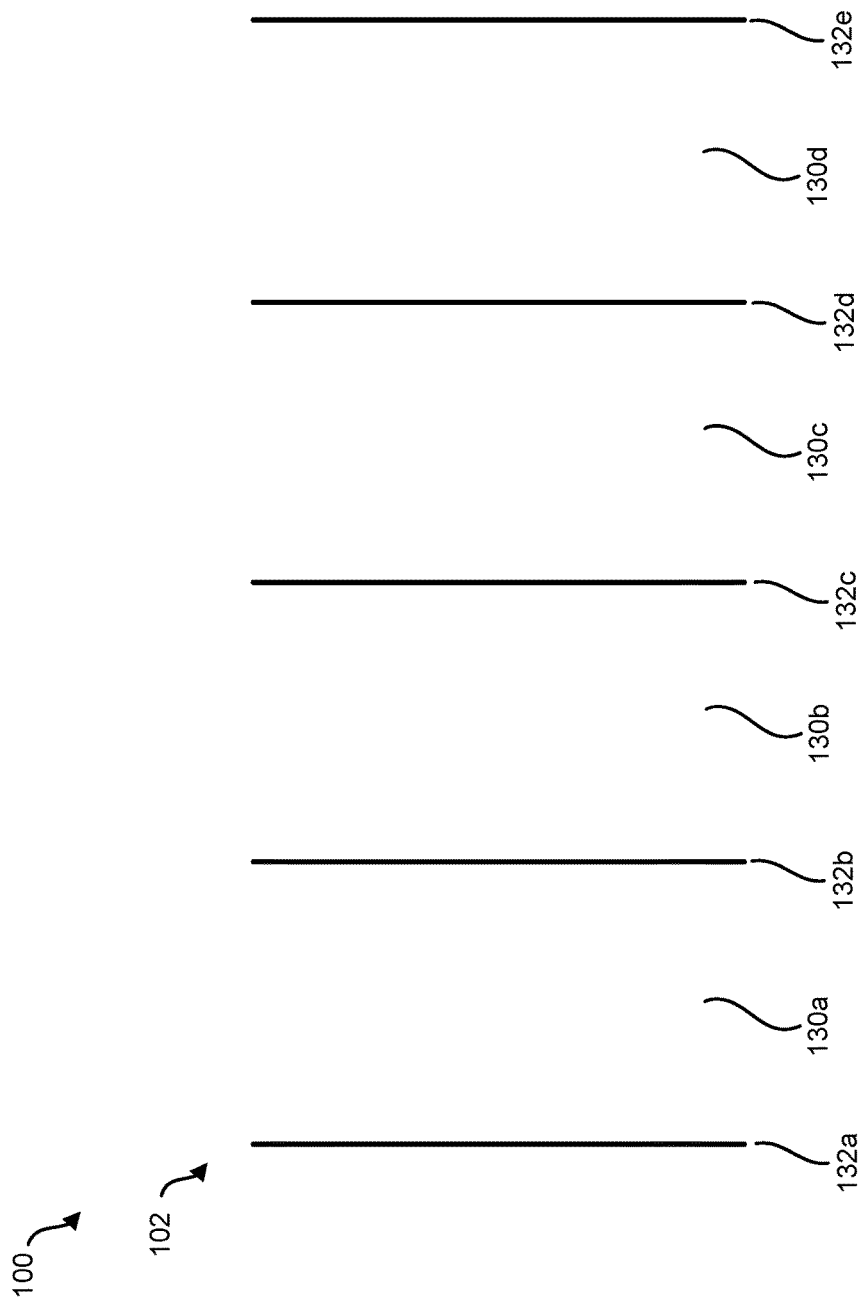

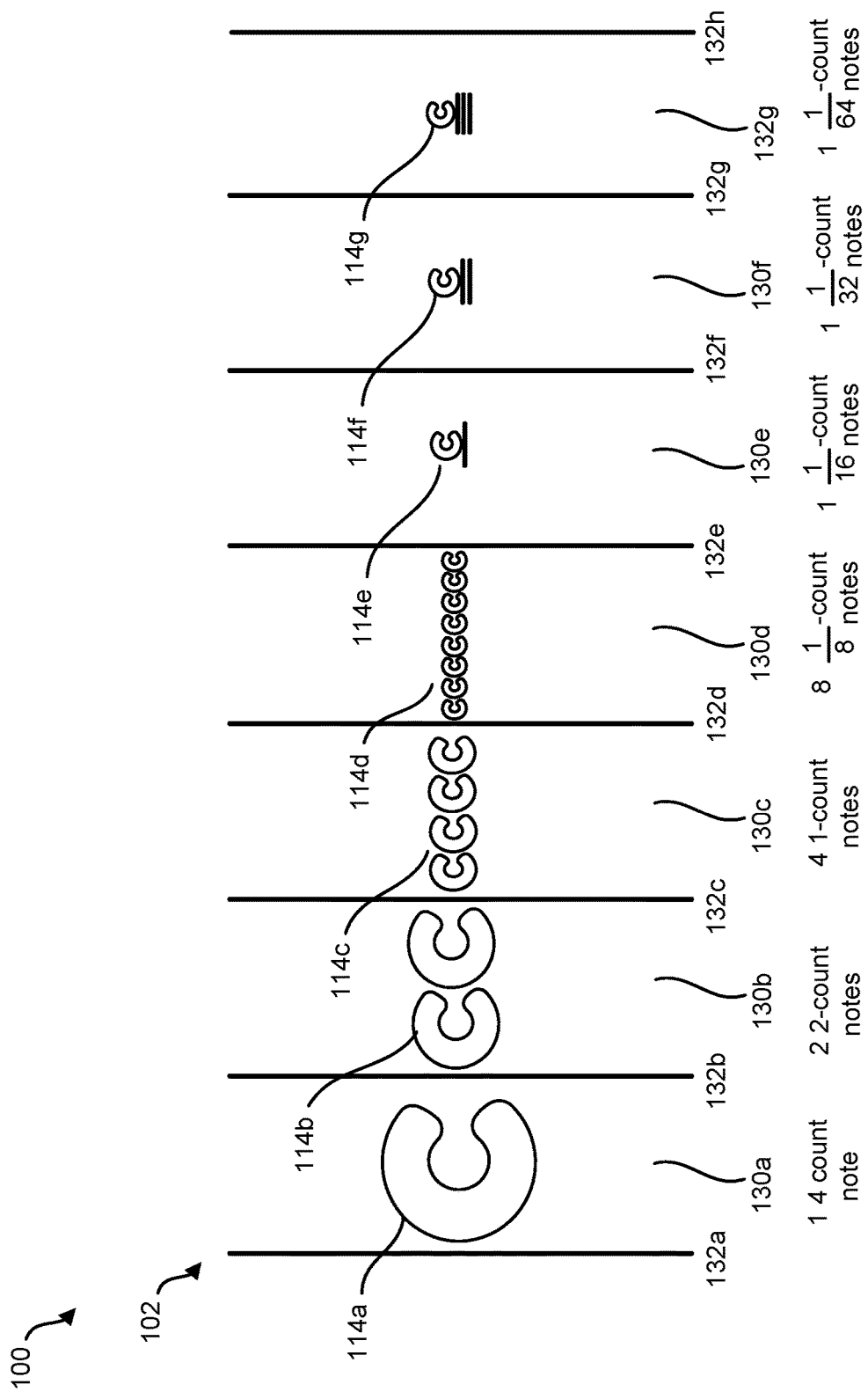

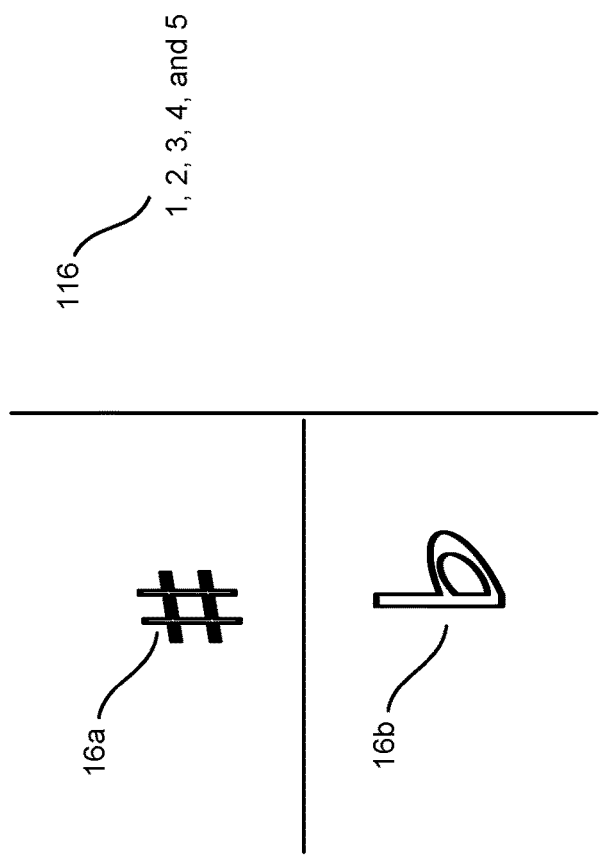

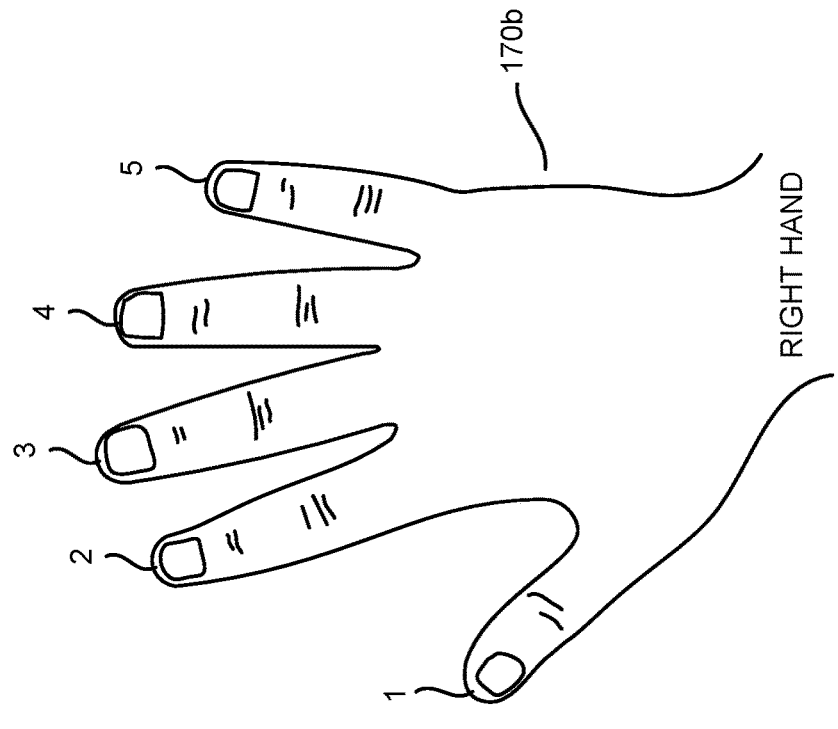
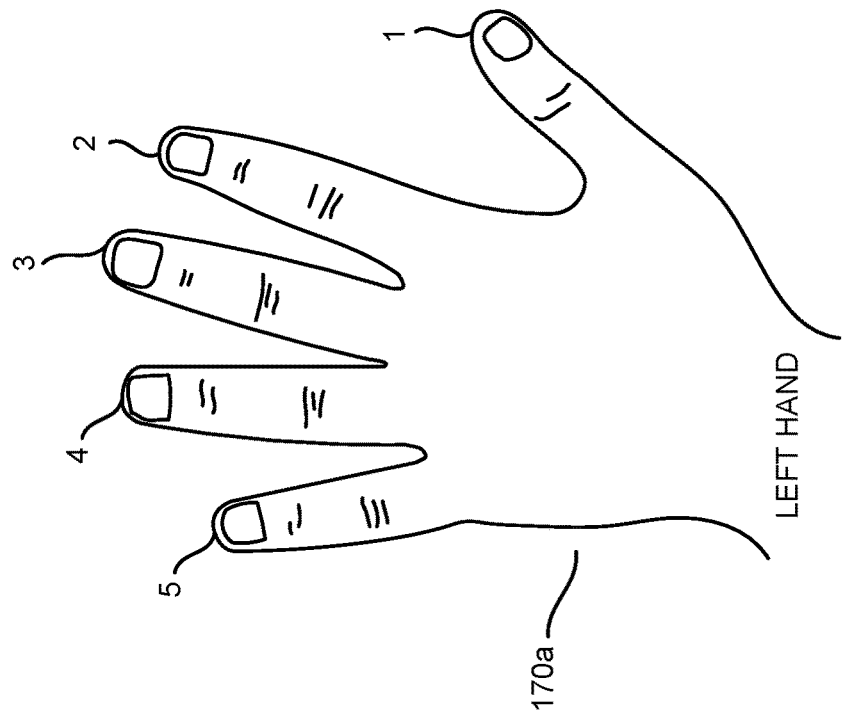
FIG. 5A

MUSICAL NOTATION, SYSTEM, AND METHODS

CROSS-REFERENCE TO RELATED APPLICATIONS

This application claims priority to U.S. Provisional Patent Application No. 62/194,089, filed on Jul. 17, 2015 and entitled "MUSICAL NOTATION, SYSTEM, AND METHODS" and U.S. Provisional Patent Application No. 62/276,188, filed on Jan. 7, 2016 and entitled "MUSICAL NOTATION, SYSTEM, AND METHODS," the disclosures of which are incorporated herein by reference in their entirety.

FIELD OF THE DISCLOSURE

A new musical notation tablature, new musical instruments, and new devices and methods for teaching and playing the same in accordance with the new musical notation are provided. Systems including one or more of the new musical notation tablature, instruments, devices, and methods are also provided.

BACKGROUND TO THE DISCLOSURE

The definition of music is manifold. In one instance, music may be defined as a compilation of concordant sounds that may be arranged in such a manner as to produce a harmonic melody to which it is pleasant to listen. Particularly, the early Pythagoreans discovered that a stringed instrument could be constructed, whereby if the strings were plucked within a given arrangement a consonant harmony would be produced, where as if they were plucked in random order, disharmony or a discordant sound would be produced. More particularly, Pythagoras discovered that if the strings of an instrument were of like composition, size, weight, and length; and if one plucked a first string, a first sound wave, having a vibration of a given frequency would be produced. Further, if the length of a second such string is halved and then plucked again, a harmony between the notes sounded by the vibration of the two strings being plucked would be produced, which harmony is generated by the frequency of the two vibrations being proportional. Through experimentation between the ratios of the number of strings on the instrument, their weights, and their lengths at the time of playing, the Pythagorean's found a mathematical relationship between string weight, length, and concordance, called the harmonic ratio, and thereby discovered the intervals of the octaves.

Specifically, an octave is a repeating scale of eight whole notes having an interval such that the note with the highest pitch in the octave of the scale has a sound wave frequency of vibration that is twice that of the note with the lowest pitch in the scale. Accordingly, music is made up of notes. Notes are sounds of a given pitch that form the octave such that when played in succession produce a concordant or harmonic scale. Hence, the pitch of a note demarcates how high or how low the note sounds, and is typically measured by the frequency of the vibrations caused by the sound waves emitted, e.g., measured in Hertz. For instance, a note that is vibrating at 256 Hz will be caused by sound waves that vibrate at 256 times a second, which for the piano will be the Middle C note.

There are seven different whole notes to a scale, going from the note with the lowest sounding pitch to the highest sounding pitch, e.g., in an ascending scale, and on the eighth note the scale repeats. Thus, concordant musical notes in a scale form the octave. In the western musical tradition, the notes in an octave, such as in a major C scale, are C, D, E, F, G, A, B, C, where a Middle $C_4$ note may have a frequency of about 260 Hz, and an upper $C_5$ note may have a frequency of about 520 Hz, and a lower $C_3$ note may have a lower frequency of about 130 Hz. Because of the acoustic relationship between two pitches of notes an octave apart, the upper note is perceived as qualitatively identical to the lower note, but at a higher pitch. Hence, the octave is the interval of seven notes between one musical pitch and another with double, going higher in the scale, or half, going downward in the scale, its frequency.

In various instances, a triad of notes, e.g., of a major C, may be played together so as to produce a stronger melodic sound, such as a chord. The typical chord includes a major root note, e.g., C, played in addition to the third and fifth notes of the octave scale, e.g., E and G. In order to be concordant, notes and chords, such as produced by the plucking of strings of various lengths and weights, must be played in such a manner to create a harmonic tempo of pitches that move up or down the scale of notes in a precise mathematical relationship to one another.

As indicated above, the notes in an octave can be arranged into an ascending or descending order of pitches so as to make up a musical scale. The steps between the pitches may be measured in tones, e.g., whole steps, and semitones, e.g., half steps. Whole steps make up the major or whole notes, while half steps make up the sharps and flats of the major notes. Particularly, in typical musical notation, a sharp means higher in pitch by a semitone (half step or half note), and a flat means lower in pitch by a semitone. A semitone, therefore, is the distance between two notes that are next to one another in pitch, and it is the smallest musical interval used in the Western musical scale; while a whole tone is the distance of two semitones, e.g., the distance between two whole notes that are separated by one other note in pitch.

This can clearly be seen with respect to the organizational lay out of a keyboard of a piano. The distance between two white keys, or notes, that are side by side may be a whole tone, if there is no black key between them, or a semitone, if there is a black key in between. Accordingly, on a piano keyboard, to go from a C to a C sharp (or D flat) is a semitone, but to go from a C to a D is a tone. An octave, therefore, may be divided into twelve semitones that are exactly equal in size. Consequently, a typical music scale will consists of the eight whole notes of the octave, as well as an additional five notes consisting of various semitones, e.g., sharps and flats.

In order for anyone to be able to play the music arranged and/or composed by another, the notes that comprise the music to be played and their order, as well as the timing for their playing, may be written down in a form called musical notation. Such notation therefore will allow any person who knows how to read such music to play the music composed by the other exactly the way it is assumed its composer meant it to be played. Hence, musical notation involves the use of symbols that stand for the various elements of the music to be played, including but not limited to: the staff, the clef, the key signature, the measure, the time signature, the tempo, and/or the like.

For instance, a stave or staff is characteristically drawn out on a page of paper as a latticework consisting of a set of parallel lines where the notes to be played are illustrated by the lines and spaces that are written down in the staff. The staff ordinarily includes five parallel horizontal lines, and the four intervening spaces between them. Each line or space in the staff corresponds to a note having a particular pitch, and thus, represents a note in the scale of an octave that is to be played. Such notes are designated on the staff by a note indicator whereby the line or space wherein the note indicator is positioned indicates which note of the scale is to be played, and which type of note indicator used indicates for how long the note is to be played. Hence, notes on a staff set forth the pitch of the music, whereby where the note indicator is positioned on the staff designates the pitch, e.g., high or low notes, to be played. Each of such notes so indicated can be applied to the piano such that each line or space represents a white key in a set of keys comprising the octave on the keyboard of the piano.

Such note indicators may be employed not only to indicate which note is to be played, e.g., pitch, but may also be used as time reference symbols so as to designate the time period during which the particular note is to be played. A whole note indicator indicates that the note is to be played for a whole length of a given time, a half-length note indicator indicates that the note is to be played for half of the time as that of a whole note indicator, a quarter-length and eighth-length indicator indicates the note is to be played for a quarter or an eighth of the time. Hence, there are four typical note indicators: a whole note, a half note, and quarter note symbol. Therefore, the pitch of composition is indicated by where the natural note is put on the staff, and where these notes are to be played as a sharp or a flat, there are sharps or flat indicators that may be notated in front of the notes.

The staff may include additional symbols, such as a clef, a break, an accidental, a key signature, a time signature, codas, and the like, which symbols dictate the pitch, rhythm, tempo, and articulation of the notes to be played in performing the musical composition. Clefs define the pitch range of the particular staff on which it is placed. Particularly, a clef is employed as a sign, e.g., a key, that is positioned at the beginning of the staff, e.g., it is usually the leftmost symbol, and makes it possible for someone playing the written music to work such as to indicate a change in register for instruments with a wide range. Because there are only five lines in an ordinary staff, the clef functions as a designator to assign individual notes to the given lines and/or spaces of the staff.

More particularly, because a typical staff is only large enough to cover one and a half octaves of music, different clefs are used for notating high and low ranges for the composition. For example, there are Treble, Alto, Tenor, and Bass clefs. The treble clef is typically called a "G clef", and is drawn by starting with a circle in the middle, then going up, round and straight down with a hook at the end. Counting from the bottom, the second line of the staff goes through the middle of the treble clef's circle. Positioned here, it assigns G above middle C to the second line from the bottom of the staff. Hence, a note on this line therefore will be a G note. Accordingly, the note in the space above the G line becomes representative of an A note, and the note on the line above the A becomes representative of a B note, etc. for all the notes in the scale. Additionally, Middle C then becomes the first ledger line below the staff.

The treble clef is traditionally used to demark the playing of notes higher than middle C, and for piano or flute music, the notes to be played by the right-hand are usually written using the treble clef. The alto clef is an example of a C clef, because the middle of the symbol that makes up the C clef, written on the third line of the staff, points to the middle C note. The tenor clef is another C clef, however, the middle C note is written on the fourth line of the staff. The bass clef is an F clef because the two dots that make up the clef are on either side of the fourth line up, which demarcates the F note below the middle C note. Typically, the bass clef is used to notate the notes to be played by the left hand in piano music. Hence, the notes to be played by a pianist's right hand may be written using the treble clef, while the music to be played by the pianist's left hand may be written using the bass clef.

In traditional tablature, a key signature is typically notated after the clef and shows the key for the piece to be played. For instance, when a music piece is played, it is typically played in a particular key, such as a key of one of the twelve tone and semitone notes. As described herein, on octave is comprised of eight natural notes, called tone notes, but may also include sharps or flats, which comprise semitones that are in a pitch between the whole notes. The key signature, therefore, shows which notes in a written composition have to regularly be changed into semitones, e.g., sharps or flats.

Hence, a key signature is a set of sharp or flat symbols placed together on the staff, next to the clef, that designates which of the demarcated notes need to be played higher or lower than their corresponding natural notes. Particularly, a sharp symbol on a line or space between the lines in the key signature raises the particular note that would otherwise be indicated by that line or space one semitone above the natural, and a flat lowers such indicated notes one semitone. For example, a sharp raises the pitch of notes on the corresponding line or space, as well as all the octaves thereof, by a semitone; and a flat lowers the pitch of notes on the corresponding line or space by a semitone and all octaves thereof, thus defining the prevailing major or minor key. On a piano such semitones are played via the black keys.

Such key signatures typically apply through to the end of the piece or up to the next key signature. Thus, a symbol in the key signature affects all of the particular set of notes designated in that octave and all remaining octaves, thereby defining the prevailing major or minor key in that piece of music. For example, a sharp on the top line of a treble staff, which would indicate that an F note is to be played, would convert that note to an F sharp, and this transition would then apply to any Fs not only on that line, but also to Fs in the bottom space of the staff, and to any other Fs in the music. Consequently, the key signature serves as the "home note" or tonic of the piece to be played, such that the piece will be built on the notes of the scale that begin with that note, and when the piece finishes it normally comes to rest on this home note.

There are two kinds of key: a major key, and a minor key. A major key is composed of seven separate notes, plus an eighth that is the same as the first but an octave higher. For instance, the simplest major scale to write, or play, e.g., on the piano, is the C major key, because it is the only major scale not to require sharps or flats, and hence can be played using only the white keys on the piano keyboard. A minor scale, on the other hand, is a scale that forms a triad and has the three following scale degrees: the tonic, the minor third above the tonic, and the perfect fifth above the tonic, which together form the minor triad. Commonly, a minor scale is a series of notes with a sad, somber character and begins on the sixth note of its relative major scale.

Further, because a scale can start on any note, and there are twelve notes within an octave, seven natural notes, or tones, and five semitone notes, there are twelve major and minor keys. For the piano these are the seven white notes and the five black notes on the keyboard. Accordingly, each major key has its own key signature, however, each minor key shares a key signature with one of the major keys.

Particularly, there are fifteen possible key signatures: up to seven sharps, up to seven flats, or no sharps or flats. There are many reasons for writing a key signature, such as saving time by avoiding the writing out of sharps or flats, and further, it helps the player to think in the key of the piece.

Typically the staff may be divided into bars. Bar lines are vertical lines that transect the horizontal lines of the staff separating it into measures. Each measure, between two sets of bars, represents a small amount of time that governs the beat or pulse of the music being played. Particularly, a beat is the fundamental unit of music, and it is used to measure the pulse and/or rhythm of the music. As such, the bars divide the piece into regular groupings of beats, and as described below, the time signature shows these groupings. Hence, each measure typically has the same number of beats in it, where the beat represents a given note to be played.

Additionally, at the beginning of the music notation there will be a time signature. Time signatures define the meter of the music to be played. Typically, a time signature indicates how many beats there are in each measure between the bar lines. Hence, as described above, music is "marked off" in uniform sections called bars or measures, and time signatures establish the number of beats in each.

The time signature is a set of two numbers represented as a fraction, one on top, e.g., the numerator, and the other one on the bottom, e.g., the denominator, and they are usually positioned immediately after where the key signature is written. The two numbers of the time signature tell a music performer how many times a given note should be played for each beat within the measure of the music. The number in the top of the time signature, e.g., the numerator, tells a player how many of a given note there are in each measure, e.g., the number of times the note must be played within a given time. This is the beat. The number in the bottom of the time signature, e.g., the denominator, tells what the count is for the note being played, e.g., what the time is within which each beat must occur, and also signifies which note gets the beat.

The number on the bottom of the time signature can be any number that follows the pattern 1, 2, 4, 8, 16, 32, etc. where each number in the pattern is two times the number that came before it. If a note is not to be played for a given beat in the measure, this may be notated by a rest, which represents a silence in the music of that measure. For example, 4/4 time means that there are four quarter notes, or notes that last one beat, in each measure. Hence, music that pulses in a repeating pattern such as 1-2-3-4-1-2-3-4 will be divided into bars with four beats-worth of music in each bar.

Along with the beats to be played, as indicated by the time signature, the tempo, e.g., the speed at which the music is to be played may also be indicated, such as noted by a word or words positioned above the staff. Additionally, at various places in the tablature dynamic marks may be notated so as to show how loud or soft the given notes are to be played. Notes which are very high or low can be put in additional lines called ledger lines, which lines may be added above or below the stave.

There are several problems with the above-described methods for notating the music to be played by a given composition. For instance, the tablature, of the prior art, is laborious to notate, difficult to read, and extremely tortuous to follow. Particularly, there is simply no relationship whatsoever between a given symbol for a note to be played, e.g., a particular pitch to be sounded, as indicated in the tablature, and what mechanical action needs to be performed so as to play that note on the instrument being played.

Further, the staff system itself is not intuitive and very tough to translate for one simply reading the music, let alone for one attempting to interpret and then play the music at real time, such as at a performance. For example, the five lines of the staff can become very dense and convoluted the more difficult the music to be played becomes. The more and mixed the notes to be played, the more varied increases or decreases in pitch, the rapidity with which the tempo is to be changed, as well as fluctuations in keys, can make the tablature practically undecipherable.

Furthermore, the clef is an archaic manner with which to represent the key notes in a scale of music to be played as the symbol itself has virtually no innate relationship to the key or pitch it indicates, and this becomes even more complicated when different clefs are used to indicate which hand plays which notes on the instrument being played in performing the music.

The key signature suffers from the same problem in that there is no indicative nature, outside of learning music theory, between how the signature is notated within the staff, and how it relates to the type of notes to be played that are part of any particular key. Additionally, when reading music it is often difficult to interpret the symbols of the particular notes demarcated, let alone having to decipher whether they are following a major or a minor progression.

For instance, because a scale can start on any note, and there are potentially seven major and five minor keys that can be played with respect to a given octave, and because each major key has its own key signature, while each minor key shares a key signature with one of the major keys, a person playing by following the tablature has not only to figure out how to manipulate his or her hands and/or body so as to be able to play the instrument, they must also be able to do so while attempting to decipher complex symbols set forth in a convoluted staff format. This makes learning to play an instrument incredibly difficult, and virtually impossible to do so while reading music. Such is attested to by considering the attrition rate of those who start learning to play an instrument, and those who actually succeed by learning to read and play the music via the tablature successfully. It has been estimated that about 95% of the people who begin to learn to play an instrument fail to do so because of the complexity involved with learning to read the tablature.

Learning to decipher, interpret, and implement the playing of music, such as by reading the tablature, is made even more difficult when having to account for the various different measures and time signatures that are dictated by the tablature. Such difficulty is not simply a technical problem inherent to learning to read music, it is also an antiquated system that stifles creativity while promoting mimicry. A student learning to play a given piece of music is required to follow the prescribed manner in which the song has been notated and set forth by the measures and given time signatures.

In such an instance, the student, if they can learn to read and interpret the music in the first place, is then locked and bound within a system that dictates the every move of the person playing the piece. Such rigid constructionism prevents the student from exploration and discovery and rather forces them into a strict mode of playing that is mere parroting without any clear hope of innovation. Even the tempo, pitch, and rhythm are dictated in a didactic manner to the student learning to play by the tablature such that it takes a herculean effort to learn to play and read music, and yet, almost everyone loves to listen to music. In fact, it is estimated that over hundreds of millions of people world-wide listen to music on personal, digital music players, and in the US the average person listens to about four hours of music everyday.

Further, as noted above, music is played on an instrument. Common instruments include those operated by pressing keys, such as a piano, those operated by plucking strings, such as a guitar, those operated by moving wind through a chamber, such as a flute, and combinations of the same. For instance, a piano is a musical instrument that includes a large soundboard of metal strings that are held taught under a given tension such that when struck a given string vibrates and thereby plays a characteristic musical note. To effectuate the striking of such strings, the piano includes a plurality of wooden hammers, e.g., one for each string, and an equal number of levers or keys that control the operation of the wooden hammers, which in turn control the striking of the strings. Particularly, the strings of the piano's soundboard are arranged into octaves that may be played by depressing the various keys of the piano, which then causes the corresponding wooden hammer to strike their respective strings, thereby causing them to vibrate at their resonant frequency producing their characteristic sounds, as noted above.

A typically piano keyboard consists of eighty-eight keys of which fifty-five are longer, white keys; and thirty-six are shorter black keys, which together form seven octaves (plus four minor notes) of twelve notes each. The white keys control the playing of the seven natural major notes of the western scale, organized from lowest to highest in pitch, including C, D, E, F, G, A, B, C, for the C major scale. The black keys control the playing of the five sharp and/or minor notes that are associated with the major scale. These twelve keys are then repeated seven times at the interval of the octave. The notes of the piano are played by depressing the keys, and silenced when the keys are released. However, the notes can be sustained, even once a given key is released, such as by depressing a sound sustaining pedal.

Like a piano, a guitar is a stringed musical instrument including a fretted fingerboard, much like the soundboard of a piano, having a resonating chamber, typically incurved sides, and anywhere from four or six to twelve or eighteen strings that are played by plucking or strumming them with the fingers or a plectrum. Frets are metal strips that are embedded along the fretboard and located at exact points that divide the string into a scale length in accordance with a specific mathematical formula. Pressing a string against a fret or fret board determines the strings' vibrating length and therefore its resultant pitch. The pitch of each consecutive fret is defined at a half-step interval on a 12 pitch scale, e.g., a chromatic scale. Standard classical guitars have 19 frets and electric guitars between 21 and 24 frets. Each set of twelve frets represents an octave, and the frets are laid out to accomplish an equal tempered division of the octave. More particularly, the twelfth fret divides the scale length exactly into two halves. Typically, a guitar has six strings that are tuned so that each string plays a different note, including E, A, D, G, B, and E.

Likewise, a flute is a reedless wind instrument made from a hollow tube that forms a cylindrical resonant cavity. A typical flute has a mouthpiece opening, e.g., an embouchure hole, which a player blows into, and further includes holes along its length that are stopped by the fingers or keys. The flute may be designed to be held vertically or horizontally in such a manner that the player's breath strikes a narrow edge of the mouthpiece opening. Accordingly, a flute produces sound from the flow of air across the various openings of the holes along its length. For instance, as a player blows in through the mouthpiece opening a stream of air is directed across one or more holes in the instrument such that a vibration of air at the hole is created, this vibration excites the air contained in the resonant chamber producing a note as the air is expelled through the opening(s). Particularly, the energy in the stream of air pushed through the flute is radiated as sound out of the end and any open holes. However, the air stream must be directed at the correct angle and velocity, or else the air in the flute will not vibrate.

The pitch of the note is produced by the opening and closing of the holes in the body of the tubular resonant chamber, which opening and closing changes the effective length of the resonator and its corresponding resonant frequency. Further, by varying the air pressure transmitted to through the mouthpiece opening by the player, the pitch of a note can also be changed by causing the air in the flute to resonate at a harmonic rather than the fundamental frequency such as without opening or closing any holes. Hence, the distance between the mouthpiece hole and the first finger-hole is selected such that as air is passed through the finger-hole, a given note of the scale, e.g., an A or a G, is sounded. Typically, for a tube of a given length, open at both ends, the wavelength of the sound is twice the length of the tube, and hence, the finger-holes along its length will be determined mathematically such that each hole produces a note in the Western major scale depending on the fingering pattern of which holes are open, which are closed, and which are semi-open at a given time.

For example, many modern flutes feature keys and levers that open and close the finger-holes of the flute and thereby work together to create different musical notes. Typically, both hands are used to finger the keys and create the different notes. Particularly, the left hand index finger key produces a C note, the middle finger key produces an A note, the ring finger key produces a G note, and the pinky key produces a G sharp key. The right hand index finger key produces an F note, the middle finger key produces an E note, and the ring finger key produces a D note. The right hand may also have trill keys: B flat, C sharp, D and D sharp. The pinky keys in the right hand can be the E flat, low C sharp, low C, low B and high C facilitator key.

Accordingly, instruments are useful for the playing of music. In particular, various parts of the instrument including keys and/or strings thereof need to be manipulated in various manners so as to play or otherwise produce music. However, knowing when and how to manipulate such keys and/or strings in the playing of notated music is very difficult. Particularly, it is hard to know which key or string to manipulate to produce a given note, how long to press it, and with what amount of force. Additionally, such playing is made even more complicated when one must read and translate the instructions by having to interpret the archaic tablature in which it is encoded. For these and other reasons over ninety-five (95%) of the people who start to learn to play an instrument give it up not having reached their desired goals for wanting to learn to play in the first place.

What is needed, therefore, is a new way to memorialize a given piece of music that has been, or is to be, composed that does away with the archaic staff system and complex musical notation currently deployed by tablature today. A new system that makes writing a composition less laborious, easier to decipher, and is more intuitive in that the symbols employed are more closely related to the instrument to be played, would be very useful in helping the ninety-five percent of the people who try but fail to learn to read tablature actually be capable of not only learning to read the music but play it as well. Additionally what are further needed are devices that make playing an instrument easier and/or better ties the musical notation to the correct manipulations of the instrument required to play the notes notated in the music. Accordingly, the musical notation, devices, instruments, and systems described herein, as well as their methods of use meet these and other such needs.

SUMMARY OF THE DISCLOSURE

In one aspect, provided herein is a device for notating a musical composition. The device, in various implementations, is structured so as to be less laborious to notate, easier to read, and more simple to employ in arranging, reading, and/or playing the music of a given composition to be composed and/or played. Accordingly, in its most basic form, the device herein disclosed includes a substrate having a template thereon, within and/or upon which template one or more symbols may be notated, where such notation is produced in a manner that more closely relates the note to be played with the pitch to be sounded and/or the mechanical action needed to be performed so as to play that note and/or sound that pitch, such as on an instrument to be or being played.

For instance, in various instances, the template employed and symbols used so as to be notated are not the traditional symbols typically engaged when composing, reading, and/or playing music. Particularly, the musical notation devices, systems, and their methods of use, as herein provided, do not involve or otherwise include the traditional musical notation symbols of the ordinary staff, the clef, the key and time signature, and/or rests, and the like, although in some instances these may be employed if desired. Rather, in the devices, systems, and methods disclosed herein, such traditional symbols are replaced with easier to use and more intuitive symbols and/or colors and/or sizes for representing the notes, counts, measures, tempo, pitch, and/or rhythm of the music to be composed, read, and/or played. More particularly, the symbols herein employed may be represented by simple lines, letters, and/or colors of a wide variety of shapes, sizes, and/or colors, such as those that are more easily relatable to the notes to be played and the pitches to be sounded over a given period of time during which the playing is to occur. In various instances, images or other associated avatars, such as cartoons representing the notes to be played can be used to demarcate the pitches to be sounded.

For example, the devices, systems, and methods disclosed herein for notating, composing, arranging, reading, and/or playing music may include a substrate upon which a template may be positioned. The template may be configured for receiving the musical symbols and/or images representing the same, which may be employed herein as one or more compositional and/or note designators. Accordingly, in various embodiments, a first set of symbols to be employed, such as to denote the measure of the music, may include a one or more, such as a plurality of bar lines, which bar lines may be represented by a plurality of lines separated from one another by a length of space. In such an instance, the length of the space between the parallel lines may demarcate the measure for the composition to be played. In various instances, a plurality of pairs of bar lines may be included within the bounds of the template where each pair of bar lines demarcates a plurality of measures, and in various instances, each of the bar lines and/or the length of spaces there between may be equidistant.

In particular, the substrate may be any medium capable of demarcating the musical symbols, e.g., the bar lines and note designators, as herein described. For instance, the substrate may be metal or a metal composite, wood or a wood byproduct, glass or a glass compound, a chemical composition, or a mixture of the same, such as paper, cardboard, fiberglass, PLEXIGLAS, a chalkboard, whiteboard, a plastic or rubberized sheet, a TV screen, a computer monitor, or other display screen, such as that of a mobile computing device, laptop computer, tablet, mini-computing device, and the like. Likewise, the music and note designators may be composed of metal or a metal composite, wood or a wood byproduct, glass or a glass compound, a chemical composition, or a mixture of the same, such as an ink or graphite or chalk-like composition, or may be represented graphically, such as via computer coding as herein described.

In such instances, the substrate may have a length and a width and/or thickness, such as to be present in three-dimensional space or to be at least represented in three dimensional space; and in some instances, the substrate may simply include a length or a width, such as when represented in two-dimensional space, such as when represented as one or more figures on a computer generated media. Particularly, in various instances, the substrate may have a proximate portion, bounded by a top edge, a distal portion bounded by a distal edge, as well as a plurality of side portions having a left-side edge and a right-side edge. In certain instances, the substrate may have a first, front surface and a second, back surface.

As indicated, a template may be generated and/or positioned on or otherwise represented within the substrate. The template may include a plurality of pairs of bar lines such as positioned horizontally, running from left to right across the template. In other instances, the template may include a plurality of pairs of bar lines such as positioned vertically, running from top to bottom along the template. In various instances, the template may be configured such that the bar lines and/or the note designators there between may be configured to move across and/or down the template. In certain instances, a template may not need to be employed, rather, the substrate may perform the function of the template.

Particularly, in various instances, one or more additional symbols and/or images, e.g., note designators, may be employed so as to designate which pitches are to be sounded and/or notes are to be played on an instrument within a given measure, such as within a pair of demarcated bar lines of a template. In some instances, the number of symbols between the bar lines, e.g., bar ends, may be equivalent to the number of beats that correspond to a count for the musical composition to be played, e.g., where each count may be a standard measure of time. In some instances, the number of symbols between the bar ends may be less than the number of beats that correspond to the count for the musical composition to be played, and hence one or more counts may be demarcated as a silence for one or more standard measures of time. Accordingly, in such an instance, the symbol for a note designator and/or a silence may be positioned on the template and/or substrate between the plurality of bar lines, such as where the note designator may be used to represent one or more of a pitch of a note within one of a set of octaves or a silence, e.g., a rest, where each octave includes a number of pitches of notes.

In such an instance, therefore, the note designator may be employed for designating the pitch of a note to be played, or a silence in an absence of a note to be played. In various instances, the note designator may have a relative size, a color, and/or optionally a number associated with the note designator, such as where the size of the note designator may define or otherwise determine one or more of the following:

the relative length of time, e.g., how many beats, during which the pitch of the note is to be played and/or the time signature for the pitch to be played. Additionally, the color of the note designator may define or otherwise determine to which set of octaves the note designator belongs. And the number, where included, may define or otherwise determine with which finger a corresponding note on an instrument is to be played.

More particularly, in various instances, the note designator may include a letter and/or a number. In such an instance, the letter may be any letter, but in various instances, the letter may be selected from a group representative of Western music denotation, such as an A, B, C, D, E, F, and G, or a foreign language translation of such letters, for instance, where the letter represents a corresponding musical note having the designated pitch. In some instances, the pitch of the musical note may be a natural tone or a semitone, e.g., a sharp or a flat, vibrating at a particular frequency. In such an instance, the number may be any number, but in various instances, the number may be selected from a group representative of Arabic numerals, such as a 1, 2, 3, 4, and 5. In some instances, the note designator may be an image, such as an avatar or a cartoon representative of the letter or the number, such as where the name or designation of the image begins with one of the letters A, B, C, D, E, F, and G, and/or a derivation of a number.

In various embodiments, the relative size of the note designator may define and/or otherwise determine the length of relative time during which the note is to be played and/or the pitch is to be sounded and/or a silence maintained. In various instances, a plurality of note designators may be included, such as within a measure, wherein the number of note designators defines and/or determines which notes and/or pitches get the beat and when. For instance, in one particular embodiment, the relative size of the note designator determines the time signature for the note to be played, such as where the time signature for the note to be played represents the number of times and/or beats and/or counts during which the corresponding pitch is to be sounded during the measure, and/or which notes gets the beat or a silence and when.

In some embodiments, the relative size of the note designator includes a size range ranging from a large or largest size to a small or smallest size, such as where the larger the size the longer the duration of time the note is to be played or a silence maintained, and likewise the smaller the size the shorter duration of time the note is to be played or the silence maintained. Hence, the size range includes a size selected from one or more of the following: largest size, larger size, large size, medium size, small size, smaller size, and smallest size, and the like. Accordingly, in some particular embodiments, the relative size of the note designator represents the time signature, which time signature may be representative of a member selected from the group consisting of a whole note, a half note, a quarter note, an eighth note, a sixteenth note, a thirty-second note, a sixty-fourth note, and/or the like. Specifically, in some particular embodiments, the largest size of the note designator comprises a whole note, the larger size of the note designator comprises a half note, the large size of the note designator comprises a quarter note, the medium size of the note designator comprises an eighth note, the small size of the note designator comprises a sixteenth note, the smaller size of the note designator comprises a thirty-second note, and the smallest size of the note designator comprises a sixty-fourth note.

Hence, in various embodiments, a substrate is provided, wherein the substrate may be any body upon which one or more markings composed of the one or more symbols disclosed herein may be set forth. In particular, the substrate may have an elongated body having a proximal portion including a proximal end, a distal portion including a distal end, and a medial portion separating the proximal portion from the distal portion, wherein the substrate includes a template upon which the music to be composed, read, and/or played may be notated. In various instances, the symbols may be composed of one or more markings that characterize the music of the composition to be notated. For instance, the template may include a plurality of bar lines such as a first bar line and a second bar line, where the first bar line is positioned on the left hand side and/or the proximal portion of the template and functions as an indicator indicating where the musical composition begins, and the second bar line is positioned in a rightward and/or downward direction to the first bar line. Further, in certain instances, additional symbols may be positioned to the right and/or left hand side of the first bar line, or upwards or downwards therefrom, such as where those symbols on the right hand side or downwards of the first bar line indicate which notes and in which order those notes are to be played or silences maintained and for how long, and the additional symbol(s) on the left hand side or upward side indicate which hand the notes of a given measure are to be played with.

More particularly, in various instances, the symbols characterizing the music of the composition to be notated, e.g., on the right hand or downward side of the bar end, may include note designators, such as letters representing the individual musical notes of a scale within a measure, where each musical note corresponds to a musical pitch to be played on an instrument, or a silence in the absence of a note to be played within the measure. In such an instance, the symbols, e.g., letters, numbers, or images, may have a size, where the size of the letter et al. corresponds to a length of time during which the musical pitch is to be played or the silence maintained. In such an instance, the size and/or number of note designators and/or a movement thereof, between any given pair of bar lines, indicates how many beats there are for that given measure, and which notes get the beat. Further, the symbol on the left hand or upward side of the bar end may be an image of a right or left hand, which may include an image of one or more fingers. In such instances, the image of the right or left hand indicates with which hand the note is to be played, and the image of each finger may include a finger number, such as where the number determines with which finger a corresponding note on an instrument is to be played. And in certain instances, the note designator may include a number, and the designator number may correspond to the finger number.

Additionally, as indicated above, in order to produce such music, one or more keys and/or strings of an instrument need to be manipulated in a designated way, such as notated in the tablature, as described above. Particularly, there are two major types of musical instruments: acoustic and electric. Acoustic instruments are those that are configured for producing tones in the harmonic range of a scale, such as by the vibrations of plucked strings or the air passing through a tube of varying lengths. Electrical instruments, on the other hand, produce sounds indicative of the natural pitches through an electronic sound generating and/or amplification device that electronically mimics the frequencies of the same pitches produced by the acoustic instruments. Particularly, where acoustic instruments produce notes naturally through the vibrations caused by mechanical motions, such as a string vibrating according to a particular frequency, electrical instruments generate sounds electronically through impulses and/or digital representations that produce tones that correspond to the natural pitches of the scale. However, in either case, various keys and/or strings need to be manipulated in a specific order so as to play the instrument in a manner coincident with the notated music.

Hence, in one aspect, presented herein, are instruments, such as acoustic and/or electric instruments that have been adapted so as to indicate which key and/or string needs to be manipulated and in what order and/or with what amount of pressure so as to produce a given note or series of notes, such as notes notated within the tablature set forth herein. Particularly, acoustic instruments, such as the piano or guitar, produce vibrations when mechanical implements, such as hammers or the fingers of the hand, impact or pluck particular strings of varying weights and/or lengths in particular manners. More particularly, presented herein are stringed instruments, such as pianos and guitars, that have been configured in such a manner so as to indicate which key or string at a given location of the instrument needs to be manipulated and in what way so to produce a given series of notes so as to play a given notated composition in a manner coincident with the manner in which the composition was notated.

This applies equally to the electronic instruments that generate electronic sounds in response to mechanical motions. For instance, in such instances, the keys to be depressed and/or the strings plucked so as to generate the digital signals that correspond to the natural pitch sounds that are produced by the playing of the corresponding acoustic instruments may also be configured so as to indicate which key and/or string is to be manipulated, when, for how long, and in what intensity so as to play the composed composition in the manner in which it was composed. This applies for other such stringed instruments as well such as the hammered dulcimer, bass guitar, the violin, the cello, and the like.

Likewise, for wind instruments, such as the flute, the trumpet, and the like, vibrations are caused by wind passing through a tubular element having various openings along its length through which blown air may pass. Such openings may be closed by various mechanical implements, such as keys and/or the fingers of the hand, such that the length of the tubular element may be varied, such as by the pressing of keys that open up or close the holes through which the air passes in a manner so as to cause vibrations and consequently tones corresponding to the pitches of a musical scale to be sounded. Accordingly, presented herein are wind instruments, such as flutes and trumpets, that have been configured in such a manner so as to indicate which key or hole at a given location of the instrument needs to be manipulated and in what way so to produce a given series of notes so as to play a given notated composition in a manner coincident with the manner in which the composition is notated. This applies for other such wind instruments as well such as the saxophone, the trumpet, the clarinet, the bassoon, and the like.

More particularly, provided herein are systems including musical notations, musical notation display devices, and musical instruments that are communicably and/or electronically connected in such a manner to make the playing of the musical instrument in a manner that corresponds to the notated music easier, more natural, and accurate. Particularly, the musical notation, as herein disclosed, is configured in such a manner that when a given note that is to be sounded when playing a given notated piece of music is indicated, e.g., electronically, the corresponding key, string, and/or opening to be manipulated on the instrument so as to sound that particular note, is also indicated. The duration during which the note is to be played, as well as with what intensity, and where on the instrument the given key, string, or hole is may also be indicated in one or more manners. Accordingly, once a musical composition has been notated, such as set forth herein, in order to play the music of the piece on an instrument, the notated composition may be indicated on the instrument for the player, who then performs the mechanical actions indicated so as to manipulate the instrument and its component parts so as to produce the musical pitches in the manner that the sounds so generated correspond to the musical notes notated in the composition.

BRIEF DESCRIPTION OF THE FIGURES

FIG. 2A is an example of a substrate containing a template of the present disclosure for use in notating, composing, arranging, and/or playing music and/or the like.

FIG. 2B is another example of a substrate containing a template of the disclosure, where the template includes a plurality of symbols, such as bar lines, indicating a plurality of measures within which music to be composed may be notated, and once notated may be composed, arranged, and/or played.

FIG. 3A is a table which in the left-hand column sets forth a typical note as used in the tablature of prior art so as to designate a pitch to be sounded in a musical composition, and in the right-hand column is set forth a representative note indicator as employed within the present devices, systems, and methods for notating, composing, arranging, and/or playing music and/or the like.

FIG. 3B is another example of a substrate containing a template of the disclosure, where the template includes a plurality of symbols indicating notes of a given pitch within an octave to be played, such as in a musical composition, where the size of the note designator indicates the length of time of the measure during which the note is to be played and/or the number of note designators indicate how many times and for how long the note is to be played, such as for how many beats during the measure a note is to be played.

FIG. 3D is a table which in the left-hand column sets forth a sharp or a flat indicator as used by the prior art to notate the shift of a pitch of a note to be played by one semitone upwards, in the case of a sharp, or downwards, in the case of a flat, and in the right-hand column sets forth a number, e.g., from 1 to 5, wherein the number indicates a semitone note to be played within a musical composition.

FIG. 5A is a representation of a Left-hand symbol, and a Right-hand symbol, which may be employed within the devices, systems, and methods herein disclosed, so as to represent with which hand a given note or set of notes is to be played.

DETAILED DESCRIPTION OF THE DISCLOSURE

Figure 1:
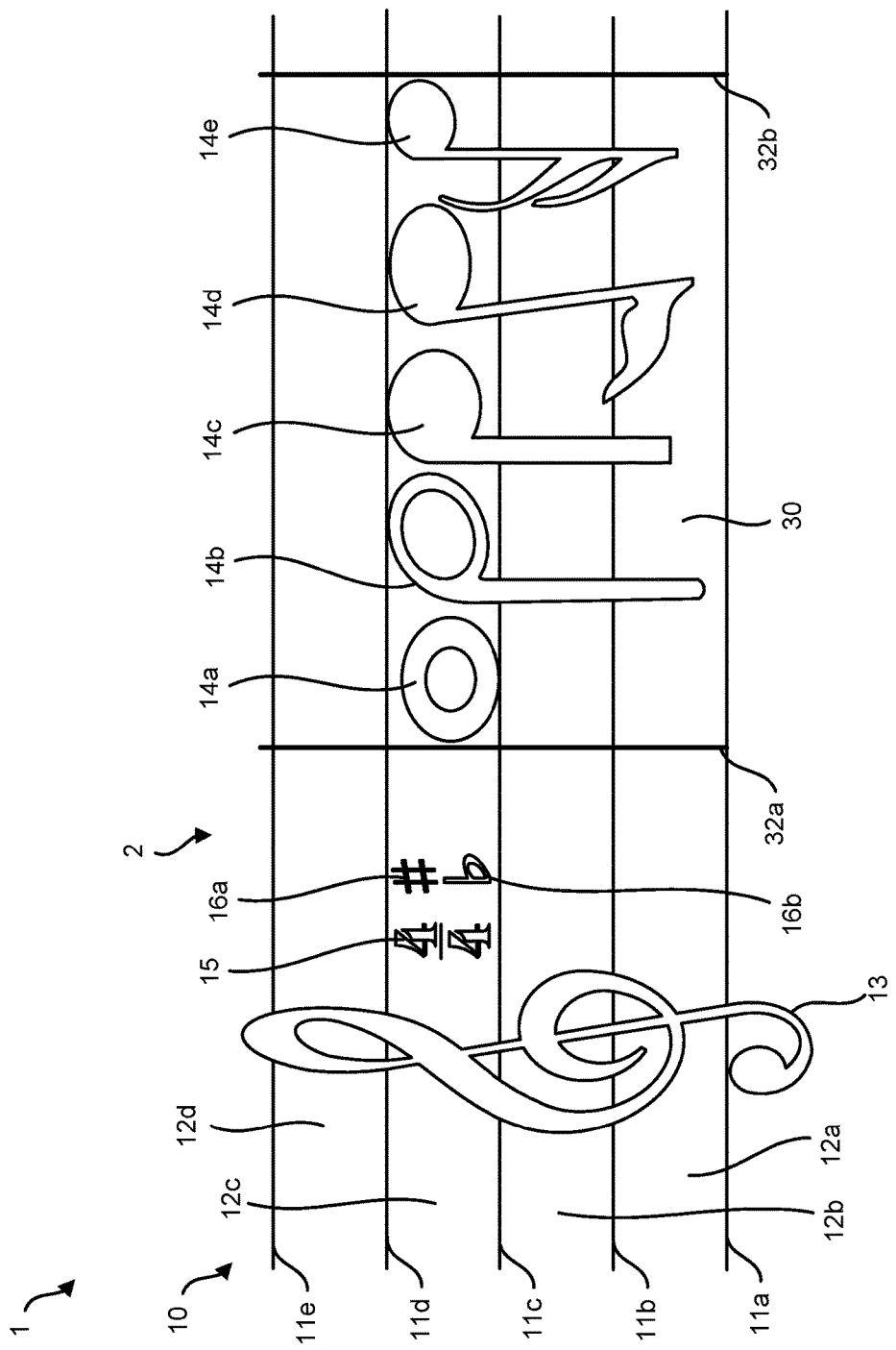
FIG. 1 is an example of a typical tablature and symbols used therein for demarcating music as known in the prior art.

As summarized above, music is made up of sounds that result from vibrations such as is caused by strings being plucked or air passing through orifices of variable lengths. Based on the frequency of vibrations and the characteristics of the strings and/or openings, the sounds may be grouped into harmonic pitches that form octaves of notes. The notes in the octave form a scale where each successive note rises in pitch. Additionally, the octaves themselves can be grouped together to form repeating scales that moves from octaves containing pitches of low frequency, such as comprised of base notes, at the lower end of the overall scale, to octaves containing pitches of higher frequency, such as comprised of alto notes, at the higher end of the overall scale. In such an instance, the overall scale may include a repeating set of octaves, where each octave begins at a first note and includes seven notes of differing pitches as well as an eighth note that is the same as the first note, but vibrates at an octave higher than the first note. Hence, the last note in one group of octaves is the first note in a succeeding octave of higher pitches.

There are, therefore, seven concordant pitches in an octave that forms a scale, where the pitches are arranged from lowest to highest sounding notes, and on the eighth note the scale repeats, e.g., because of the acoustic relationship between two notes an octave apart, the upper note is perceived as qualitatively identical to the lower note, but at a higher pitch. In order to be concordant, notes and chords, such as produced by the plucking of strings or the passage of air through openings of various lengths, must be played in such a manner to create a harmonic tempo of pitches that move up or down the scale of notes in a precise mathematical relationship to one another.

Classically, these notes are designated with letters from the Phoenician alphabet including, for example, C, D, E, F, G, A, B, C'. However, when reproduced in written form, such as when employed in the composing of a musical composition, these notes are designated with alternative symbols that are written in a graph-like structure called a staff. Musical notation, therefore, involves the use of symbols that stand for the various pitches of the notes that form the musical composition that are to be played by a musical instrument. The notated composition may further include various other elements that demarcate the technical features of the arrangement to be played including but not limited to: the staff, the clef, the key signature, the measure, the time signature, the tempo, and/or the like. Accordingly, musical notation involves the use of symbols that stand for the various elements of the music to be played. A typical staff of the prior art as used for the composing and playing of music is set forth in FIG. 1.

Particularly, as set forth above, in order to be able to play composed music, the notes to be played comprising that music and their order, as well as the timing involved with respect to the sounding of those designated notes, often times need to be written down as musical notation. Such notation is typically referred to as tablature 2. It is this notation that allows any person who knows how to read such musical notation to play the music composed exactly the way its composer meant it to be played. Such notation, therefore, is useful in effectuating the transmission of music from one person to another, from one generation to the other, over time. This usefulness, however, comes at a very expensive price, that of creativity and innovation.

More particularly, the music tablature 2 as set forth below, with respect to FIG. 1, stifles innovation in that rather than promoting the creativity of the persons reading and playing the music by encouraging them to play notes outside the notated lines, such as by adding embellishments as desired within the structure of the music, the tablature 2 dictates the controlled parroting of the notes requiring them to be played precisely in the order and as exactly notated within the archaic tablature. In such a framework as this, musical competency is reckoned not based on ones creative abilities, but on how well they play any given piece in its exact detail as originally composed. However, such was not the original intent of the great composers of the past, and is what the present devices, systems, and methods are configured for redressing.

This is important because the tablature 102 of the present disclosure embodies a more accurate representation of how the original composed music was intended to be played and to be transmitted down through the ages. More particularly, as initially composed, the notated music, typically intended to be played by the right hand, included a melody line to be followed rather precisely, with allowances for slight variations, but it also included a secondary source of notation, typically to be played by the left hand, which notation encapsulated various embellishments of the melody line that was intended to be more of a suggestion than a requirement to be performed accurately. Hence, the original notation, especially with respect to the playing with the left hand, was meant more as a guideline giving directions so as to arrive at an ultimate destination through many various possible pathways, and was not meant to be a strict set of instructions that had to be followed specifically. However, this was not the way musical notation developed over time.

As can be seen with respect to FIG. 1A, musical notation 1 involves the use of symbols that stand for the various elements of the music to be played, including but not limited to: the staff 10, the measure 30, the time signature 15, the clef 13, the key signature 16, the tempo, and/or the like. Such musical notation is set forth in written form as tablature 2. For instance, the basic component of tablature 2 is the stave or staff 10. The staff 10 is a latticework consisting of a set of parallel lines where the natural tones or notes to be played are illustrated by the lines 11 and spaces 12 that are written down as the framework that makes up the staff 10. Particularly, the music to be played contains two basic qualities that typically include: the sounding of a note 14 of a particular pitch, and a time period 15 during witch that note is to be sounded. The tablature 2, therefore, must account for these two characteristics. Specifically, the tablature 2 must indicate not only which note 14 is to be played, but must also indicate the time period 15 during which that note is to be played.

To accomplish this, therefore, the typical staff 10, such as presented in FIG. 1, ordinarily includes five parallel horizontal lines, e.g., 11a, 11b, 11c, 11d, and 11e, as well as the four intervening spaces, e.g., 12a, 12b, 12c, and 12d, between the five lines 11. Each line and each space within the staff 10 represents the character of a note having a particular pitch that must be played. Particularly, each line 11 or space 12 in the staff 10 corresponds to a note 14 having a particular pitch, and thus, represents a natural note, e.g., C, D, E, F, G, A, B, C', in the scale of an octave that is to be played. For instance, to indicate which of the possible natural notes is to be played, a symbol, such as a note indicator 14, may be positioned on one of the lines 11 or spaces 12 of the staff 10, and may thereby be employed to demarcate which natural tone the particular compositional piece indicates should be played at any particular time.

Additionally, the staff 10 may be segmented into a plurality of time periods called measures 30, where each measure 30 is demarcated by the space between two bar ends 32. Bar ends or lines 32 are vertical lines that transect the horizontal lines 11 of the staff 10 separating it into its various measures or bars 30. As such, the bars 30 divide the musical piece into regular groupings of time periods containing beats. A measure 30, therefore, represents a period of time that corresponds to a specific number of beats or intervals during which a note 14 may be played or a silence observed.

Each particular note indicator 14, therefore, may be employed not only to indicate which natural note of a scale of pitches is to be played, e.g., which pitch is to be sounded, but may also be used as a time reference symbol so as to designate the time period within the measure 30 during which that particular note 14 is to be sounded. Accordingly, it is not just where the note indicator 14 is positioned within the staff 10, but also the type of note indicator 14 is also important. Particularly, the type of note indicator employed 14 within the measure 30 is also important for indicating how many counts of time during which that note is to be played within the measure. A time signature 15 is also used so as to indicate which count gets the beat.

For example, a time signature 15 may be used to set forth the rhythm of the music. Typically, a time signature is a set of two numbers represented as a fraction and set forth in the tablature 2. The two numbers of the time signature 15 tell a music performer how many times a given note 14 should be played for each measure 30 of the music. For instance, as set forth in FIG. 1, the time signature is represented as a 4 over another 4. In such an instance, the number in the top of the time signature 15 tells the player how many of a given note there are in each measure 30, e.g., the number of times a note 14 may be played within a given time period, e.g., the beat. The number in the bottom of the time signature 15 indicates what the count is for the note 14 actually being played, e.g., what the time is within which each beat must occur, and also signifies which note gets the beat.

Particularly, a note indicator 14 is positioned within the staff 10 on a line 11 or a space 12 thereof so as to indicate which natural pitch is to be sounded, e.g., C, D, E, F, G, A, B, or C', and the type of note indicator 14 employed indicates for how long during the time span within the measure 30 that note is to be played. Accordingly, a whole note indicator 14a indicates that the natural note is to be played for a whole length of a given time, e.g., during the whole measure 30. A half-length note indicator 14b indicates that the natural note is to be played for half of the time as that of a whole note indicator, e.g., half the length of time of the measure 30. Likewise, a quarter-length 14c, an eighth-length 14d, and a sixteenth-length 14e note indicator indicates the respective notes are to be played for a quarter or an eighth or a sixteenth length of time of the measure. Hence, there are five typical note indicators 14: a whole note 14a, a half note 14b, quarter note 14c, an eighth note 14d, and a sixteenth note 14e symbol, where the type of note indicator 14 indicates the length of time during which the note is to be played, and where the note indicator 14 is positioned on the staff 10, e.g., upon which line 11 or which space 12, indicates which natural note, e.g., C, D, E, F, G, A, B, or C' is to be sounded. Keeping in mind, however, that what notes the individual lines 11 and spaces 12 represent depends on which clef 13 is employed so as to give the staff 10 its particular identity.

The staff 10 therefore sets forth the basic foundation upon which the music of a composition is to be notated, wherein where particular note indicators 14 are positioned on the staff 10 designates the pitch, e.g., high or low notes, of the music to be played. Further, the staff 10 may be broken down into given time periods called measures 30, which measures 30 may be used to set forth the timing of the music to be played. For instance, measures 30, consisting of a set of vertical lines 32 separated from one another by a space, make up the basic unit of time for the playing of the musical composition, where each beat is represented by a particular time at which a note is to be played or a rest observed. Typically, each measure 30 has the same number of beats in it, and the time signature 15 is included within the staff 10 to show both the number of beats within the measure 30, and upon which beat a note is to be played or a silence observed.

As noted above, the staff 10 may include additional symbols, such as a clef 13, key signatures, e.g., sharp 16a or flat 16b indicators, as well as breaks, accidentals, codas (all of which are not shown), and the like. These symbols, along with those described above, dictate the pitch, rhythm, tempo, and articulation of the notes to be played in performing the musical composition. Particularly, the staff 10 typically includes a clef 13 that defines the pitch range of the particular staff in which it is placed. Because there are only five lines in an ordinary staff, the clef 13, therefore, functions as a designator to assign individual notes to the given lines 11 and/or spaces 12 of the staff 10. In such a manner as this, the particular line 11 and space 12 of the staff 10 can be used to demarcate a variety of different particular notes within a range of different scales, dependent upon which clef 13 is used to gives those lines 11 and spaces 12 identity, such as by assigning a particular note in the scale to a particular line 11 or space 12.

Further, there are twelve pitches within an octave of notes, which pitches may include tones and semi-tones, such as where the semi-tones comprise a sharp 16a or a flat 16b of the tonal notes 14. Hence, the 12 pitches within an octave may be represented as follows: A, A#, B, C, C#, D, D#, E, F, F#, G, and G#. However, certain of the tones and semi-tones when played in combination sound harmonic, and others when played together sound disharmonic. Typically, the harmonic notes can be played together in a trio of notes termed chords, and dependent upon which tones and/or semi-tones are included in the chord arrangement, the chords may be classified as either major or minor chords.

For instance, a musical composition is typically played in a particular key 16, where a particular note or chord to be played anchors the entire piece. In such instances, the other notes and/or chords when played in sequence, in addition to the anchor, often create a subjective sense of tension within the composition, where as the key notes and/or chords create a sense of calm or rest within the piece. Particularly, a major chord or a minor chord may be used as an anchor for the composition, but with differing results, such that pieces centered on major chords are often experienced as sounding relatively happy, and pieces centered on minor chords are often experienced as sounding somber or sad.

To indicate whether a composition is to be played in a major or a minor key within the tablature, a key signature 16 may be notated after the clef 13 so as to indicate the key for the piece to be played. For example, the staff 10 may include sharp 16a or flat 16b note indicators that are positioned on a particular line 11 or in a particular space 12 of the staff 10 to indicate that such a note is to be played as a sharp, e.g., a semi-tone above the natural tonal note, or a flat, e.g., a semi-tone below the natural tonal note, of the underlying natural note so as to produce a major or minor chord, respectively. These symbols 16, therefore, are typically employed where a particular musical composition is to be played within a given major or minor key.

However, as notated above, there are several problems with the above-described devices and methods for notating the music to be played by a given composition. For instance, this tablature 2 is laborious to notate, difficult to read, and extremely tortuous to follow. Further, there is simply no relationship whatsoever between a given symbol 14 for a note to be played, as indicated in the tablature 2, and what the pitch actually is, e.g., A, B, C, D, E, F, or G, and/or what mechanical action needs to be performed so as to sound that note on the instrument being played. In particular, the staff 10 system of the prior art is not intuitive and very tough to translate for one simply reading the music, let alone for one attempting to interpret and then play the music at real time, such as at a performance.

Particularly, the lines 11 and spaces 12 of the staff 10 can become very dense and convoluted the more difficult the music to be played becomes. The more and mixed the notes to be played, the more varied increases or decreases in pitch, the rapidity with which the tempo is to be changed, as well as fluctuations in keys, can make the tablature practically undecipherable, and this becomes even more complicated when different clefs are used to indicate which hand plays which notes on the instrument being played in performing the music. The key signature 16 suffers from the same problem in that there is no indicative nature, outside of learning music theory, between how the signature is notated within the staff 10, and how it relates to the type of notes to be played that are part of any particular key. Additionally, the use of the sharp 16a and flat 16b symbols to indicate which notes are to be played as sharps or flats, and thereby set a major or a minor key for the piece, make the composition, reading, and/or playing of the piece more complicated and difficult to achieve since the referenced symbols are not intuitive to decipher, and thus must be memorized in order to be played in the parroting fashion required by the archaic tablature 2.

Furthermore, an unintended consequence of the archaic tablature of the past is that it has become a rigid task master, stifling creativity, by requiring those playing the musical piece to do so precisely the way it was written, which is quite the opposite to the original intent of the various composers of long ago. From the outset, as originally intended the tablature 2 was meant to be a guide setting forth an example of how the musical piece could be played, and not a unyielding structure demanding the piece be played strictly in that manner. The old tablature 2, however, had no way of conveying that message, and consequently, has been interpreted in the present age as necessitating absolute adherence to the way it was written and therefore mimicry. Hence, instead of promoting individual style and free flowing creativity within the structure of the music, the current tablature 2 mandates copying and therefore parroting.

What is needed therefore, and presented herein, is a new way to memorialize a given piece of music that has been, or is to be, composed that does away with the archaic staff 10 system and the complex musical notation and symbols currently deployed by tablature 2 presently. As can be seen with respect to the disclosure herein provided and the figures appended hereto are new devices, systems, and methods of their use that makes writing a musical composition less laborious, easier to decipher, and is more intuitive to read and play in that the symbols employed are more closely related to the instrument and the manner by which that instrument is to be played. As such, the devices, systems, and methods herein disclosed are useful in helping persons desirous to learn to compose, read, and play music.

Accordingly, in a first aspect, as can be seen with respect to FIG. 2A, a new musical tablature 102 is provided for use in the composing, notating, reading, and the playing of music. In its most basic form, a device of the disclosure includes a substrate 100. As indicated above, the substrate 100 may be composed of any suitable medium capable of receiving one or more demarcations representative of musical symbols for use in the notating, composing, arranging, and/or playing of a musical composition. For instance, the substrate may be a physical member and include a metal, an organic product, such as wood, flax, polyester, paper, cardboard, a glass, a plastic, a rubberized material, a slate, a chalkboard, white board, a TV screen, a computer monitor, or other display screen, such as that of a mobile computing device, laptop computer, tablet, mini-computing device, and the like. In other instances, the substrate may be a representational member, and therefore may include a graphical representation, such as via computer coding, so as to be displayed on a display screen, such as a CRD, plasma, LCD, LED, OLED, or other capacitive sensing, touch screen display device.

Accordingly, the substrate 100 may have a length and a width and/or thickness, such as to be present in three-dimensional space or to be at least represented in three dimensional space; and in some instances, the substrate 100 may simply include a length or a width, such as when represented in two-dimensional space, such as when represented as one or more figures, such as on a computer generated media and/or a display screen associated with the same. Particularly, in various instances, the substrate 100 may have a proximate portion, bounded by a top edge, a distal portion bounded by a distal edge, as well as a plurality of side portions having a left-side edge and a right-side edge. In certain instances, the substrate may have a first, front surface and a second, back surface.

As indicated, a template 102 may be generated and/or positioned on or otherwise represented within the substrate 100. In various instances, the template 102 may be configured such that one or more symbols characterizing the music to be composed and/or read and/or played may be notated thereon or therein. Accordingly, for such purposes, the template 102 may include a plurality of pairs of bar lines 132, which bar lines 132 may be employed for demarcating a measure 130 of the music to be composed and/or played as well as used for receiving one or more note designators (not shown) for characterizing the pitches of the notes to be played.

For instance, a template 102 of the disclosure may be positioned upon the substrate 100, and may include a symbol 132 for indicating where the music notation is to begin and/or end. Any symbol may be used so long as it is capable of demarcating a beginning and/or an end of a musical composition or a portion, e.g., a time period 130, thereof. For example, in a particular embodiment, the symbol 132 may be configured as a line, such as a line 132a positioned toward a right hand side of the substrate 100. In such an instance, the line 132a may form a bar line indicating where the music notation is to begin. Further, in various instances, the template 102 may additionally include a second symbol that is also configured as a line, such as line 132b, positioned toward a left hand side of the substrate 100. In such an instance, the line 132b may form a bar line indicating where the music notation is to end. Hence, on one or more sides of these bar lines, 132a and/or 132b, the music to be composed and/or played may be notated.

Accordingly, in various instances, the template 102 may be positioned horizontally, running from left to right across the template. However, in other instances, the template 102 may include a plurality of pairs of bar lines 132a and 132b and the like such as positioned vertically, running from top to bottom along the substrate 100. In various instances, the template 102 may be configured such that the bar lines 132 and/or the note designators (not shown) there between may be configured to move across and/or down the template 102. In certain instances, a template 102 may not need to be employed, rather, the substrate 100 may perform the function of the template 102.

Hence, in various implementations, a device containing or otherwise composed of a substrate 100 upon which music is to be or has been notated is provided. Any suitable substrate may be used so long as it is capable of receiving and/or displaying a symbolic representation of the template 102 and/or one or more representations of a musical character, such as a note indicator 114 (not shown) to be positioned on the substrate 100, and/or within the template 102. In various embodiments, the substrate 100 will have an elongated body having a proximal portion including a proximal end, a distal portion including a distal end, and a medial portion separating the proximal portion from the distal portion. The elongated body may be planar and include a circumference that surrounds the perimeter of the elongated body, such as where the perimeter may include a left hand side, a right hand side, a topside, and a bottom side.

As indicated, in particular instances, one or more, e.g., a plurality of music symbols, as described herein, may be employed to notate on or within the template 102 the various characters of the music to be played. For instance, the substrate 100 may include a template 102, wherein the template 102 includes a plurality of bar lines 132a and 132b, such as where the second bar line 132b is offset from the first bar line 132a, by a space, which space represents a measure 130 for the music to be composed and/or played. Particularly, the first 132a and second 132b bar lines may be adapted to demarcate a measure 130 for the music, such as where the measure 130 is configured so as to represent the amount of time that governs the timing and/or beat of the music to be or being played. Hence, in various instances, the plurality of bar lines, e.g., 132a and 132b, may be positioned on the substrate 100 and with respect to each other so as to be equidistantly separated from one another, such as by the length of space 130, such as where the length of space 130 demarcates the measure for the composition to be played. More particularly, the measure 130, e.g., the length of the space between the bar lines 132a and 132b is determined by a number of beats corresponding to a count for the musical composition, such as where each count may be a standard measure of time.

In certain instances, as can be seen with respect to FIG. 2B, the template 102 may include a plurality of sets of bar lines, e.g., 132a, 132b, 132c, 132d, and 132e, each demarcating a measure between the bar lines, such as measures 130a, 130b, 130c, and 130d. In such instances, the template 102 may include a plurality of bar lines 132 arranged in such a manner as to demarcate a plurality of measures 130. Further, as indicated above, one or more note designators 114 (not shown) may be positioned proximate one or more of the bar lines 132, e.g., arranged between the two bar ends, in a manner so as to designate one or both of the particular pitch of a scale of pitches within an octave to be played, and/or to designate the length of time, such as within the measure, that note is to be played for.

Hence, the substrate 100 may include a template 102, which template 102 may be composed of a multiplicity of bar lines 132 separated one from the other by a plurality of measures 130, and as such may be employed to notate the music of a composition to be played, such as by populating the template 102 with one or more symbols, as described herein, which symbols may be selected so as to more intuitively symbolize and demarcate one or more of a melody and/or an embellishment characterizing the music to be played. Thus, where traditional musical notation requires the use of a complex system of symbols and a graph framework of lines and spaces, i.e., the archaic staff of FIG. 1, which has no relation to the actual notes in the scale to be played, the present notation system employs easy to understand alphanumeric symbols, images, avatars, cartoons, and/or sizes and/or colors to indicate the pitch to be sounded and/or the duration of the sounding.

Figure 3A:
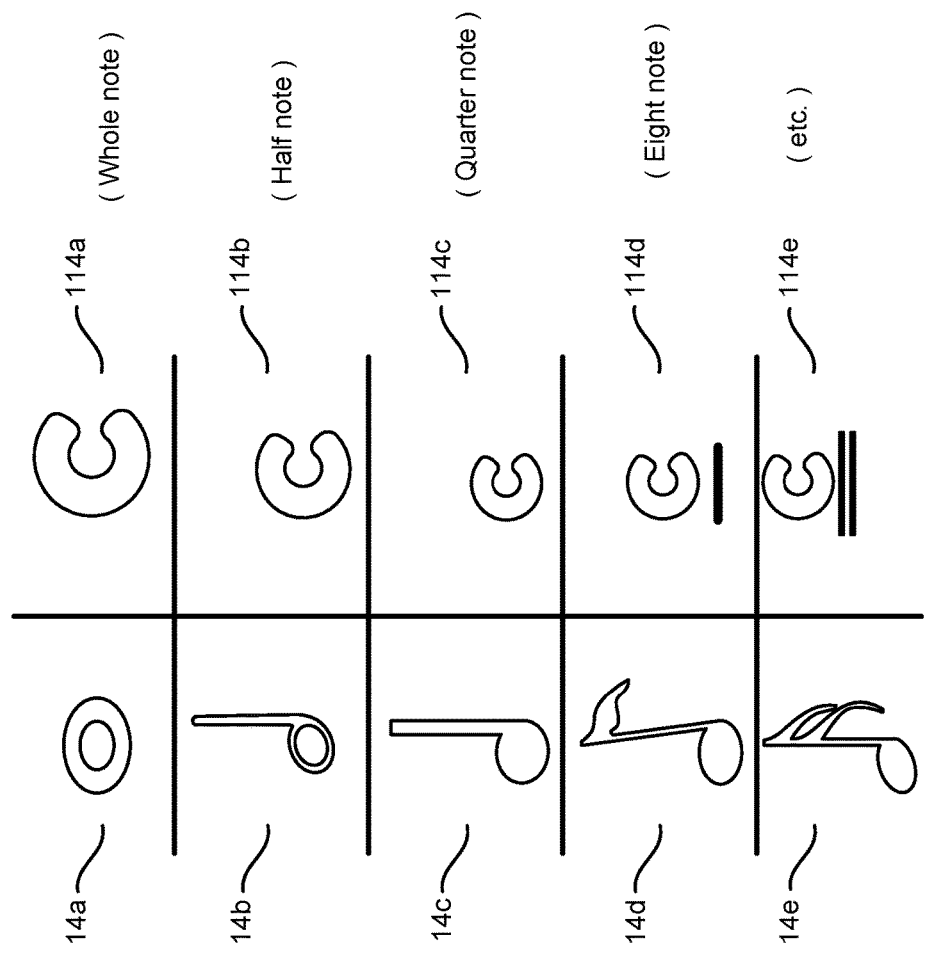

For instance, as can be seen with respect to FIG. 3A, a table is presented wherein in the left hand column the traditional symbol 14 for designating the duration of the note to be played (where its position on the staff in combination with the clef indicates the actual character of the pitch to be played) is set forth; and in the right hand column an exemplary note designator 114 as employed in the present devices, systems, and methods is set forth. As can be seen, in an exemplary embodiment, a letter from the Phoenician alphabet, e.g., an A, B, C, D, E, F, and G is employed to designate the character of the pitch to be played 114, whereas the relative size of the letter 114 indicates the time signature, e.g., the duration during which the note is to be played.

More particularly, in the left hand column, the traditional symbols 14 used as note designators are set forth wherein the symbols include a whole note designator 14a, a half note designator 14b, a quarter note designator 14c, an eighth note designator 14d, and a sixteenth note designator 14e. Further, in the right hand column, the exemplary symbols showing their relative sizes as employed as note designators 114, within the present disclosure, are set forth wherein the symbols include a whole note designator 114a, a half note designator 114b, a quarter note designator 114c, an eighth note designator 114d, and a sixteenth note designator 14e.

In such an instance, the whole note designator 114a has a larger size than the half note designator 114b, which half note designator 114b has a larger size than the quarter note designator 114c, the quarter note designator 114c has a larger size than the eighth note designator 114d, and the eighth note designator 114d has a larger size than the sixteenth note designator 14e, although the reverse size orientation may be employed. It is to be noted that the eighth 114d and the sixteenth 114e note designator may not only be demarcated by a size difference, e.g., smaller and smaller, but may further be distinguished from one another by one or more hash marks, such as set forth below the note designator 114. Furthermore, a thirty-second and/or a sixty-fourth note designator (not shown) may be indicated in the same manner, such as by even smaller sizes and/or with additional hash marks demarcated there under, and so on for increasing smaller measures of time. Additionally, as indicated above, a typical musical instrument may be configured for sounding pitches from several different octaves, and as such the musical notation can correspondingly be adapted to demarcate these different octaves, such as by representing the note designators, for instance, by different colors, where all the note designators from one octave are comprised of a first color, those of a second set of eight tones and five semi-tones making a second octave are comprised of a second color, those of a third octave are comprised of a third color, those of a fourth are comprised of a fourth color, those of a fifth are comprised of a fifth color, those of a sixth are comprised of a sixth color, so on and so forth. Of course, in various instances, various different colors and color patterns may be used, and in some instances, not all octaves need be represented by different colors as the colors can repeat, such as sequentially, where every other octave shares the same color, or every third, or every fourth octave in a set of octaves shares the same color schema or pattern.

Notes in a scale to be played have been referenced in common parlance by letters in the Phoenician alphabet, i.e., A, B, C, D, E, F, and G, so as to designate given pitches having harmonic vibrations that form a repeating scale. Nevertheless, such notes have traditionally been notated in the composing and playing of music using the staff system 10 and note designators 14 as set forth in FIGS. 1 and 3A, so as to represent sounds of particular harmonic pitches within the octave. As indicated above, the use of such archaic symbols 14 are in no way intuitive and are difficult to remember and employ in the composing and playing of music, making it difficult for those of the modern times to learn to play and/or endeavor to compose music. The present tablature 102, however, as well as the various symbols represented therein, present a solution to these and other such problems in that they employ the very letters that have hereto for been employed in common usage to refer to the various notes in an octave of pitches, i.e., A, B, C, D, E, F, and G. The substitution of these letters 114 for the archaic symbols 14 of the ancient tablature 2 makes the present notation system 102 easier to use and more intuitive than the primeval tablature 2 of the past.

Further, as indicated in greater detail below, in certain instances, the letters A, B, C, D, E, F, and G, representative of the pitches that vibrate at various designated frequencies, may in some instances, be represented within a template 102 as words or images of persons, places, things, and/or objects, such as cartoon figures or avatars, that are known or named with words that begin with the letter of the alphabet used to represent the designated pitches. Hence, an A note may be designated with the image of an Apple, and the like; a B note may be designated with the image of a Banana, and the like; a C note may be designated with the image of a Carrot, and the like; a D note may be designated with the image of a Diamond, and the like; an E note may be designated with the image of an Elephant, and the like; an F note may be designated with the image of a Fairy, and the like; and a G note may be designated with the image of a Gorilla, and the like.

Hence, the present devices, systems, and methods, as herein disclosed do away with the old staff 10 system of lines and spaces designating the pitch of the note, as well as doing away with the traditional note symbols 14 that bear no relation whatsoever between the symbol used and the pitch to be sounded. Additionally, as a traditional staff 10 is not used, there is no need to use a clef 13 as a method for interpreting what the staff 10 actually means. Further, as explained below, as a traditional staff 10 is not employed, there is also no reason to use the old sharp and flat symbols 16 to represent the various semi-tones of the octave. Hence, the present system herein presented is less complicated to notate and easier to read, making the teaching and playing of music more simplistic and natural. Furthermore, it is to be noted that other symbols or images can be used as note designators 114, such as letters from other language systems not employing the Phoenician alphabet, as well as cartoon characters, avatars, and other images.

As can be seen with respect to FIG. 3B, an exemplary template 102 of the disclosure is presented. The template 102, in this instance, includes a plurality of bar ends 132, such as bar lines 132a, 132b, 132c, 132d, 132e, 132f, 132g, and 132e that are each spaced an equal distance away from one another so as to form a plurality of measures 130a, 130b, 130c, 130d, 130e, 130f, and 130g where each measure equates to a period of time equivalent to one or more counts of music. As indicated, the bar ends 132 may be of any shape and size, and as depicted in FIG. 3B, the bar ends 132 are comprised of lines that extend upwards and downwards, such as from a top portion of the substrate 100 to the bottom portion of the substrate 100, such as in a parallel configuration. However, in various instances, bar ends 132 may be comprised of lines that extend from a leftward to a rightward side of the substrate 100, such as from a left hand side portion to the right hand side portion of the substrate 100, such as in a horizontal configuration.

In this instance, each measure 130 includes a note designator 114, which may be used to represent one or more of a pitch of a note within one of a set of octaves or a silence, e.g., a rest in the absence of a note to be played, where each octave includes a number of notes in a scale of pitches. In this particular instance, the note designator 114 is represented as the symbol "C." Particularly, the symbol "C" as employed herein is used to symbolize a pitch within a particular octave or octaves that are commonly referenced as the C note in the Western musical scale, which note has the respective sound that vibrates at a frequency equivalent to that pitch. However, although depicted herein as the pitch symbolized by the "C" note, it is understood that other symbols, images, cartoons, avatars, or the like can be used as a referent for this and/or other notes, and/or other pitches may be designated within this template 102, such as between the bar lines 132, so as to designate notes having other known pitches, such as A, B, D, E, F, and G. Accordingly, although a "C" note is designated herein for exemplary purposes, notes of other pitches may be referred to, such as by note designators A, B, D, E, F, and G and the like.

Hence, as exemplified, the tablature 102 may include one or a plurality of note designators 114, such as between pluralities of barlines 132, so as to designate which pitches of the octave are to be sounded or otherwise played within the given measure 130. In various instances, the note designator 114 may have a relative size, a relative color or color scheme, and/or a number associated with the note designator 114, such as to designate by which finger a given note designated within the template may be played. In such an instance, the size of the note designator 114 may define or otherwise determine one or more of the following: the relative length of time during which the pitch of the note is to be played and/or the time signature for the pitch to be played. For instance, as shown, the note designators 114a, 114b, 114c, 114d, 114e, 114f, and 114g all designating the "C" note, have differing sizes and are set forth between the measures 130 in decreasing order of size, where the larger the size indicates the longer the period of time during which the note is to be sounded.

Further, in various instances, the number of note designators 114 within a given measure 130 may be used to signify which note gets the beat. In some instances, the relative size and/or one or more hash marks may be used, e.g., in combination with the size and/or number of note designators 114 used, to indicate the same. Particularly, in such instances, the number and/or size of the symbols between the bar ends 132 may be equivalent to the number of beats corresponding to the count(s) for the musical composition, such as where each count may be a standard measure of time. Accordingly, the identity and/or character of the note designator, e.g., "C", indicates which pitch is to be sounded, such as a pitch demarcated by a frequency represented by a C, D, E, F, G, A, B, or C' note, and the relative size of the note designator 114 indicates the length of time during which that particular note is to be sounded or played within the measure.

In this instance, the largest relative size note designator 114a indicates that the respective "C" pitch is to be held for the length of the whole measure 130a, which in a 4 count measure would mean that the "C" note is to be sounded, played, or otherwise held for four beats, e.g., the "C" note is to be played once and held for the entire length of the measure 130a. The second largest relative size note designator 114b indicates that the respective "C" pitch is to be held for half the length of the measure 130b, which in a 4 count measure would mean that the "C" note is to be played for two beats. Hence, in this instance, since two half-note "C" designators are set forth within the measure 130b, this indicates that there are two "C" pitches that are to be sounded within the measure each for half the length of the measure 30b, such that the two "C" notes when played sequentially take up the entire length of time of the measure, such as where each "C" note is played and lasts for two beats. The third largest relative size note designator 114c indicates that the respective pitch demarcated by the "C" note is to be held for a quarter the length of the measure 130c, which in a 4 count measure would mean that the note is to be played for one beat. In this instance, four quarter-note "C" designators are set forth within the measure 130c to indicate that there are four "C" pitches that are to be sounded within the measure each for a quarter of the length of the measure 130c, e.g., one note per beat. The fourth largest relative size note designator 114d indicates that the respective pitch is to be held for an eighth the length of the measure 130d, which in a 4 count measure would mean that the note is to be played for half of a beat. Likewise, in this instance, since eight eighth-note "C" designators are set forth within the measure 130d to indicate that there are eight "C" pitches that are to be sounded within the measure each for an eighth the length of the measure 130d.

The fifth largest relative size note designator 114e indicates that the respective pitch is to be held for a sixteenth the length of the measure 130e, which in a 4 count measure would mean that the note is to be played for $\frac{1}{16}^{th}$ of a beat. In this particular instance, only one note designator 114 is included, but in other instances, up to sixteen note designators can be included, where each represent the respective note is to be held for $\frac{1}{16}^{th}$ the length of the measure. In such an instance as this, to better identify the difference in size, this fifth note designator 114e may be represented along with a hash mark underneath it, so as to clearly distinguish it from the other note designators 114a-114d. Hence, in various embodiments, one or more additional symbols, e.g., hash marks, may be included along with the note designator 114 so as to distinguish among various differing notes to be notated and/or played for varying lengths of time. For instance, the sixth note designator 114f, which may be the same size as any of the other note designators or a different size, e.g., smaller, indicates that the respective pitch is to be held for a thirty-second length of the measure 30f, which in a 4 count measure would mean that the note is to be played for a $\frac{1}{32}$nd of a beat. As above, this note designator 114f may be represented along with a plurality of, e.g., 2, hash marks underneath it, so as to distinguish it amongst all the other various note designators 114 to be used for notating the music and/or played. Further, a seventh note designator 114g may be represented along with a plurality of, e.g., 3, hash marks underneath it, so as to distinguish it amongst all the other various note designators and may be used to indicate that the respective pitch of the note to be held is for a sixty-fourth length of the measure 130g, which in a 4 count measure would mean that the note is to be played for a $\frac{1}{64}^{th}$ of a beat. In such instances, additional note indicators and/or silences may be included within the measure so as to indicate what is to be done with the remaining time of the measure, such as what further notes are to be played and/or silences maintained.

Additionally, as indicated above, music may be produced by the plucking of weighted strings of given lengths that cause them to vibrate at a given frequency and/or music may be produced by the vibrations caused by air passing through one or more orifices, which in either case results in the sounding of a note having a corresponding pitch. The different pitches may be produced by the strings having different weights, the orifices having different diameters, and/or the different lengths of the strings plucked and/or lengths between the various orifices, such as within an instrument. These pitches can be grouped into scales of ascending notes that form a harmony.

As the sounds produced are a result of string weight, opening diameter, and/or the various lengths involved, a doubling or halving of the weight or length will result in the same note being sounded but at a higher or lower pitch. As it turns out, there are eight notes that in ascending order form on octave of pitches, and when the weight or length of the string being plucked or the orifice being opened is increased or decreased proportionally, these scales can be reproduced at higher or lower pitch ranges. There are, therefore, several scales of octaves of notes all having corresponding pitch ranges. In the present system, therefore, notes to be played or sounded may belong to different octaves, where each octave is represented differently and distinguished one from another in various different ways, such as by different colors or color schemes. In such an instance, the various different note indicators 114 may be demarcated in various different manners, such as size, so as to indicate the length of time during which the pitch is to be sounded, which in other instances, may be demarcated by size and/or by the movement of the note indicator 114, such as when represented electronically, such as where the motion indicates for how long the note is to be played. Such note designators 114 may be demarcated such as by different colors, markings, configurations, and the like.

Accordingly, in various instances, the color or color scheme of the note designator 114 may define or otherwise determine to which set of octaves the particular note designator belongs. For instance, a typical musical instrument may be configured for playing a multiplicity of notes along a multiplicity of octaves such as over one or more scales of pitches. It is to be noted, that pitches are produced by vibrations of various frequencies, and as such can typically be produced by the striking of strings, by the vibrations within the vocal chords as air is passed over them, or through air escaping from an orifice or hole in a tube of different lengths, etc.

The tablature of the present disclosure may, therefore, be adapted to indicate which octave out of a multiplicity of octaves a particular note designator corresponds to, and may be useful regardless of how that sound is produced, e.g., plucking, singing, or blowing. As is known in the art, there may be one, two, three, four, five, six, or more octaves, and thus, the notation can be employed so as to differentially represent notes from these different octaves. In such an instance, the tablature 102 may be configured to signify a difference between octaves and/or the pitches thereof. For example, the pitches of different octaves may be differentiated by being represented in various different colors. Any suitable color may be used to demarcate the different octaves, such as red, orange, yellow, green, blue, indigo, violet and combinations thereof, such as where different colors represent different octaves from which the notes may be derived.

Additionally, in various instances, the symbol for the note designator 114 may include a letter, as noted above, and in some instances may include a numeric symbol such as a number. For instance, as described above, the pitch of a musical note within an octave may be a natural tone or a semitone, e.g., a sharp or a flat, which vibrates at a particular frequency. The present devices, systems, and methods herein presented accounts for this by using different symbols to represent and distinguish between natural notes and their corresponding semi-tones.

For example, the natural notes may be represented by letters. In such an instance, the letter may be any letter, but in various instances, the letter may be selected from a group representative of Western music denotation, such as an A, B, C, D, E, F, and G, or a foreign language translation of such letters, for instance, where the letter represents a corresponding musical note, such as a whole note or natural tone having the designated pitch within a given octave of pitches. However, the various semi-tones, e.g., the sharps and/or flats of the natural notes within the octave, may be represented by numbers. In such an instance, the number may be any number, but in various instances, the number may be selected from a group representative of Arabic numerals, such as a 1, 2, 3, 4, and 5, and the like. Hence, within the present system, the natural notes or tones may be represented by letters, and their flats or sharps, e.g., their respective semi-tones, may be demarcated by numbers. Further, as indicated, these various pitches, e.g., tones and/or semitones, may belong to one or more octaves of pitches, which octaves may be distinguished from one another by being represented by differing colors and/or color schemes.

Furthermore, as indicated above, in various embodiments, the relative size of the note designator 114 may define and/or otherwise determine the length of relative time during which the pitch, e.g., the tone or semitone, is to be sounded and/or otherwise played. In such instances, a plurality of note designators 114 may be included, such as within the measure 130, wherein the number of note designators 114 present within the measure may define and/or determine which notes and/or pitches get the beat and when. For instance, in one particular embodiment, the relative size of the note designator determines the time signature for the note to be played, such as where the time signature for the note to be played represents the number of times and/or beats and/or counts during which the corresponding pitch is to be sounded during the measure 130, and/or the presence of two or more note designators 114 indicates which notes gets the beat and when.

Particularly, as set forth above, the relative size of the note designator includes a size range, e.g., ranging from a large or largest size to a small or smallest size, such as where the larger the size the longer the duration of time the note is to be played, and likewise the smaller the size the shorter duration of time the pitch is to be played. Consequently, the size range may include a size selected from one or more of the following: largest size, larger size, large size, medium size, small size, smaller size, and smallest size. Hence, in some particular embodiments, the relative size of the note designator 114, e.g., of a tone or semitone, represents the time signature, which time signature may be representative of a member selected from the group consisting of a whole note 114a, a half note 114b, a quarter note 114c, an eighth note 114d, a sixteenth note 114e, a thirty-second note 114f, a sixty-fourth note 114g, and/or the like. Specifically, in some particular embodiments, the largest size of the note designator 114*a* comprises a whole note, the larger size of the note designator 114*b* comprises a half note, the large size of the note designator 114*c* comprises a quarter note, the medium size of the note designator 114*d* comprises an eighth note, the small size of the note designator 114*e* comprises a sixteenth note, the smaller size of the note designator 114*f* comprises a thirty-second note, and the smallest size of the note designator 114*g* comprises a sixty-fourth note, as explained above.

It is understood that the number of notes to be played within a measure 130 may not be equal to the number of counts within that measure 130. Hence, a measure 130 may not only include a note designator 114 but may include one or more rests or silence indicators 119. For instance, FIG. 3C sets forth symbols that in the present devices, systems, and methods, may be employed as rests or silences, such as to indicate when a note is not to be played during one or more counts of a measure. Any symbol may be used to indicate a silence or a rest, but in this instance, the silences 119 are depicted as round circles of differing sizes, wherein the size, color, markings, configuration, and/or movement of the circle representing the silence demarcates the length of time during the measure 130 the silence is to be maintained. As indicated above, although the silences are represented with respect to FIG. 3C as circles, they may be any suitable symbol or image to demarcate a silence or rest in the absence of a note to be played within a measure, such as a whole moon, a half moon, a quarter moon, stars, a night time and/or sleep image, and the like.

For example, the symbol, e.g., circle 119*a*, set forth in measure 130*a* depicts a whole rest, which whole rest 119*a* indicates a silence that is to be maintained during the whole length of time during the measure 130*a*. Likewise, the two symbols, e.g., circles 119*b*, set forth in measure 130*b* depict two half-rests, which half-rests 119*b* indicate a silence that is to be maintained during half the length of time during the measure 30*b*. In this instance, two half-rests 119*b* are present, which means the silence is to be held for the whole length of the measure. Hence, two half rests 119*b* equate to one whole rest 119*a*.

Additionally, the four symbols, e.g., circles 119*c*, set forth in measure 130*c* depict four quarter rests, which quarter rests 119*c* indicate a silence that is to be maintained during a quarter of the length of time during the measure 130*c*. In this instance, four quarter rests 119*c* are present, which means the silence is to be held for the whole length of the measure. Hence, four quarter rests 119*c* equal two half rests 119*b*, which equate to one whole rest 119*a*. Likewise, the symbols, e.g., circles 119*d*, set forth in measure 130*d* depicts an eighth rest, which eighth rest 119*d* indicates a silence that is to be maintained during an eighth amount of time during the measure 130*d*. In this instance, eight eighth rests 119*d* are present, which means the silence is to be held for the whole length of the measure. Hence, eight eighth rests 119*d* equal four quarter rests 119*c*, which in turn equal two half rests 119*b*, which equate to one whole rest 119*a*.

Figure 3C:
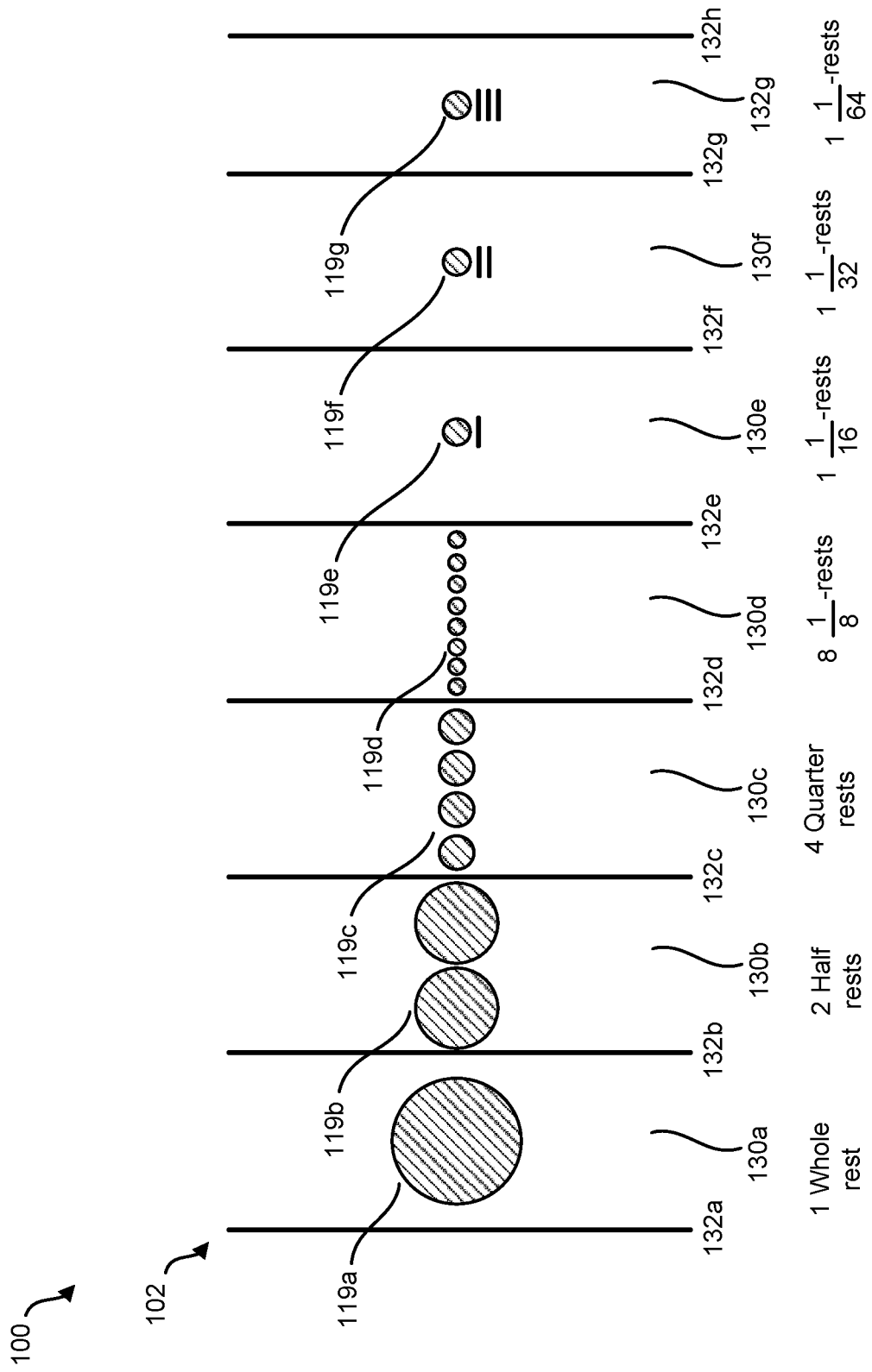
FIG. 3C is another example of a substrate containing a template of the disclosure, where the template includes a plurality of symbols indicating one or more silences in the absence of a note or notes to be played, such as when in a given measure a silence is to be maintained during one or more beats within the measure, where the size of the note designator indicates the length of time of the measure during which the silence is to be maintained and/or the number of note designators indicate how many times and for how long the silence is to be maintained, such as for how many beats during the measure the silence(s) is to be maintained.

As can be seen with respect to FIG. 3C, the symbol, e.g., circle, representing the whole rests 119*a* is larger than that of the half-rests 119*b*, which in turn is larger than that of the quarter-rest 119*c*, and the quarter rest 119*c* is larger than that of the eighth rest 119*d*. Accordingly, in these instances, these rest symbols may differ from one another as to one or both of size and number. For instance, a sixteenth rest 119*e*, a thirty-second rest 119*f*, and/or a sixty-fourth rest 119*g* may also be used to demarcate rests of corresponding lengths of time during the measure 130. Hence, various rests demarcating different increments of time periods may be used to indicate an absence of a note to be played, e.g., a silence maintained, where the various silence indicators may be differentiated from one another such as by increasing number and/or decreasing size to signify the differing length of time those respective rests are to be maintained. However, in this instance, the size and shape of the symbol for the sixteenth rest 119*e*, thirty-second rest 119*f*, and/or sixty-fourth rest 119*g*, are the same as that for the eighth rest 119*d*, however with one or more underscores demarcating the differentiation between these various rest symbols.

Particularly, the symbol, e.g., circle 119*e*, set forth in measure 130*e*, depicts a sixteenth-rest, which sixteenth-rest 119*e* indicates a silence that is to be maintained during a sixteenth the amount of time during the measure 130*e*. Further, the symbol, e.g., circle 119*f*, set forth in measure 130*f* depicts a thirty-second rest, which thirty second-rest 119*f* indicates a silence that is to be maintained during a thirty-second the amount of time during the measure 130*f*. And the symbol, e.g., circle 119*g*, set forth in measure 130*g* depicts a sixty-fourth rest, which sixty-fourth rest 119*g* indicates a silence that is to be maintained during a sixty-fourth the amount of time during the measure 130*g*. It is noted that the rest symbols 119*e*, 119*f*, and 119*g* have the same shape and size and are differentiated by the increasing number of hash marks underneath them, respectively.

Accordingly, like the symbols 114, the symbols 119 generally can be varied from one another in a number of different ways, such as by shapes, sizes, colors, quantities, qualities, markings, and other such configurations. However, in this instance, the symbols 119*e*, 119*f*, and 119*g*, are all represented by a circle, which circle is the same with respect to size and shape, however differ from one another by including one or more hash marks. For example, symbol 119*e*, indicating a sixteenth rest, is demarcated by including a single hash mark beneath the circle. Likewise, symbol 119*f*, indicating a thirty-second rest, is demarcated by including a plurality of, e.g., two, hash marks beneath the circle. Further, symbol 119*g*, indicating a sixty-fourth rest, is demarcated by including a plurality of, e.g., three, hash marks beneath circle. Any number of hash marks may be used to distinguish the various symbols one from another, along with size, shape, coloring, configuration, and the like.

Nevertheless, it is to be understood that although the depicted rests are configured as circles, other shapes, such as triangles, pyramids, squares, rectangles, cubes, pentagons, hexagons, octagons, and the like. Likewise, one or more symbols as herein disclosed may be used to indicate a plurality of rests, such as where the rest symbols are differentiated by the number of symbols employed and/or by including one or more additional markings, such as one or more underscores under the symbol, such as depicted as 119*e*, 119*f*, and 119*g*. Hence, such symbols can differ by number, size, and/or the inclusion of additional markings so as to be distinguishably different from the other symbols demarcated above. In some instances, various of the symbols may be the same with respect to each other, e.g., with reference to size, number, color and/or shape, albeit differ from one another with respect to additional other markings, configurations, or movements, or all such symbols may be different from one another, or grouped with respect to these characteristics in a different manner than as set forth herein.

As described above, the musical scale is made up of natural notes or tones, arranged in an ascending order of pitches that form octaves. The movement from one pitch to another within an octave constitutes a whole step, and because the notes from one pitch to another are consonant, they form tones. However, in some instances, movement from one pitch to another may be made in half-steps, which half-steps form notes that are only semi-tonal, or semi-tones. Such whole steps, therefore, make up the major notes of the scale, e.g., C, D, E, F, G, A, B, C', while half steps make up the semi-tones that are the sharps and flats of these major notes, such as Csharp/Dflat, Dsharp/Eflat, Fsharp/Gflat, Gsharp/Aflat, and Asharp/Bflat. For instance, in typical musical notation, a sharp means higher in pitch by a semitone (half-step), and a flat means lower in pitch by a semitone. Of course, as indicated above, higher in pitch by a half step above a first whole note, is lower in pitch by a half step of the next second whole note.

However, as described above with respect to FIG. 1, the manner in which the archaic tablature 2 of the prior art made reference to the playing of these semitonal notes is not intuitive, is very confusing to understand, is hard to interpret, and even harder to employ when composing and/or playing music. Particularly, in the ancient tablature 2 the pitches 14 of a composition, representative of the natural notes, are indicated by where the natural note symbol 14 is positioned on the staff 10, e.g., within the lines 11 or spaces 12 thereof. However, for the semi-tone notes, represented by sharp and/or a flat symbols 16a and 16b, respectively, such semi-tone notes are typically notated by placing the sharp 16a or flat 16b symbol on the staff 10 next to the clef 13 and in front of the natural notes 14, which they modify. These sharp 16a and flat 16b indicators would then form the key signature that defines the prevailing major or minor key of the piece. As such, the sharp 16a or flat 16b indicator functioned to indicate which notes 14 were to be played higher, e.g., as a sharp, or lower, e.g., as a flat, than their corresponding natural notes. Accordingly, a sharp symbol 16a on a line 11 or within a space 12 between the lines in the key signature raises the particular note 14 that would otherwise be indicated by that line 11 or space 12 one semitone above the natural, and a flat lowers such indicated notes one semitone. As one would expect, such key signatures 16 are difficult to use, complex to figure out, and challenging to apply consistently when composing, reading, and/or playing music.

The present devices, systems, and methods employ symbols and symbol placements that are configured so as to simplify their use, interpretation, and application in the composing, reading, and/or playing of music in a consistent manner. FIG. 3D sets forth a table of key signatures 16 as employed in the prior art, in the left hand side of the table, and the key signatures 116 as presently employed in the right hand side of the table. As can be seen, the sharp 116a and flat 116b symbols of the archaic tablature 2 are not widely known or used outside of musical notation, or known and used for other purposes, thus making their use in musical notation non-intuitive and confusing. Further, to make matters worse, their placement within the archaic tablature 2 so as to indicate which notes are to be modified so as to be played as sharps or flats makes their implementation difficult in both the reading and playing of music.

As can be seen with respect to FIG. 3D, the present devices, systems, and methods of using the same employ key signature symbols 116, e.g., numbers, that are easier to use then their archaic counterparts, simple to understand, and can be applied consistently and intuitively when composing, reading, and composing music. For instance, instead of using such archaic sharp and flat symbols 16, which are only notated at the very beginning of the musical composition, and must be remembered through out the playing of the music, the present symbols employ numbers, or other easily recognizable images or avatars 116, for indicating the sharps and flats, reflective of the semitones, as implemented in the present system. Particularly, in particular embodiments, key signatures representing sharps and flats as employed in the present system are numbers, such as the numbers 1, 2, 3, 4, 5, etc.

Further, as noted, within the present system such key signatures 116 double as note indicators as well, indicating which note or key on a particular instrument is to be played. Hence, key signatures 116 additionally represent sharp and/or flat semitone notes to be played in a musical composition. For example, in various instances, where in the archaic tablature 2 a Csharp/Dflat may be indicated, within the present system such semitones may be demarcated by the number 1. Likewise, where the archaic tablature 2 indicates a Dsharp/Eflat, within the present system such semitones may be demarcated by the number 2. Where the archaic tablature 2 indicates a Fsharp/Gflat, within the present system such semi-tones may be demarcated by the number 3. Additionally, where a Gsharp/Aflat is indicated, within the present system such semi-tones may be demarcated by the number 4. And where an Asharp/Bflat is to be notated, within the present system such semi-tones may be demarcated by the number 5. Furthermore, where the various semitones to be notated are from different octaves of the overall scale, the various numbers may be differentiated from one another by being comprised of different colors. Hence, each octave within a set of octaves may be represented by different colors, wherein the note designators 114 and/or 116 are each represented by the color that is indicative of the scale of pitches from which they are derived.

More particularly, in a typical music scale, an octave may be divided into twelve semitones including the eight tonal natural notes of the octave, as well as the additional five notes consisting of various sharps and flats. Consequently, there are fifteen possible sharp and/or flat key signatures: up to seven sharps, up to seven flats, or no sharps or flats, which in the present system may be symbolized as numbers, e.g., 1, 2, 3, 4, 5, 6, 7, 8, 9, 10, 11, 12, 13, 14, 15, etc. Additionally, it is to be noted that although the key signatures and/or note designators 116 employed herein are numbers, any suitable symbol may be used to indicate a semi-tone key signature/note designator including a number, shape, image, avatar, cartoon, and the like, which symbols may be the same or may be of differing sizes, wherein the size, color, markings, configuration, and/or movement of the symbol represent the length of time during the measure 130 the semi-tone 116 is to be maintained. In such instances, the number of symbols between the bar ends 132 may be equivalent to the number of beats corresponding to the count(s) for the musical composition, such as where each count may be a standard measure of time and the size of the symbol or movement thereof may be indicative of the relative length of time during the measure the tone or semitone is to be held for, as described above with respect to the whole tonal notes 114.

Figure 4A:
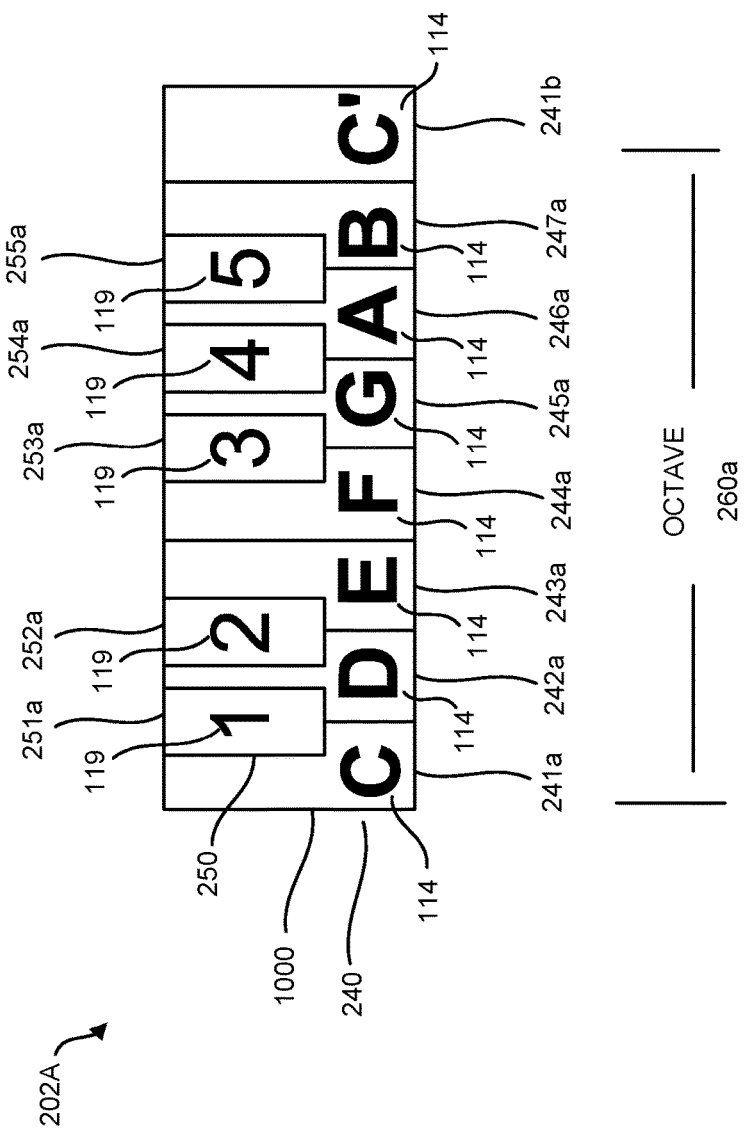
FIG. 4A is another example of a template that may be used to notate the notes indicative of pitches to be played in a musical composition, and/or may be representative of a musical instrument that may be played in accordance with the teachings herein.

Additionally, as can be seen with respect to FIG. 4A, a representation of another template 202A of the disclosure is provided. In this instance, the template 202A includes a depiction of an octave 260a of a keyboard 1000 piano (not shown). Although a keyboard 1000 of a piano is depicted, it is understood that this is for exemplary purposes only and that the disclosed devices, systems, and methods are applicable to any suitable musical instrument, such as a piano, keyboard, electric keyboard, harpsichord, harp, dulcimer, guitar, electric guitar or bass, bass, cello, violin, flute, clarinet, bassoon, and other such string and/or wind instruments. Accordingly, the template 202A includes a representation of the white keys 240 as well as the black keys 250 associated with the keyboard 1000 of a piano.

However, in other instances, the template 202 may be configured to represent any suitable instruments, as noted above. In this instance, it becomes clear just how intuitive the present devices, systems, and methods are. In this system, the individual white keys 240 of the representation of the keyboard, e.g., of piano 1000, each demarcate a note 114 of an octave 160a. Particularly, white key 241a is representative of a "C" note, white key 242a is representative of a "D" note, white key 243a is representative of an "E" note, white key 244a is representative of a "F" note, white key 245a is representative of a "G" note, white key 246a is representative of an "A" note, white key 247a is representative of a "B" note, and white key 241b is representative of a "C" note of the next octave 260b. Likewise, the individual black keys 250 of the representation of the piano keyboard 1000 each demarcate a note 119 of the octave 260a. Particularly, black key 251a is representative of a "Csharp/Dflat" note, key 252a is representative of a "Dsharp/Eflat" note, key 253a is representative of an "Fsharp/Gflat" note, key 254a is representative of a "Gsharp/Aflat" note, and key 155a is representative of an "Asharp/Bflat" note.

Hence, as can be seen with respect to FIG. 4A, the white keys 240 of the piano 1000, or at least a representation thereof, may be demarcated with the symbols 114, e.g., letters, representative of the notes having the corresponding pitches, e.g., C, D, E, F, G, A, and B, that are sounded when those keys 240 are depressed or otherwise played. Additionally, rather than employing the archaic sharp 16a and flat 16b symbols to indicate the various semitones, which symbols 16 are confusing to use and interpret, such as when composing and/or playing music, the present system employs numbers 119, e.g., 1, 2, 3, 4, and 5, as symbols to demarcate the semitones to be played in a musical composition. For instance, black key 251a, representative of a "Csharp/Dflat" note, may be demarcated with a 1 (in the tablature and/or on the actual instrument). Black key 252a, representative of a "Dsharp/Eflat" note, may be demarcated with a 2. Black key 253a, representative of an "Fsharp/Gflat" note, may be demarcated with a 3. Black key 254a, representative of a "Gsharp/Aflat" note, may be demarcated with a 4. And black key 155a, representative of an "Asharp/Bflat" note, may be demarcated with a 5. Of course, other symbols, numbers, images, cartoons, and/or avatars may be used to represent these keys and/or numbers.

Accordingly, as depicted the actual white keys 240 and/or black keys 250 of the piano, or at least a representation thereof, can be demarcated with a letter, e.g., C, D, E, F, G, A, B, and/or a number, e.g., 1, 2, 3, 4, or 5, respectively, so as to indicate that the playing of those keys will result in the sounding of the corresponding tone and semitone pitches that are to be played in accordance with the musical composition. Consequently, when a whole note 14 and/or a sharp 16a or a flat 16b is to be played, in the present system, such tone notes may be represented by a letter 114 and such semitone notes may be represented by a number 119 having the corresponding pitches that are sounded when those keys 240 and/or 250 are played. In a manner such as this, instead of employing the out dated staff 10 and tablature 2 system of the past, such as where the lines 11 and spaces 12 there between and/or archaic sharp and flat symbols 16 are used to indicate which note of the octave is to be played, simple, easy to understand letters and/or numbers 114 and/or 119 may be used, in the present tablature 202 and/or on the piano 1000 itself, to indicate which keys 240 and/or 250 of the piano are to be played and in what order.

Because there is very little intrinsic relationship between a given symbol 14 representative of a note to be sounded, as indicated in the ancient tablature 2, and the mechanical action to be performed so as to play that note on the instrument 1000 being played, e.g., such as by depressing the keys 240 and/or 250, the archaic tablature 2 is laborious to notate, difficult to read, and extremely tortuous to follow when playing the music of a notated composition. However, when comparing the inter-relationship between the present tablature 102 and 202, for notating music as illustrated in FIG. 2B, to an exemplary instrument with which that music may be played, as illustrated in FIGS. 4A and 4B, it can clearly be seen that the present devices, systems, and methods make writing and/or playing a composition less laborious, easier to decipher, and is more intuitive in that the symbols employed as herein described are more closely related to the instrument to be played.

Figure 4B:
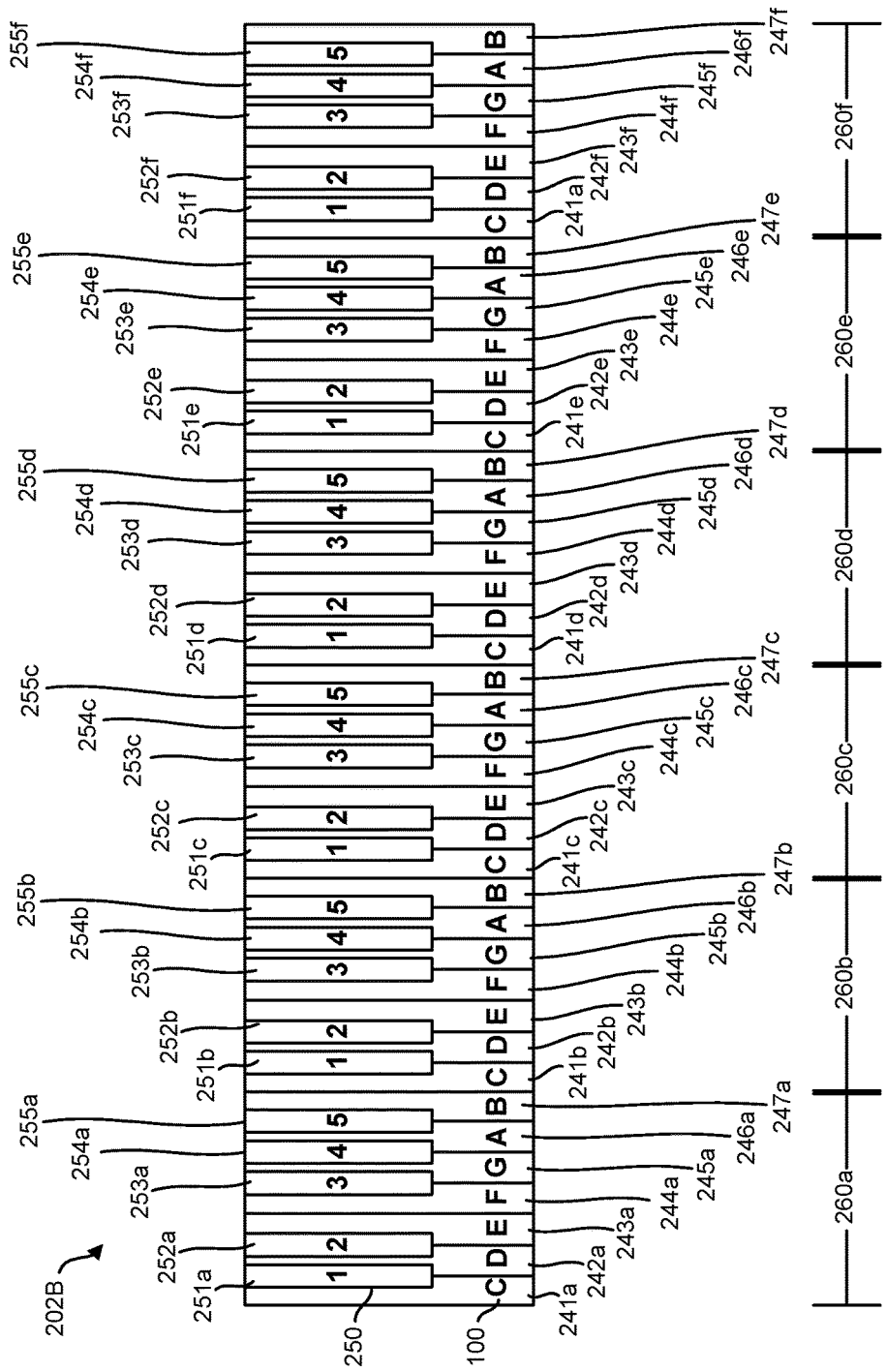
FIG. 4B is a further example of a template that may be used to notate the notes indicative of pitches to be played in a musical composition, and/or may be representative of a musical instrument that may be played in accordance with the teachings herein.

FIG. 4B sets forth a further representation of a secondary template 202B of the disclosure. In this instance, the template 202B includes a depiction of six octaves 260a, 260b, 260c, 260d, 260e, and 260f of a keyboard of a piano 1000, which may, in some instances, be representative of an actual keyboard 1000. As depicted in FIG. 4B, each of the six octaves 260 of the template 202B includes a representation of seven white keys 240 as well as five black keys 250 associated with the piano. As such, each white key 240 may be demarcated by a symbol 114 such as a letter, e.g., C, D, E, F, G, A, B; and each black key 250 may be demarcated by a symbol 119 such as number, e.g., 1, 2, 3, 4, and 5. The octaves 260, and/or the various notes 240 and 250 represented therein, may be differentiated one from the other in any suitable manner, such as by size, shape, color, marking, lighting, vibration, tactile indicator, and the like. Hence, in an exemplary embodiment, the keys 240 and 250 of a first octave 260a may be demarcated by a first color, those of a second, third, fourth, fifth, sixth, and/or more octaves, e.g., 260a-260f, may all be demarcated by different colors.

Particularly, white keys 241a-f may be demarcated or otherwise represented by the "C" notes of the various different pitches of the corresponding octaves 260a-f, where each "C" note may be demarcated by a different color, such as the color indicative of that particular octave 260, or may share a color with a "C" note from one or more other octaves. For instance, in various instances, the template 202B and/or keyboard 1000 may be split in half, such as to include a right hand side and a left hand side, such as where all the octaves of the left hand side include octaves 260a, 260b, and 260c, all of which are represented by a different color. Likewise, the octaves of the right hand side include octaves 260d, 260e, and 260f, all of which are represented by a different color, but where the color of the notes within the octaves 260a and 260d are the same, the colors of the notes within the octaves 260b and 260e are the same, and the colors of the notes of the octaves 260d and 260f are the same.

Accordingly, the white keys 242a-g may be demarcated or otherwise represented by "D" notes of the various different pitches of the corresponding octaves 260a-260f, where each key 240 within a specific octave, or a symbol 114 positioned on each key, is demarcated by the same color, such that all keys 240 within the same octave 260 have the same color, which color is representative of that particular octave 260. Further, white keys 243a-f are representative of "E" notes of the various different pitches of the corresponding octaves, white keys 244a-f are representative of "F" notes of the various different pitches of the corresponding octaves, white keys 245*a-f* are representative of a "G" note of the various different pitches of the corresponding octaves, white keys 246*a-f* are representative of an "A" note of the various different pitches of the corresponding octaves, and white keys 247*a-f* are representative of a "B" note of the various different pitches of the corresponding octaves. It is to be noted that any suitable color or marking scheme may be employed and differ from that described herein, such as where all the keys 240 within the octaves 260 do not all have same color, but rather each key of the same note 114 within all the different octaves 260 have the same colors. In such an instances, all of the "C" keys within all of the octaves 260 would have the same color, and so forth for all of the notes within the scale of the various octaves. Thus, giving each octave 260 a rainbow like appearance.

Likewise, black keys 251*a-f* are representative of a "Csharp/Dflat" note of the various different pitches of the corresponding octave. Black keys 252*a-g* are representative of a "Dsharp/Eflat" note of the various different pitches of the corresponding octave. Black keys 253*a-f* are representative of an "Fsharp/Gflat" note of the various different pitches of the corresponding octave. Black keys 254*a-f* are representative of a "Gsharp/Aflat" note of the various different pitches of the corresponding octave, and black keys 255*a-f* are representative of an "Asharp/Bflat" note of the various different pitches of the corresponding octave. As noted above, each of the black keys 250 within a particular octave 260 may be demarcated by the same color, or each of the black keys 250 representative of the same note within the different octaves 260*a-f* may be demarcated by the same color, e.g., given each of the individual black keys 150 within each octave 260 a rainbow like appearance.

More particularly, in such instances as these, each key within the scale of the given octave 260*a-f* may be represented as being from that given octave by sharing the same distinguishing characteristics, such as color, markings, surface features, lighting, vibratory elements, symbols, e.g., letters and numbers, a combination thereof and/or the like. For example, all 12 tone and semitone notes of a first octave 260*a* may be represented as being red, or any other color, all 12 tone and semitone notes of a second octave 260*b* may be represented as being orange, or any other color, all 12 tone and semitone notes of a third octave 260*c* may be represented as being yellow, or any other color, all 12 tone and semitone notes of a fourth octave 260*d* may be represented as being green, or any other color, all 12 tone and semitone notes of a fifth octave 260*e* may be represented as being blue, or any other color, all 12 tone and semitone notes of a sixth octave 260*f* may be represented as being indigo, or any other color, and/or all 12 tone and semitone notes of a seventh octave 260*g*, where included may be represented as being violet, or any other color. Of course, these color combinations can be changed or modified, such as where the keys of each octave 260 of the right hand side of the keyboard 1000 are the same but where each octave 260*a-c* has a different color, and the keys of each octave 260*d-f* of the right hand side differ from one another by octave but have matching colors with the octaves of the left hand side.

For instance, when playing the piano, it is common to split the playing of notes 114/119 of the various octaves 260 between the left and right hands. Hence, in such an instance, the octaves 260*a-c* containing the notes 114 and/or 119 to be played by the left hand may be demarcated in one set of color patterns, so that all the keys 240 and/or 250 of the octave 260*a* have the same color, which color differs from the color of the notes of the other octaves 260*b* and 260*c*, and so forth; and the octaves 260*d-f* containing the notes 114 and/or 119 to be played by the right hand may be demarcated in a different set of color patterns, such that all the keys 240 and/or 250 of the octave 260*d* have the same color, which color differs from the color of the notes of the other octaves 260*e* and 260*f*.

Particularly, the left hand and right hand octave sets 260*a-c* and 260*d-f* may be mirror images of each other. For example, the octaves may be split between right and left hand octaves, wherein the first set of octaves may be demarcated by a first color, which is the same color for both right and left hand octaves of the first octave, the second set of octaves may be demarcated by a second color, which is the same color for both right and left hand second set of octaves, and the third set of octaves may be demarcated by a third color, which is the same color for both right and left hand octaves. More particularly, in one embodiment, as depicted in FIG. 4B, the first set of octaves 260*a* and 260*d* may be demarcated by a red color, the second set of octaves 260*b* and 260*e* may be demarcated by a green color, and a third set of octaves 260*c* and 260*f* may be demarcated by a blue color.

Accordingly, because the notes of different octaves may be played by the different hands, e.g., the left and right hands, in various instances, as can be seen with respect to FIG. 5A, the tablature 102 of the present disclosure may include a representation of a left 170*a* and/or right hand 170*b*, which may be positioned on the substrate 100 with respect to the template 110/210 in such a manner so as to indicate that the notes 114 and/or 119 of a particular octave 160/260 are to be played by the fingers of that right or left hand 170. In such an instance, the fingers of the left 170*a* and right 170*b* hand may be individually demarcated with a symbol, such as a number, and the individual notes 114/119 and or keys of the piano 240/250 may be demarcated with a corresponding symbol, e.g., number, so as to indicate with which finger each note or key is to be played. For instance, in various embodiments, the fingers of the left hand may be demarcated with the numbers 1, 2, 3, 4, and/or 5, and the fingers of the right hand may be demarcated with the numbers 1', 2', 3', 4', and/or 5', and the like, such as where the color of the numbers for the fingers of the left hand 170*a* may be demarcated in one color, and the numbers for the fingers of right hand 170*b* may be demarcated in a different color, or by some other differential marking system. Likewise, the symbols representing the notes 114/119 to be played may also be demarcated with a corresponding number and/or color scheme so as together to indicate which fingers of which hands 170 play which individual notes 114/119 of which individual octaves 260.

Figure 5B:
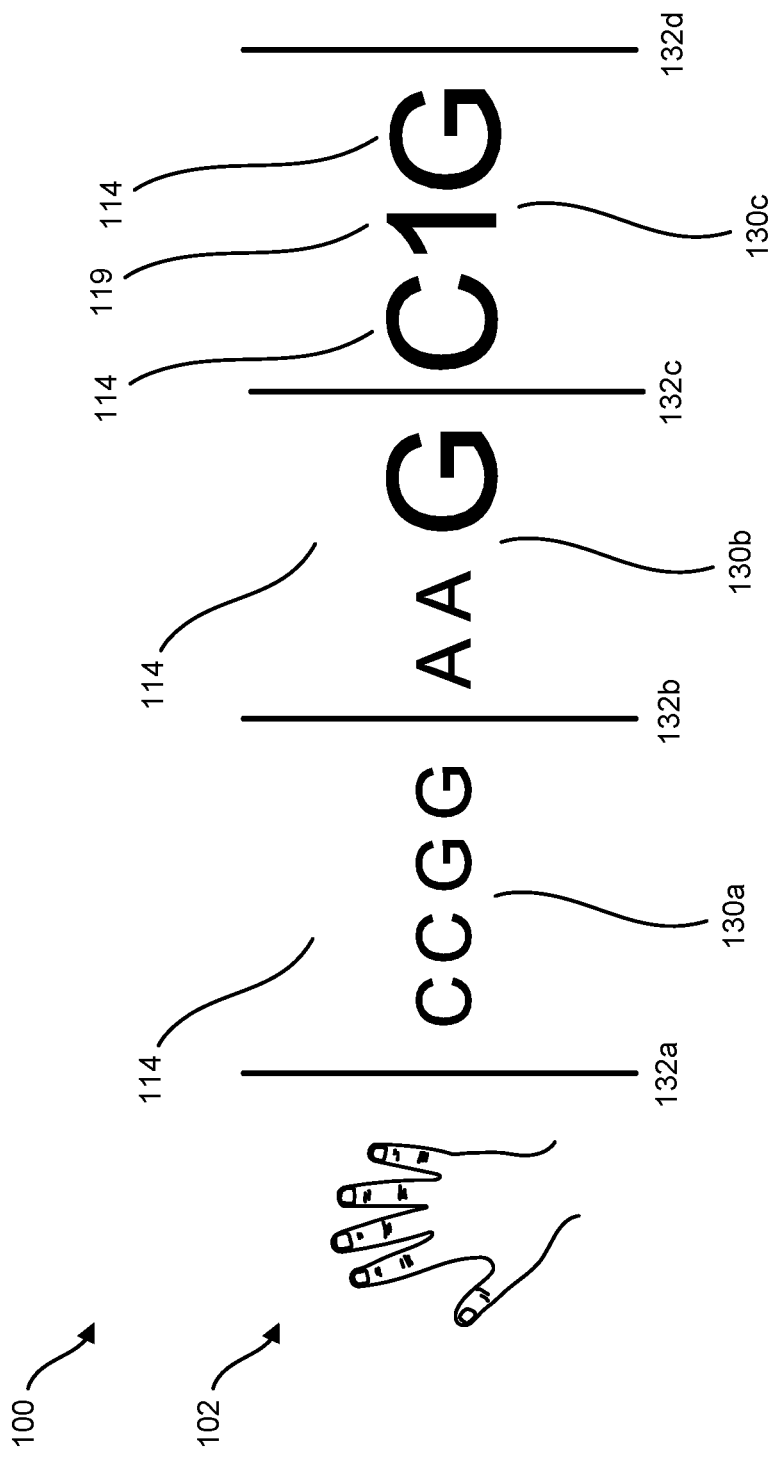
FIG. 5B sets forth a representative template of the disclosure including various symbols for indicating how a given composition is to be played.

More particularly, as can be seen with respect to FIG. 5B, a substrate 100 having an exemplary template 102 for notating, composing, reading, and/or playing music is provided. The template 102 is configured for receiving the musical symbols 114/119 employed herein as one or more compositional and/or note designators. Accordingly, in various instances, the template 103 includes a plurality of sets of parallel bar lines 132*a-d*. In this instance, the first set of bar lines 132 may be represented by a plurality of lines 132*a*, 132*b*, 132*c*, and 132*d*, where the various bar lines 132 are separated one from the other by spaces 130*a*, 130*b*, and 130*c*, respectively. A second set of bar lines 133 may also be represented, such as below the first set of bar lines 132 by a plurality of lines 133*a*, 133*b*, 133*c*, and 133*d*, where the various bar lines 133 are separated one from the other by spaces 131*a*, 131*b*, and 131*c*, respectively. The length of the various spaces 130/131 between the various parallel bar lines may be configured so as to demarcate the measure for the composition to be played. Hence, a plurality of measures 130/131 are provided, where each measure 130/131, in this instance, is the same length, e.g., the length of the space between each set of bar lines 132/133 is the same. Within the measures 130/131 of each set of bar lines 132 and 133 one or more symbols 114/119 are notated, where each symbol represents a note to be played on an instrument and/or sung.

As seen with respect to FIG. 5B, the first set of bar lines 132 is positioned above the second set of bar lines 133. Additionally, to the left hand side of each initial bar line 132a and 133a of the first and second set of bar lines 132 and 133, respectively, is positioned a symbol, such as of a hand 170. For instance, in front of bar line 132a is a right hand 170b, indicating that the various notes 114/119 set forth within the spaces 130 between the various bar lines 132 of the first set of bar lines are meant to be played by the right hand. And in front of bar line 133a is a left hand 170a, indicating that the various notes 114/119 set forth in the spaces 131 between the various bar lines 133 of the second set of bar lines are meant to be played by the left hand. In a manner such as this, the template 102 may be used to indicate which notes of the composition are to be played with the right hand 170b, such as representing the melody line of the composition, as set forth between the first set of bar lines 132, and which notes of the composition are to be played with the left hand 170a, such as representing an embellishment of the composition, as set forth between the second set of bar lines 133. Furthermore, as noted above, where desired, one or more of the fingers of the left and/or right hands 170a and 170b and/or the notes 114/119 notated within the tablature 102 may include a further symbol, such as a number, so as to indicate with which finger of which hand 170 the corresponding note 114/119 on an instrument 1000 is to be played.

As indicated above, the composing and playing of music is an important aspect of cultural development and personal growth and enjoyment. As known in the art, there are two major types of musical instruments: acoustic and electric. Acoustic instruments are those that are configured for producing tones in the harmonic range of a scale, such as by the vibrations of plucked strings or the air passing through a tube of varying lengths. These vibrations occur at particular frequencies that can be experienced as tonal or a tonal. As described above, tonal pitches are harmonic and form a scale, which scale can be broken down into sets of octaves, where each octave includes eight tonal pitches. Electrical instruments, on the other hand, produce sounds indicative of the natural pitches through an electronic sound generating and/or amplification device that electronically mimics the frequencies of the same pitches produced by the acoustic instruments. Particularly, where acoustic instruments produce notes naturally through the vibrations caused by mechanical motions, such as a string vibrating according to a particular frequency, electrical instruments generate sounds electronically through impulses and/or digital representations that produce tones that correspond to the natural pitches of the scale.

More particularly, acoustic instruments, such as the piano or guitar, produce vibrations when mechanical implements, such as hammers or the fingers of the hand, impact or pluck strings of varying weights and/or lengths. This applies for other such stringed instruments such as the bass, the violin, the cello, and the like. Likewise, for wind instruments, such as the flute, the trumpet, and the like, vibrations are caused by wind passing through a tubular element having various openings along its length through which air blown air may pass. Such openings may be closed by various mechanical implements, such as keys and/or the fingers of the hand, such that the length of the tubular element may be varied, such as by the pressing of keys that open up or close the holes through which the air passes in a manner so as to cause vibrations and consequently tones corresponding to the pitches of a musical scale to be sounded. Even the electronic instruments mentioned above generate sounds in response to such mechanical motions. However, in such instances, the keys depressed or the strings plucked generate acoustic, electronic, and/or digital signals that correspond to the natural pitch sounds that are produced by the playing of the corresponding acoustic instruments, and hence, in many instances, the electrical instrument amplifies or otherwise generates tones equivalent to the notes of the acoustic instruments.

However, in order for the sounds generated by the musical instrument to be harmonic, the mechanical actions that result in those sounds being produced or otherwise generated in such a manner that they correspond to the notes of the musical scale being played by the instrument, or its components, need to be performed in a specific order within a certain timing and in accordance with a determined set of durations. This is what sets the rhythm, the beat, and the structure within which the given pitches of a composition are to be sounded, such as in the production of the music composed. Accordingly, once a musical composition has been notated, such as set forth herein, in order to play the music of the piece on an instrument, the notated composition must be interpreted by the player, who then must perform the mechanical actions necessary to manipulate the instrument and its component parts so as to produce the musical pitches in such a manner that the sounds so generated correspond to the musical notes notated in the composition.

In the archaic system, however, as noted above, the musician must interpret the music, through learning and memory, and must further remember how to manipulate the instrument so as to produce the pitches that correspond to the notated notes. This makes the playing of composed music both extremely difficult, and formulaic, resulting in compositions that are a mere parroting of the notated piece without innovation or even flourish. Therefore, as a further means of simplifying and innovating the playing of music, the present disclosure herein provides, devices, systems, and methods of using the same so as to produce music by the manipulating of innovatively designed instruments in a manner that is easier, more intuitive, and entertaining to play than is heretofore known in the art.

Figure 6A:
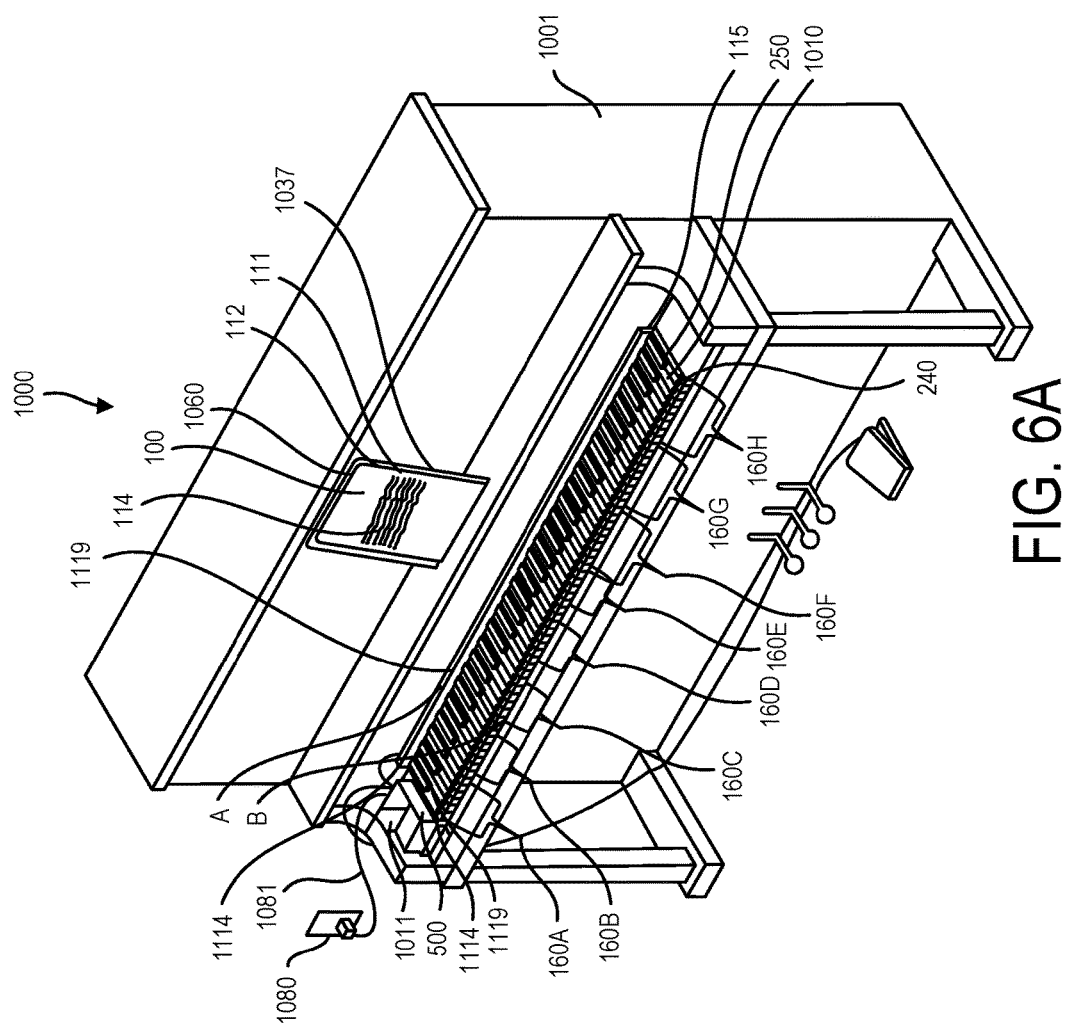
FIG. 6A shows an acoustic piano embodiment of an instrument as described in the specification.

For instance, FIG. 6A provides an exemplary embodiment of an instrument 1000, in this instance, an acoustic piano, of the disclosure. The piano 1000 includes a housing 1001. The housing 1001 houses the components of the musical instrument, which in the case of an acoustic piano 1000, includes a set of strings, a set of hammers (not shown), for plucking or otherwise impacting the strings, so as to make sounds, which sounds form pitches that can be organized into the Western Musical Scale as notes, and a set of keys 240/250 for operating the hammers. The strings are tensioned and of varying weights and lengths, where each string when plucked by its corresponding hammer, sounds a different pitch or note in the scale, as set forth above.

Particularly, the piano 1000 includes a keyboard 1010 having a set of keys, such as white keys 240 and black keys 250. Each key is mechanically configured such that when it is depressed a hammer is activated in a manner sufficient to pluck or impact a given string. Such impacting in turn results in the string being vibrated at a frequency that is in part determined by the length and weight of the string, and as such the vibrating produces a sound, e.g., a pitch, that may be finely tuned and arranged into scales, for instance, by grouping the strings of the piano 1000 into various orders of set sizes, weights, and/or lengths. In this manner, the sets of strings may be arranged so as to form sets of ascending pitches that in turn are arranged into sets of octaves 160.

Likewise, the keys 240/250 that make up the keyboard 1010 of the piano 1000 are arranged in similar fashion such that when they are depressed they result in activating an associated hammer that then strikes a corresponding string thus causing the string to vibrate at a particular frequency and thereby sounding a note of a given pitch. As the strings are arranged so as to form sets of ascending pitches of octaves, the keys that are associated with those strings may also be arranged so as to form sets of octaves 160. Hence, the sets of keys 240/250 along the keyboard 1010, when depressed in order, e.g., from left to right, result in the production of sounds that are harmonic in nature and raise in tone in accordance with a scale of pitches as one performs the mechanical actions required to depress the keys 240/250 of the keyboard 1010, thus activating the corresponding hammers that then strike their associated strings. The scale will rise upwards in pitch as one manipulates the keys 240/250 from left to right, and will fall downwards in pitch as one manipulates the keys 240/250 from right to left.

Accordingly, the keys 240/250 of the keyboard 1010 of the piano 1000 are configured so as to produce harmonic sounds in a chromatic scale in sets of octaves 160 where each octave 160 includes twelve (12) tones, e.g., seven (7) whole tones sounded by the white keys 240a-g, and five (5) semi tones sounded by the black keys 250a-e, that when manipulated one after the other rise in pitch. As indicated above, each tone may be represented by notes 114/119, which notes in turn may be represented by note indicators 1114/1119, such as an alphanumeric figure, e.g., A, B, C, D, E, F, and G, or 1, 2, 3, 4, and 5, as described herein, so as to indicate the pitch of a particular frequency that will be sounded when that representative note 114/119 is sounded, such as when the given key 240/250 of the keyboard 1010 is manipulated in a manner so as to cause the associated hammer to strike the attendant string and thus produce the corresponding vibratory sound, e.g., pitch, which as indicated may be demarcated by note indicators 1114/1119 that are designated with the alphanumeric figures A, B, C, D, E, F, and G, or 1, 2, 3, 4, and 5. Each key 240/250, and its attendant hammer and string, of the piano 1000 may be tuned such that when manipulated in a precise manner results in the sounding of pitches that accord to harmonic scales, which scales may be arranged within the piano 1000 in an ascending, or descending, order, thereby allowing one to know beforehand what particular key 240/250 needs to be manipulated in order to play a given note 114/119 thereby producing a pitch having the precise frequency of vibration to be sounded when desired.

Figure 6B:
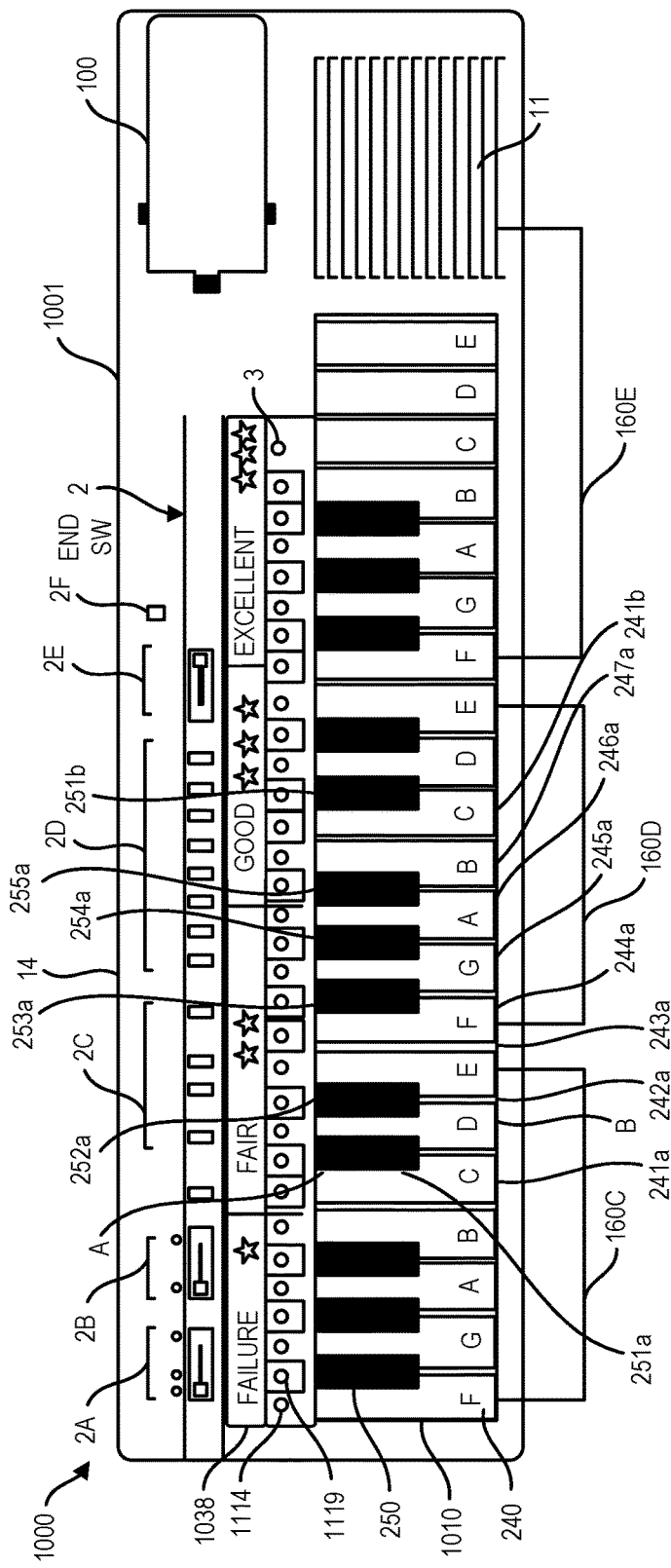
FIG. 6B shows an electronic keyboard embodiment of an instrument as described in the specification.

More particularly, as indicated in FIG. 6B, representative of an electronic keyboard of the disclosure, white key 241a may be configured such that when it is depressed or otherwise manipulated it results in a string being vibrated at a particular frequency, e.g., 261.1 Hz, which in turn results in the sounding of a tone or note having a particular pitch, which pitch may be represented by the alphanumeric symbol "C", and may therefore be demarcated as a "C" note (a middle "C" in this instance, or $C_4$). Likewise, white key 242a may be configured such that when it is manipulated it results in the sounding of a tonal note having a particular pitch, e.g., 293.7 Hz, that may be represented as a "D" or more particularly a $D_4$ note. White key 243a may be configured such that sounds a tone note having a particular pitch e.g., 329.6 Hz, that may be represented as an "E" or more particularly an $E_4$ note. In like manner, white key 244a may representative of a "F" or a $F_4$ note having a pitch of 349.2 Hz, white key 245a may be representative of a "G" or a $G_4$ note having a pitch of 391.9 Hz, white key 246a may representative of an "A" or $A_4$ note having a pitch of 440 Hz, white key 247a may representative of a "B" or $B_4$ note having a pitch of 493.9 Hz, and white key 241b may be representative of a "C" or $C_5$ note of the next octave 260b having a pitch of 523.3 Hz, which then begins the next scale that repeats itself in ascending frequencies.

Further, the individual black keys 250 of the piano keyboard 1010 may be adapted in a like manner so that when black key 251a is depressed or otherwise manipulated, it results in a string being vibrated at a particular frequency, which in turn results in the sounding of a semitone or note having a particular pitch, which pitch may be represented by a modified "C" or "D" symbol which may be demarcated as a "Csharp/Dflat" note. Likewise, black key 252a may be configured such that when manipulated, it results in a particular frequency sounding a semitone note having a particular pitch that may be represented by a modified "D" or "E" symbol that may be demarcated as a "Dsharp/Eflat" note. In like manner, black key 253a may be configured that when manipulated it results in sounding a semitone that may be represented by a modified "F" or "G" symbol that may be demarcated as a "Fsharp/Gflat" note. Black key 254a may be configured so that it results in the sounding of a note that may be represented by a modified "G" or "A" symbol that may be demarcated as a "Gsharp/Aflat" note. And black key 255a may be configured so that it results in the sounding of a note that may be represented by a modified "A" or "B" symbol demarcated as an "Asharp/Bflat" note. As illustrated in FIG. 6A, the keyboard 1010 includes keys representing seven octaves of notes 260a-g, where each octave 260 includes the 8 whole, natural tone notes, 241-247a-h, capable of sounding pitches A through G, as well as the five additional half notes or semi-tones, 251-255a-h, which include the sharps and flats of the natural notes.

Accordingly, because the instrument 1000, e.g., piano, is configured such that the manipulating of a particular key 240/250 within the instrument results in the sounding of a particular note 114/119 that corresponds to a particular pitch within a scale of pitches, music that has been notated, as in FIG. 2 as herein described, may be employed as an instruction manual so as to instruct a musical performer as to what keys 240/250 of the keyboard 1010 of the piano 1000 need to be manipulated, when, how long, and in what order and/or with what pressure so as to perform the mechanical actions necessary to execute a particular musical composition 100 that has been composed and/or notated, as described herein. It is to be understood that although the above has been described with reference to the configuration of an acoustic piano 1000 and the general mechanical actions that need to be performed in order to play the piano, the same general principles apply to the configuration and playing of an electronic keyboard and/or acoustic or electric guitars, other string, and/or wind instruments, such as the flute.

However, as described above, the archaic notation system as presently employed (see FIG. 1) is confusing to use, difficult to interpret, and lacks intuitiveness in that it does not relate a given pitch to be sounded with the particular key that needs to be manipulated or other mechanical action that needs to take place in order for the notated sound to be produced, such as when trying to play a musical piece that has been composed and/or notated. In one aspect, the presently described notation and/system 1, as set forth in FIG. 5B, simplifies the difficulties of the prior art and makes the reading and interpreting of a musical composition easier and more intuitive. Additionally, in a further aspect, the present devices, systems, and their methods of use also make the playing of musical instruments, e.g., 1000, easier, more intuitive, fun, and creative in that the instruments, as herein presented, are configured so as to relate the notes 114/119, as notated in the particular composition 100 to be played, with the mechanical implementations that need to be carried out on the particular instrument 1000 to be played, so as to sound the corresponding pitches as notated within the musical composition 100.

Particularly, in one embodiment, the musical instruments 1000 as herein employed may be configured so as include note indicators 1114/1119 that may be used to indicate which key or string 240/250 of the musical instrument 1000 needs to be manipulated in order to sound the pitch notated in a particular musical composition 100 to be played. Additionally, these note indicators 1114/1119 may be configured so as to indicate in what order the keys 240/250 are to be played and/or for how long they are to be played. For instance, as set forth with respect to FIG. 6A, the housing 1001 and/or keys 240/250 of the instrument 1000, e.g., piano, may be configured to include one or more note indicators 1114/1119, which indicators are configured for demarcating which key 240/250 of the keyboard 1010 of the piano 1000 needs to be manipulated, e.g., depressed, so as to produce a sound, e.g., a vibratory emanation, which resonates within a particular pitch range that corresponds to the particular note, e.g., note designator 114/119, of the octave 260 of the scale to be played, such as notated within the musical composition 100.

As set forth herein, the note indicator 1114/1119 of the instrument 1000 may be any suitable indicator for indicating a note 114/119 representative of the pitch to be sounded by playing that note, but in particular instances, may be an alphanumeric figure A, B, C, D, E, F, and G; a 1, 2, 3, 4, and 5; and the like, as well as cartoons, images, and/or avatars representative of the same. Such note indicators 1114/1119 may be present on or within the housing 1001 of the instrument 1000, on the keyboard 1010 (or fret board), and/or on the actual keys and/or strings 240/250 of the instrument. The note indicators 1114 and 1119 may be visual, mechanical, and/or electronic, and may be configured for indicating which key or string 240/250 or sequence of keys or strings are to be played, when, in what order, at what time, and/or for how long.

For example, the piano 1000 may include mechanical indicators 1114 and/or 1119, which indicators may have any suitable configuration so long as they are capable of indicating what key 240/250 of the keyboard 1010 of the piano 1000, when appropriately manipulated, corresponds to what particular pitch of the musical scale is sounded when that key or string 240/250 is manipulated. Such mechanical indicators 1114/1119 may include stickers, films, paint, ink, dye, engravings, raised or sunken elements, and the like. In various embodiments, the indicators 1114/1119 may be visual, more particularly, they may be a visual representation that is displayed or otherwise projected onto the keys 240/250 or other portion of the keyboard 1010 or housing 1001 of the piano. In various other embodiments, the indicators 1114/1119 may be electronic. For instance, the indicators 1114/1119 may be or at least include one or more lighting elements, vibratory elements, sound emitting elements, thermal, e.g., heating or cooling, elements, and the like.

Particularly, where the indicators 1114 and/or 1119 are lighting elements, the lighting elements may be any form of electrical elements that are capable of emitting electromagnetic radiation in the infrared, visible, and/or ultra-violet spectrum. In such an instance, the lighting element may be configured so as to emit a light wave of a particular wavelength, such as to emit a specific color of light, such as red, orange, yellow, green, blue, indigo, or violet, or the like. Additionally, the note indicator 1114/1119 may be configured so as to indicate when the note is to be played, at what time, and/or for how long, such as by modulating the sequence and/or length of time and/or intensity during which the various different indicating, e.g., lighting elements, are lit up.

The note indicators 1114/1119 may be positioned on the piano 1000, such as on the housing 1001, keyboard or fretboard 1010, and/or the keys or strings 240 and/or 250 thereof, such as by attachment thereto, or in certain embodiments, the indicators 1114/1119 may be physically integrated within or otherwise coupled with the instrument 1000 or its component parts. For instance, the indicators 1114/1119 may be attachments configured to attach, adhere to, or otherwise be coupled to the instrument 1000 or its component parts, such as with a suitable adhesive, or they may be printed, screened, airbrushed, painted, inked, projected, displayed, or otherwise written upon the instrument or its component parts. In some instances, the indicators 1114/1119 may be incorporated within the instrument 1000 or its component parts such as by engraving, molding, manufacturing, die-casting, and the like. For example, where the indicators 1114/1119 are electronic, the indicator and/or its component parts may be lighting elements that may be attached to the keys 240/250 of the piano, or they may be physically integrated within the housing 1001 or other component parts of the instrument 1000, such as in the keys 240/250 of the instrument, such as at the time of manufacture. In particular instances, the lighting element 1114/1119 may be a projection, such as from a projecting device, which projection or hologram may be projected upon the keys 240/250, keyboard 1010, housing 1001, and/or other part of the instrument 1000.

In some instances, the indicators 1114/1119 may be added to the instrument 1000 or its component parts subsequent to manufacture, but may be designed to be fitted or attached to the instrument or may be made to replace component parts that have previously been fitted to the instrument. In particular instances, a kit may be provided, such as a kit containing indicator stickers, or a kit containing replacement keys or strings 240/250, see FIG. 6C, such as having indicator elements and/or electronic elements 1114/1119 therewith, that may then be fitted onto the instrument 1000 and/or to replace elements previously fitted thereon. In certain embodiments, a map for retrofitting or otherwise converting the instrument 1000, e.g., piano, or components thereof, e.g., keys 240/250, so as to include the indicators 1114/1119 herein described may be provided. Such conversion of an existing instrument into an indicating instrument 1000 of the disclosure may be accomplished merely by adding the indicator 1114/1119 to the component, such as by applying sufficient attachment force thereto, or may be effectuated by replacing the original component, e.g., a key 240/250, with the sufficiently configured retrofitable keys and/or strings and/or hammers containing the indicator elements 1114/1119. Where a map or other instructions are provided, the map may be adapted to show where and how, e.g., instructions, the retrofitting process is to be accomplished.

As indicated above, in various instances, the indicating element 1114/1119 may be an electrical element, such as a lighting element. As such, the lighting element of the electronic indicator 1114/1119 may be in a particular shape and/or size and positioned on the instrument 1000 or its component part(s) so as to clearly indicate the pitch of the note that will be sounded by manipulating the given key 240/250 of the piano having or otherwise displaying that note indicator 1114/1119. For instance, the note indicator 1114/1119 may be a lighting or other displayable element that is in the form of an alphanumeric note symbol 114/119, such as an A, B, C, D, E, F, and/or G, or a 1, 2, 3, 4, and/or 5, or other suitable symbol, cartoon, or avatar that is capable of lighting up or otherwise emitting an electromagnetic radiation that indicates that by the manipulation of the indicated key or string 240/250 a note of the corresponding pitch will be sounded.

Figure 6C:
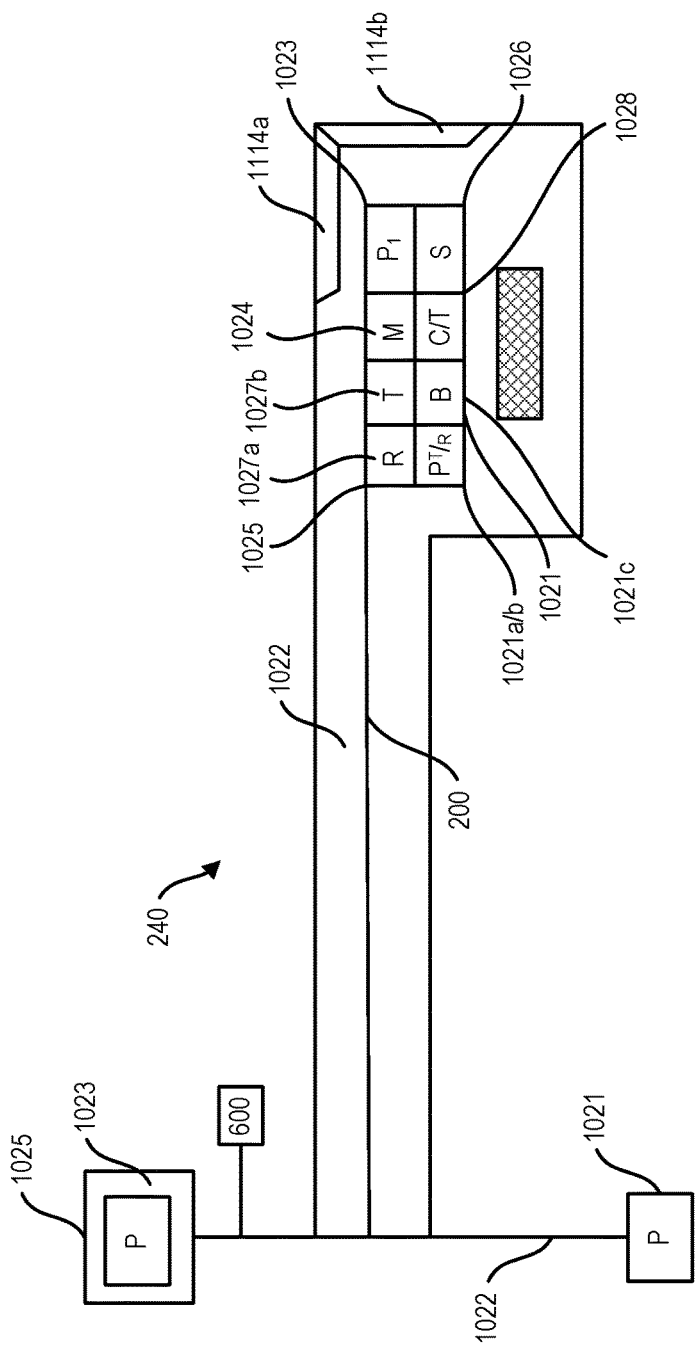
FIG. 6C shows an embodiment of a key for a keyboard as described in the specification.

For instance, as can be seen with respect to FIG. 6C, a key 240 of a keyboard 1010 of a piano 1000 is presented. The key 240 includes an indicating element 1114, which in this instance may be configured as a lighting element. In various instances, the lighting element 1114 may be configured so as to produce a light of a particular color, of a particular hue, in a particular shape, having a particular size, all of which may take place over a predetermined period of time. For example, in various embodiments, the instrument 1000 may include keys and/or strings 240/250 wherein one or more, e.g., each, of the keys and/or strings include lighting elements 1114/1119 that are configured for lighting up while the instrument 1000 is being played so as to indicate what pitch will be sounded when a particular key or string 240/250 is manipulated.

Particularly, as herein described, the notated music 100 may include note designators 114/119 that correspond to various pitches that are to be sounded by the instrument 1000 when playing a musical composition. Likewise, the actual keys and/or strings 240/250 of the instrument 1000 that are to be manipulated so as to sound a note of that particular pitch may also include note indicators 1114/1119, such as lighting elements, that light up or otherwise indicate the pitch of the note that is sounded when that key or string is manipulated. Hence, the actual keys and/or strings 240/250 of the instrument 1000 and/or the instrument itself may include note designators 1114/1119 that display the identity of the pitch of the note 114/119 that is sounded when that key and/or string 240/250 is manipulated.

For example, an instrument of the disclosure, such as a piano, may include a key 240/250 having a note indicator therein that is configured as a lighting element 1114, and may further include one or more of: a power supply 1021, a connector element 1022, a control element 1023, a memory 1024, a sensor 1026, a communications module 1027 (including a receiver 1027a and a transmitter 1027b), a clock 1028, and the like. For instance, the key 240 may include one or more, e.g., two, lighting elements 1114. In this instance, the key 240 may include a first lighting element 1114a, such as is positioned on a surface of the key 240, such as on the top proximal surface of the key 240, and the key may further include one or more additional lighting elements, such as 1114b that may be positioned on the front side surface of the key, although only one lighting element need be present and they may be in different positions and/or configurations on or within the key 240.

The indicating element 1114, in this instance, may be any form of electrical element capable of emitting electromagnetic radiation, such as in the form of light, such as visible light. Particularly, in certain instances, the lighting element 1114 may be an incandescent, fluorescent, or halogen bulb, a diode, an LED, OLED, or other form of element capable of producing electromagnetic radiation, such as in the form of light, such as a white or colored light. Hence, in certain instances, the light emitting element 1114 may be one or more white lights or colored lights, such as where the lighting element may be configured for emitting light that is visible as a color, such as red, orange, yellow, green, blue, indigo, violet, or mixtures of the same. More particularly, the one or more lighting elements 1114 may be configured so as to illuminate diodes and/or lights of the same general colors, but which may be of different hues, diodes and/or lights of different colors, and/or diodes and/or lights that may be white light that is colored by use of different filters, screens, and the like. In some embodiments, the colors, shadings, and/or hues of the light emitting elements 1114 of the key 240 of the instrument 1000 may be configured to go from lighter to darker, or from different intensities, such as across an octave 260 or series of octaves 260a-h, such as from the left hand to the right hand side along the keyboard 1010 of a piano 1000. In certain instances, the key 240 may include a lighting element 1114 that includes a display system, such as a display screen, for instance, a liquid crystal display (LCD), light emitting diode (LED) display, plasma display, or the like. In some instances, the lighting element 1114 may be a projection, from a projector that projects an image of a note indicator 1114/1119 on to the key 240.

In various instances, the key 240 may include or otherwise be associated with a power supply 1021, which power supply may be configured for supplying power to the lighting element 1114 and/or other components of the instrument 1000. The power supply 1021 may be internal to the key 240 or may be remote from the key but connected to the lighting element 1114 therein via a suitable power carrying connection element 1022. In various instances, this connection may be accomplished through suitable wiring, or may be accomplished wirelessly. When configured for wireless power transmission, the power supply 1021 may include a plurality of elements, such as a power transmitter 1021a, configured for transmitting power wirelessly, and a power receiver 1021b capable of receiving and/or storing power, such as from a wireless power transmitter 1021a, such as in accordance with known transmission standards such as A4WP, PMA, Qi, and the like. In various embodiments, the key 240 may be configured for generating power capable of being stored such as through movement, and therefore may include a power generating mechanism 1021c.

Generally, the lighting element 1114 within key and or keys 240/250, and/or other components of the instrument 1000 that are operated via an energy source may have a battery 1021, which battery may be configured for being charged via induction and/or in accordance with one of the wireless charging standards set forth above. For example, the key 240 may include a wireless power receiver 1021b that is adapted for receiving a charge over a distance from a power transmitter 1021a (not shown). In such an instance, the power transmitter 1021a and receiver 1021b may include magnetic coils and/or antennas that are tuned together so as to transmit and receive an electrical and/or magnetic field that induces a current that may be used to charge the associated battery 1021.

Particularly, the key 240 may be configured for being coupled to a power transmitter 1021a that is adapted for receiving a voltage and converting the received voltage into a high frequency alternating current that may be transmitted via a suitably configured transmitter circuit that is coupled to a transmitter coil. Such alternating current flowing through the transmitter coil generates a magnetic field that is received by the receiver coil of the key 240, thereby generating a corresponding current within the receiver coil that may then be converted into direct current via a suitable transformer and stored as energy within the battery 1021, thereby recharging the battery of the key 240. In various instances, the coils, e.g., 1021c, may be configured to resonate and/or oscillate in response to one another, e.g., at the same or similar frequency, such as through magnetic resonance whereby wireless charging over longer distances may be achieved.

Hence, a power store 1021 may be present within the key 240 and may be connected to the lighting element 1114 so as to provide energy thereto. In various instances, the energy source 1021 that may be any suitable source of energy, such as: a battery, such as Lithium Cadmium or Zinc Manganese battery, or a rechargeable battery, such as is capable of being recharged through one or more of a wired or wireless connection 1022. Where the battery 1021 is rechargeable, the battery may be configured for being recharged via connection to a wired power source, or wirelessly such as through induction, through motion, such as through the movement of the key 240 itself, through friction and/or heat, e.g., caused by the finger(s), through light or solar energy, e.g., through solar panel 1021c, trickle charging, and the like. Hence, the various keys 240/250 of the instrument 1000 may include a power storage unit 1021 that may include an antenna or other coil or solar panel configured for generating power, e.g., 1021c, such as through movement and/or induction and/or from solar energy. Consequently, the key and/or string 240/250 of the instrument 1000 may be directly or indirectly connected or otherwise associated with a power supply, such as a battery 1021, that is configured for being recharged through induction, solar power, thermal energy, motion, friction, or other form of wired or wireless charging.

Figure 6D:
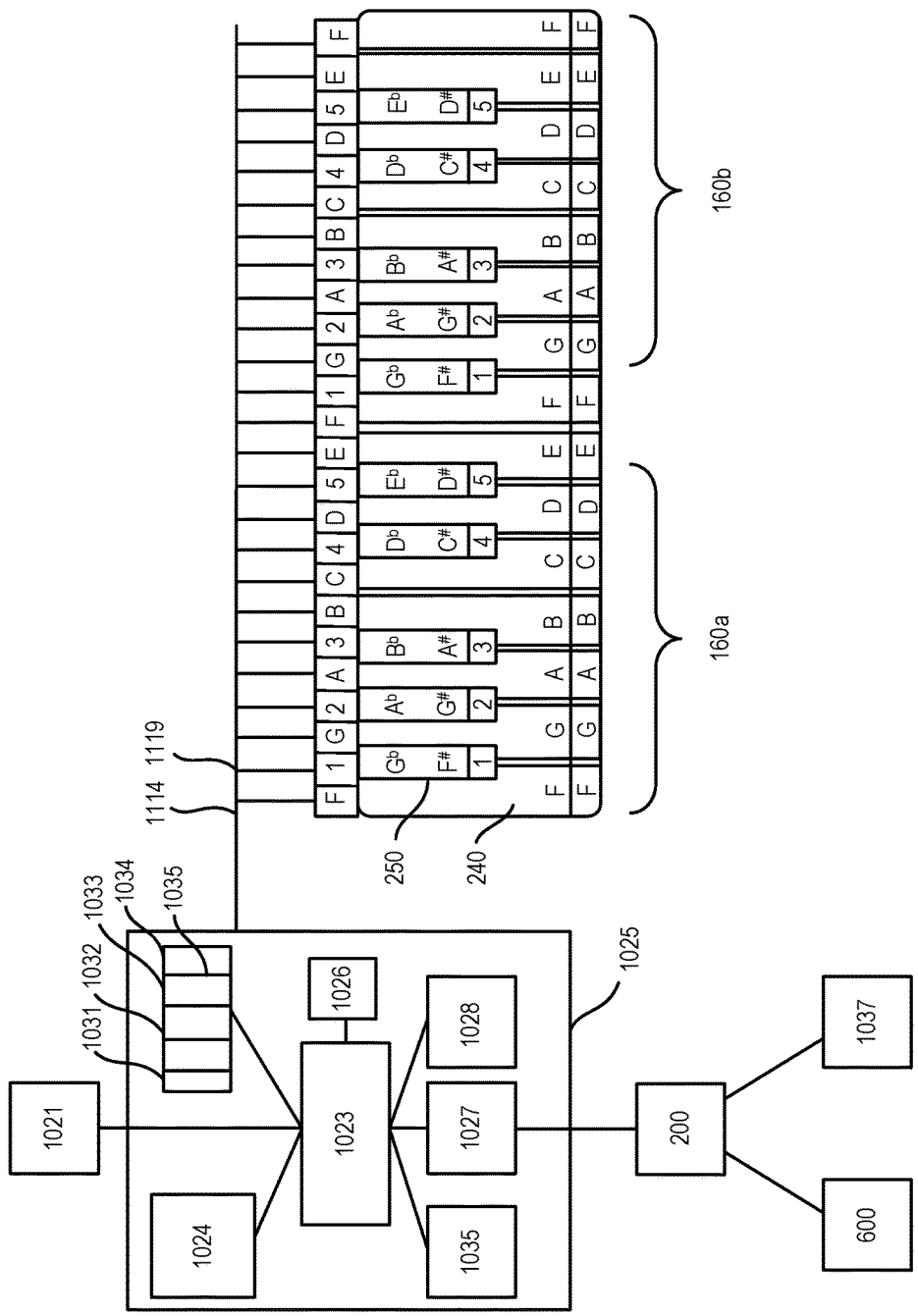
FIG. 6D shows an embodiment of an instrument keyboard using keys as represented in FIG. 6C.

In various embodiments, the instrument 1000 and/or one or more keys 240/250 thereof may include a control element 1023, such as for controlling the functioning of the one or more indicating elements 1114/1119 and/or other controllable elements of instrument 1000 of the disclosure. For instance, a keyboard 1010 and/or key 240/250 of the instrument 1000 may include a control element, such as an integrated circuit, such as an integrated circuit configured as a central processing unit (CPU) 1023. For example, as depicted in FIGS. 6C and 6D, an instrument 1000 and/or key 240 of the instrument 1000 may include a CPU that is configured as a microprocessor 1023. Particularly, in various embodiments, the key 240 may include a circuit board 1025 that contains a microprocessor that may be a microchip 1023, which microchip may be configured for performing various processing functions such as related to receiving inputs, such as music and/or other sensory data, compiling said data, receiving and/or executing instructions, and/or controlling one or more output processes. More particularly, the microchip 1023 may be configured for controlling of the functioning of one or more indicating elements 1114/1119, such as within the key 240 or other component of the instrument 1000, such as in response to one or more of instructions, sensory inputs, and/or other data received thereby. In some instances, the microchip 1023 may be configured for controlling the functioning of the key 240 itself, a tone produced by the manipulation of the key 240, and/or the like. In particular embodiments, the microchip may be any suitable processing unit, such as an INTEL or ARM core processing unit.

Accordingly, in various instances, the instrument 1000 and/or key 240/250 thereof may be configured so as to include a sensor 1026, such as a sensor configured for sensing or otherwise determining information related to: the pitch of a note that is actually played or otherwise sounded; the musical piece to which the given played note belongs or should belong; the positioning and/or movement of one or more keys 240/250 such as with respect to playing the given note(s) of the musical piece 100, including the velocity, acceleration, orientation, and/or pressure coincident with the manipulation of the key(s) 240; and/or for sensing which keys 240 and/or indicating elements 1014/1019 are being or should be manipulated, when, in what order, and for how long, such as in the process of playing the piece as it has been notated as described herein. Hence, in various instances, the sensor may be configured for sensing the musical elements of a composition 100 to be played, determining the functioning of one or more controllable elements, such as lighting elements 1114/1119, and sensing whether or not the notes actually being played accord with the musical composition 100 as notated and/or indicated on the keyboard 1010.

Additionally, the instrument 1000 and/or key 240 thereof may include a memory 1024, such as within the circuit board 1025, such as for storing data and/or instructions, such as music data, play data, indicator data, sensory data, and the like. Hence, the memory 1024 may include music data regarding music 100 that has been notated and is to be played, the compositional and/or mechanical elements that make up that music, and exemplary and/or executable files that model the music as well as actual play and/or sound data that may be stored and then compared to the model data, so as to allow the processor to determine how accurately a given piece is played as compared to a model piece, such as from a mechanical and/or sensed data field. Accordingly, the memory 1024 may be operably connected to the microprocessor 1023 and/or sensor 1026. In certain instances, the memory may be any suitable memory, such as a ROM, RAM, DRAM, FRAM, NAND, flash and/or the like.

In various embodiments, the instrument 1000 and/or key 240 thereof may be configured so as to include a communications module 1027 and/or an input/output for communicating with the circuit board 1025 and/or a microchip 1023 and/or memory 1024 thereof. Hence, in certain embodiments, the key 240 and/or the instrument 1000 itself may be configured for communicating with an outside and/or third party agent, such as over an associated network, such as in a wired or wireless network configuration. For example, the key 240 may include or otherwise be associated with a communications module 1027 that may include a receiver and/or a transmitter.

Particularly, the communications module 1027 may include a receiver 1027a configured for receiving data, such as music composition data, indicator configuration and control data, key position and/or movement data, instructional data related to the manipulating of one or more keys 240/250 of the instrument 1000, such as with respect to which of the given indicator elements, e.g., lighting elements 1114/1119, are to be activated, e.g., lit up, for how long, when, and additionally with respect to any particular given key 240/250, the sequence in which the indicator elements are to be activated, and/or the sequence, duration, and/or pressure with which any given key 240/250 is to be manipulated. Any suitable receiver capable of receiving such data, instructions, and information and/or conveying the same, e.g., via a suitable controller, to one or more of the indicating elements 1114/1119 and/or keys 240/250 of the instrument 1000. Such data, instructions, and/or information may be conveyed or otherwise communicated via a direct wired or wireless connection.

For instance, such information may be transmitted through a wired data connection, Ethernet connection, and/or internet connection 1022. However, in certain instances, the receiver may be a wireless receiver such as a radio and/or video receiver, audio/visual receiver, or other form of receiver configured for receiving audio, visual, electronic, and/or digital and/or compressed communications signals. In various instances, the receiver may be configured for receiving and/or determining and/or tracking positioning and/or movement data. For example, in certain instances, the key 240 may include or otherwise be associated with a geo-location receiver device, e.g., a GPS or GPS-like receiver, such as in this instance for determining the relative position of the keys 240/250 of the instrument 1000 relative to one another and/or how any given key or keys should be positioned when playing a given notated compositional piece.

The communications module may include a transmitter, such as for transmitting data, instructions, and/or information, such as data related to the activation of one or more indicating elements 1114/1119 and/or the manipulating of one or more keys 240/250 of the instrument 1000, such as with respect to which of the given indicator elements, e.g., lighting elements, should be activated so as to indicate which of the given keys 240/250 should be manipulated so as to produce the appropriate pitch as notated within the composition 100 that is to be played and/or is being displayed, e.g., electronically, by a display device 1037. For instance, any suitable transmitter capable of transmitting relevant data over a wired or wireless connection may be employed, such as a CATIII, CATIV, HDMI, optical cable, and the like. In various instances, the transmitter may be configured for transmitting data in a wireless configuration, and as such a suitable transmitter may include a wireless WIFI, cellular, BLUETOOTH, BLUETOOTH LE network connection, and the like. Hence, in certain particular embodiments, the transmitter may include one or more of WIFI, BLUETOOTH, Low Energy/Smart (BLE), ANT+, RFID, IrDA, Infra-red, ZIGBEE, and the like. And in some instances, the data to be transmitted may be related to indicator 1114/1119 activation, key and/or string 240/250 manipulation, including sequence, velocity, acceleration, orientation, duration, and/or pressure data, as well as pitch generation data related to the key and/or string 240/250 manipulation, which data may be configured for being communicated or otherwise transmitted over a network 200 to a suitably networked receiving device 600, such as a third party observing and/or monitoring device, such as a computer and/or display device that monitors the playing of the instrument 1000 in correspondence to the composed tablature 100. Particularly, in certain instances, where the transmitter 1027*b* is a radio transmitter, the transmitter may be coupled to the microprocessor and configured for transmitting data, such as over an operating range from about a 2.4 to about a 2.485 GHz frequency, in some instances.

As can be seen with respect to FIG. 6D, an exemplary key 240/250, as represented in FIG. 6C, may be included along with a number of other such suitably configured keys so as to form a keyboard 1010 of an instrument 1000. Accordingly, the instrument 1000 will include a keyboard 1010, which keyboard will include keys 240 and 250. The instrument 1000 will also include indicator elements 1114/1119, which indicator elements may be configured as part of the keys 240/250, as depicted in FIGS. 6A, 6B and 6D, and/or may be configured as part of the housing 1001 and/or keyboard 1010 of the instrument 1000, as depicted in FIGS. 6A and 6B. For instance, the instrument 1000 may include a housing 1001, which housing may include a plurality of indicating elements, e.g., lighting elements 1114/1119, such as where there is at least one lighting element per key 240/250 of the keyboard 1010.

As above, the lighting element 1114/1119 of the instrument may be any form of electrical element capable of emitting electromagnetic radiation, such as an incandescent, fluorescent, or halogen bulb, a diode, an LED, OLED, or other form of electromagnetic radiation producing element, such as a white or colored light. Particularly, the lighting elements 1014/1019 positioned along the instrument 1000 proximate the keys 240/250 of the keyboard 1010 and/or on the keys 240/250 themselves, may be configured so as to illuminate lights or diodes of the same or different colors. In some embodiments, the colors, shadings, and/or hues of the light emitting elements 1114/1119 of the instrument 1000 may be configured to go from one color to another, from lighter to darker, or from different intensities or hues, such as across the housing 1001 along the keyboard 1010, such as from the left hand to the right hand side of the instrument 1000. Hence, in certain instances, the housing 1001 and/or keyboard 1010 may include lighting elements that include or may otherwise be associated with a display system 1037, such as a display screen, for instance, a liquid crystal display (LCD), light emitting diode (LED) display, plasma display, or the like. In some instances, the lighting element 11114/1119 may be a projection, from a projector that projects an image of a note designator 114/119 on to the housing 1001.

Figure 6E:
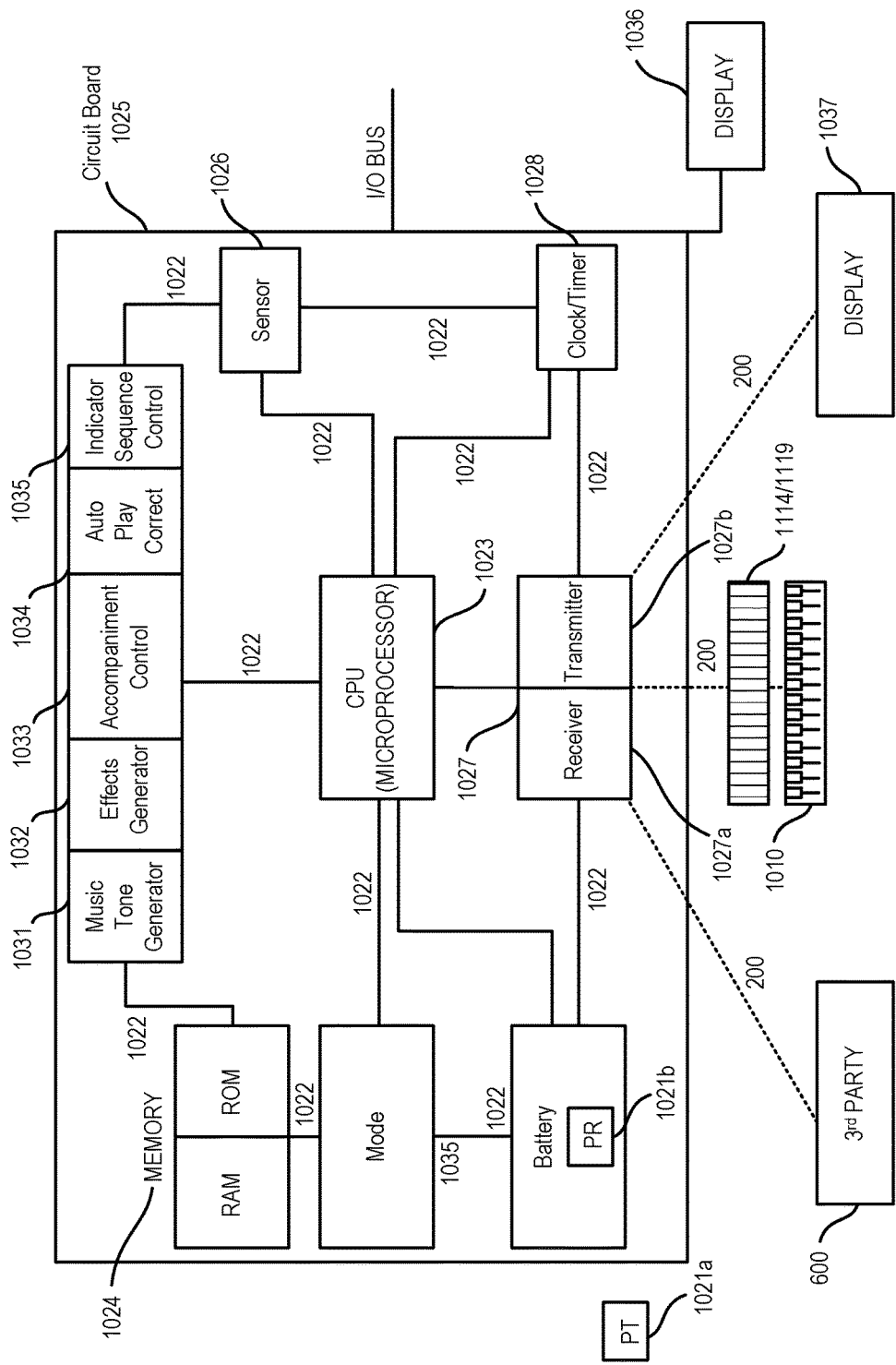
FIG. 6E shows a schematic diagram of a circuit board for an instrument as described in the specification.

Furthermore, as can be seen with respect to FIGS. 6D and 6E, the instrument 1000 itself may include one or more of: a power supply, a connector element, a control element, a memory, a sensor, a receiver, a transmitter, a clock, and the like. For instance, the housing 1001 and/or keyboard 1010 of the instrument may include or otherwise be associated with a power supply 1021 configured for supplying power to the instrument 1000, a lighting element 1020 thereof, and/or other components of the instrument. The power supply 1021 may be internal to the instrument 1000 and/or lighting element 1114/1119 and/or other component or may be remote therefrom but connected therewith via a suitable power carrying connection element 1022. In various instances, this connection may be accomplished through suitable wiring, or may be accomplished wirelessly. When configured for wireless power transmission, the power supply 1021 may include a plurality of elements, such as a power transmitter 1021*a*, e.g., external to the instrument, configured for transmitting power wirelessly, and a power receiver 1021*b*, internal to the instrument 1000, capable of receiving and/or storing power, such as from a wireless power transmitter 1021*a*, such as in accordance with known transmission standards such as A4WP, PMA, Qi, and the like.

Consequently, the instrument 1000 may be directly or indirectly connected or otherwise associated with a power supply, such as a battery 1021, that is configured for being recharged through induction, solar power, thermal energy, motion, friction, or other form of wired or wireless charging. For instance, the instrument 1000 and/or a component thereof, e.g., key 240/250, may include a wireless power receiver 1021*b* that is adapted for receiving a charge over a distance from a power transmitter 1021*a*. In such an instance, the transmitter 1021*a* and receiver 1021*b* may include magnetic coils and/or antennas that are tuned together so as to transmit and receive an electrical and/or magnetic field that induces a current that may be used to charge the associated battery.

More particularly, the instrument 1000 and/or key 240/250 may be configured for being operably coupled to a power transmitter 1021*b* that is adapted for receiving a voltage and converting the received voltage into a high frequency alternating current that may be transmitted via a suitably configured transmitter circuit that is coupled to the transmitter coil. Such alternating current flowing through the transmitter coil generates a magnetic field that is received by the receiver coil of the receiver 1021*a*, thereby generating a corresponding current within the receiver coil that may then be converted into direct current via a suitable transformer and stored as energy within the battery 1021, thereby recharging the battery of the device. In various instances, the coils may be configured to resonate and/or oscillate in response to one another, e.g., at the same or similar frequency, such as through induction and/or magnetic resonance whereby wireless charging over longer distances may be achieved.

In particular instances the controller, e.g., circuit board 1025 containing the microprocessor 1023, may be configured so as to be coupled to an input/output module. For example, a typical input device may include, but is not limited to, keyboards, touch screens or other touch-sensitive devices, such as single or multi-point resistive or capacitive trackpads, voice recognition hardware and software, optical scanners, optical pointers, digital image capture devices and associated interpretation software, a Universal Serial Bus (USB) port, Secure Digital Input Output (SD/SDIO) port, flash drive port, lightning port, pCIE, and the like. A typical output device may be a display such as a capacitive sensing control panel display. In various instances, the display may be the typical display that may be a part of the instrument or separate therefrom, such as a display of a mobile computing device, such as the display of a mobile phone and/or tablet computer, and the like. Input, such as input from a user, or a person associated with the user, may be received in any form, including, but not limited to, acoustic, speech, or tactile input. In some instances, the system may additionally include one or more displays, and/or one or more sensors.

Accordingly, in various embodiments, the instrument 1000 may include or may otherwise be associated with a control element 1023, such as for controlling the functioning of the one or more indicating elements 1114/1119, e.g., via lighting element 1020, and/or other controllable elements of instrument 1000. For instance, the instrument 1000 may include an integrated circuit, such as a central processing unit (CPU) 1023, e.g., configured as a microprocessor. Particularly, in various embodiments, the instrument 1000 may include a circuit board 1025 that contains a microprocessor 1023 that may be a microchip configured for performing various processing functions such as related to receiving inputs, such as music and/or other sensory data, compiling said data, receiving and/or executing instructions, and/or controlling one or more output processes. More particularly, the microprocessor may be a microchip 1023 that may be configured for controlling of the functioning of one or more lighting elements and/or indicating elements 1114/1119, such as within the housing 1001 or other component of the instrument 1000, such as in response to one or more of instructions, sensory inputs, and/or other data received thereby. In particular embodiments, the microchip 1023 may be any suitable processing unit, such as an INTEL or ARM core processing unit.

In various instances, the instrument 1000 may be configured to include or otherwise be associated with a sensor 1026, such as a sensor adapted for sensing or otherwise determining information related to the pitch of a note that is actually played or otherwise sounded, the musical piece to which the given played note belongs or should belong, the positioning and/or movement of one or more keys 240/250 such as with respect to playing the given note(s) of the musical piece, including the velocity, acceleration, orientation, and/or pressure coincident with the manipulation of the key(s) 240, and/or for sensing which keys 240 and/or indicating elements 1114/1119 and/or lighting elements are being or should be manipulated, when, in what order, and for how long, such as in the process of playing the piece as it has been notated as described herein. Hence, in various instances, the sensor 1026 may be configured for sensing the musical elements of a composition to be played, determining the functioning of one or more controllable elements, such as lighting 1020 and/or indicating elements 1114/1119 and/or keys 240/250, and sensing whether or not the notes actually being played accord with the musical composition as notated and/or as indicated, e.g., via indicator elements, on the keyboard 1010 as to be played.

Accordingly, a typical sensor 1026 may be any form of data collection mechanism capable of detecting a relevant characteristic such as of notated music 100 to be played, an instrument 1000 being played, and/or may further be configured for transmitting that data to the microprocessor 1023 for processing and/or transmission and/or a display 1037 such as to the player of the instrument 1000 or other third party, for instance, a teacher, a parent, or other third party associated with the playing of the instrument 1000. For example, in certain instances, the sensor 1026 may be a motion and/or orientation sensor, such as a distance measuring sensor, such as for determining the travel of a depressed key or a plucked string 240/250, a speed or acceleration sensor, e.g., an accelerometer, for example, a multi-axis accelerometer and/or gyroscope, such as for determining the acceleration resultant from the depressing of a key and/or the plucking of a string 240/250 of the instrument 1000 and/or for determining where the key or string 240/250 was struck.

In various embodiments, a motion sensor, where included, may include one or a plurality of sensors that detect instantaneous motion and/or sensors that detect velocity and/or acceleration, and the like, for measurement of short duration movements or impulses. In further instances, such a motion sensor 1026 may be one or more sensors that detect distance, speed, and/or velocity and the microprocessor, and/or the sensor hardware or software itself, may be configured to utilize that information about distances, passage of distance in relation to the passage of time, and/or the rate of such change so as to determine one or more other characteristics about motion, direction, and/or orientation of the keys and/or strings 240/250 of the instrument 1000 being played. Additionally, the instrument 1000 and/or a key and/or string 240/250 thereof may include one or more of a strain gauge, a piezoelectric sensor, optical sensor, energy sensor, and/or the like, such as for determining the movement of the keys and/or strings 240/250 of the instrument 1000 as well as the pressure applied to the keys and/or strings when manipulating them. Such sensors 1026 may be a MEMS-based, nano-scale based, piezoelectric, piezoresistive sensor, and the like.

Additionally, in various instances, the keys and/or strings 240/250 may include a sensor 1026 that may be configured so as to obtain physiological data that may be collected by the keys and/or strings 240/250 being manipulated when playing the instrument 1000. Such sensors 1026 may be embedded within the keys and/or strings 240/250 and may be configured to collect physiological data, such as data associated with a person, e.g., child or adult playing the instrument 1000, and/or his or her state of health and/or performance in the activity of playing music on the instrument. For example, the sensor 1026 may be a physiologic sensor and/or data collector, such as a temperature gauge or body thermometer, so as to measure the temperature of the player; a heart rate monitor or pulse meter, so as to measure the heart rate of the user; a blood pressure monitor, to measure the players blood pressure; a myoelectric sensor; a carbon dioxide ($CO_2$) sensor; a pulse oximeter; oxygen saturation monitors; hemoglobin sensors; an electrocardiogram; an electroencephalography monitor; and/or a pressure monitor; and the like.

In certain instances, the information captured, compiled, and/or processed by the one or more sensors 1026 and/or associated microprocessor 1023 set forth herein may be communicated to the player, such as in a visual, auditory, or tactile manner, such as via a display 1037, a graphic, a light, e.g., an LED light such as an indicator 1114/1119, light sequence, or series of lights, such as from green to yellow to red, a sounded alarm or bell, or a vibration, and the like. Further, these signals may be arranged to increase or decrease in intensity and/or frequency dependent on the results of the collected and/or compiled data, such as in response to the accuracy of playing a notated musical piece as it has been composed and/or notated. For example, the amplitude, timing, and duration of an auditory, visual, and/or tactile signals can be varied to indicate to a player or a monitor of the player the nature of the changed input.

Additionally, in various other instances, the microprocessor 1023 may be configured to operate in conjunction with the memory 1024 so as to determine whether a particular sequence of keys 240/250 being played and/or pitches being sounded are the correct notes to be played as called for by the note designators 114/119 set forth in the notated music 100. Particularly, the system may be configured for determining the information necessary for playing a given piece of music 100 as notated, and determining whether the music actually being played, e.g., the keys 240/250 being manipulated and/or the pitches being sounded, correspond to the notes of the notated music 100. For instance, the system, e.g., the memory 1024, the processor 1023, and/or other system elements, may be configured for determining the pitch of a note that is actually played or otherwise sounded and comparing it to the musical piece to which the given played note belongs or should belong, determining whether the correct note was played, for the correct duration, with the correct pressure, in the correct manner, and/or determining if the right note designators 114/119 and/or indicator elements 1114/1119 are activated, and/or the playing occurs in correspondence with that activation, e.g., in a positive or negative feedback loop, so as to determine the accuracy of playing and/or to appropriately teach the playing of the music 100. Hence, in various instances, the system may be configured for determining the musical elements of a composition to be played, determining the functioning of one or more controllable elements, such as lighting and/or indicating elements 1114/1119 and/or keys 240/250, and determining whether or not the notes actually being played accord with the musical composition as notated and/or as indicated, e.g., via indicator elements 1114/1119, on the keyboard 1010 as to be played.

Figure 6F:
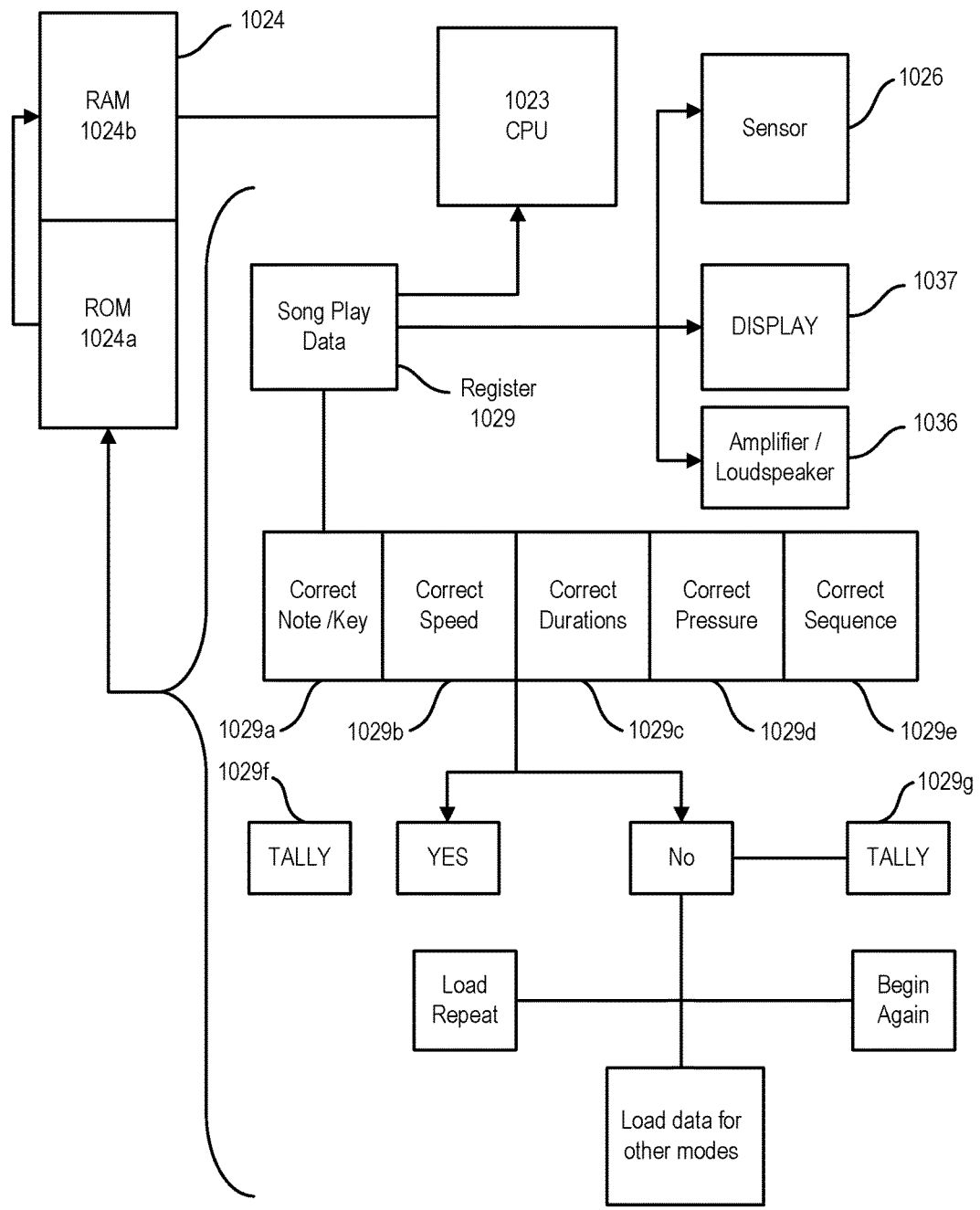
FIG. 6F shows a schematic diagram of processing functions for a system as described in the specification.

More particularly, as indicated in FIGS. 6E and 6F, the CPU 1023 may include one or more registers that may be loaded with data, such as data drawn from the memory 1024, upon which data one or more instructions may be run. For instance, given the stage of playing and the status of the system, one or more of the following data may be loaded into the processor 1023 from the memory 1024 and/or displayed on the display 1037, such as accurate note data 1029a, correct speed data 1029b, appropriate duration data 1029c, right pressure data 1029d, and right sequence data 1029e, setting forth the particulars needed for the precise playing of the music as notated 100. These note play data may be read out from the memory 1024, such as from long-term ROM 1024a and read into short term RAM 1024b, for rapid access by the CPU 1023.

For instance, one particular register 1029 may be configured so as to determine if the correct key 240/250 was played and/or note was sounded, 1029a. In such an instance, if the correct key was played, e.g., the correct note sounded, then the next note may be loaded into the register 1029, and the sequence for playing the music 100 continues. However, if the wrong key 240/250 is played, e.g., the wrong note sounded, this may be tallied by the register 1029g as well, and the system may either begin again or continue with the playing such as by loading the beginning note or the next note in the sequence, respectively. In a manner such as this, the number of correct keys 240/250 played may be recorded, e.g., in register 1029f, and/or the number of mis-played keys may be flagged and/or tallied, e.g., in register 1029g. A further register may be configured as a speed and/or duration register 1029b/c, such as for accumulating time differences between a correct key depression timing defined by duration data, and an actual key depression timing as loaded from the RAM/ROM 1024 and/or as determined by an integrated key depression detection circuit for sensing or otherwise determining which key has been manipulated, when, for how long, in what order, and with what amount of force. If an expedited and/or delayed depression occurs, such an event may be flagged for further processing, e.g., in register 1029g. An additional register may be configured as a pressure determining register 1029d, such as for determining the appropriate pressure being employed in playing a key 240/250 for playing the music 100 uploaded as correct pressure duration data from the memory 1024. Additionally, the sequence of notes to be played may be loaded into the register 1029e and tracked with respect to the correct playing thereof. Hence, if the correct playing is determined, this may be tracked and/or tallied, such as in register 1029g, and if incorrect playing is determined, this may be tracked and/or tallied, such as in register 1029f, such as result play data. This result play data may then be reviewed by the user and or accessed by the other components of the system such as to be used in various different play modes, such as auto-correct mode 1034, accompaniment mode 1033, or other such modes.

Accordingly, as described herein, the circuit board 1025 of the instrument 1000 may include or be associated with a memory 1024, such as for storing data and/or instructions, such as music data, play data, indicator data, sensory data, and the like. Hence, the memory 1024 may include music data regarding music that has been notated and is to be played or has been played, the compositional and/or mechanical elements that make up that music, and exemplary and/or executable files that model the music as well as actual play and/or sound data that may be stored and then compared to the model data, so as to allow the processor 1023 to determine how accurately a given piece is played as compared to a model piece, such as from a mechanical and/or sensed data field and/or music particulars stored within the memory 1024. Additionally, such data may be accessible and usable in the control and running of the various other modes including the sound generation mode 1031, the sound effect mode 1032, accompaniment mode 1033, auto play/auto correct mode, and/or the indicator sequence and/or accuracy mode. Accordingly, the memory 1024 may be operably connected to the microprocessor 1023 and/or sensor 1026. In certain instances, the memory may be any suitable memory, such as a ROM, RAM, DRAM, FRAM, NAND, flash and/or the like.

For example, the various registers 1029 may receive various note/key play data from the memory 1024, so as to evaluate the playing mechanics of the player playing the keys and/or strings 240/250 of the instrument 1000. The registers may be configured to determine if the notes and/or keys 240/250 were played, were correct, in the correct order, with the correct speed (e.g., played too fast or too slow or played correctly), for the correct duration (e.g., played too long or not long enough or played correctly), and with the correct pressure (e.g., played too hard or too lightly or played correctly), such as by evaluating the to-be-played note/key with the played note/key 240/250, the to-be-played speed/duration/pressure with the played speed/duration/pressure, such as by evaluating the speed, e.g., timing and distance traveled over the length of time and with what pressure was asserted. Hence, in order to play the composition correctly, a performer will have to manipulate the right keys and/or strings 240/250 or otherwise sound the right notes 114/119 in the right order, with the right timing according to the measure and beat of the notated music 100, with the right length of time and amount of pressure, and/or with the right type of flourish and/or embellishment. To facilitate this correct playing, the system will cause the correct indicator elements 1114/1119 to be activated in the right order, at the right time, for the right duration, with the appropriate amount of intensity so that the person playing the instrument 1000 may be guided in the correct manner in which to play the notated music 100. Where an incorrect key 240/250 is played and/or a correct key 240/250 is played incorrectly, a register 1029g will track and tally this occurrence (wrong key played, in wrong order, with wrong speed, for wrong duration, etc.).

In various embodiments, the instrument 1000 may be configured to include a communications module 1027 and/or an input/output for communicating with the circuit board 1025 and/or a microchip 1023 and/or memory 1024 thereof. Hence, in certain embodiments, the instrument 1000 itself may be configured for communicating with an outside and/or third party agent, such as over an associated wired or wireless network configuration. For example, the instrument 1000 may include or otherwise be associated with a communications module 1027 that may include a receiver 1027a and/or a transmitter 1027b.

Particularly, the communications module 1027 may include a receiver 1027a configured for receiving data, such as music composition data, indicator and/or lighting element configuration and control data, key position and/or movement data, instructional data related to the manipulating of one or more keys 240/250 of the instrument 1000, such as with respect to which of the given indicator elements 1114/1119, e.g., lighting elements 1020, are to be activated, e.g., lit up, for how long, when, such as data sent to the receiver from a controller remote from the instrument or CPU 1023 thereof. Additionally with respect to any particular given key 240/250, the data to be received may pertain to the sequence in which the indicator elements 1114/1119 are to be activated, and/or the sequence, duration, and/or pressure with which any given key 240/250 is to be manipulated. Consequently, the indicator elements 1114/1119 may be configured to activate in appropriate manner to reflect these play conditions. Any suitable receiver capable of receiving such data, instructions, and information and/or conveying the same, e.g., via a suitable controller 1023, to one or more of the indicating elements 1114/1119, lighting elements, and/or keys 240/250 of the instrument 1000 may be employed.

Such data, instructions, and/or information may be conveyed or otherwise communicated via a direct wired or wireless connection. For instance, such information may be transmitted through a wired data connection, Ethernet connection, WiFi, Peer to Peer, e.g., Bluetooth, and/or internet or cloud based connection. However, in certain instances, the receiver may be a wireless receiver such as a radio, cellular, and/or video receiver, audio/visual receiver, or other form of receiver configured for receiving audio, visual, electronic, and/or digital and/or compressed communications signals. In various instances, the receiver may be configured for receiving and/or determining and/or tracking positioning and/or movement data. For example, in certain instances, the key 240/250 may include or otherwise be associated with a geo-location receiver device, e.g., a GPS or GPS-like receiver, such as in this instance for determining the relative position of the keys 240/250 of the instrument 1000 relative to one another and/or how any given key or keys should be positioned when playing a given notated compositional piece.

The communications module may include a transmitter, such as for transmitting data, instructions, and/or information, such as data related to the activation of one or more indicating 1114/1119, e.g., lighting elements, and/or the manipulating of one or more keys 240/250 of the instrument 1000, such as with respect to which of the given indicator elements 1114/1119, e.g., lighting elements 1020, should be activated so as to indicate which of the given keys 240/250 should be manipulated and when so as to produce the correct pitch, for the appropriate duration, with the right amount of pressure, and in the right order, as herein described, as notated within the composition 100 that is to be played. For instance, any suitable transmitter capable of transmitting relevant data over a wired or wireless connection may be employed, such as a CATIII, CATIV, HDMI, optical cable, and the like. In various instances, the transmitter may be configured for transmitting data in a wireless configuration, and as such a suitable transmitter may include a wireless WIFI, cellular, BLUETOOTH, BLUETOOTH LE network connection, and the like. Hence, in certain particular embodiments, the transmitter may include one or more of WIFI, BLUETOOTH, Low Energy/Smart (BLE), ANT+, radio frequency, RFID, IrDA, Infra-red, ZIGBEE, and the like.

In some instances, the data to be transmitted may be related to indicator 1114/1119 or lighting element 1020 activation, key and/or string 240/250 manipulation, including sequence, velocity, acceleration, orientation, duration, and/or pressure data, as well as pitch generation data related to the key 240/250 manipulation, which data may be configured for being communicated or otherwise transmitted over a network 200 to a suitably networked receiving device 600, such as a third party observing and/or monitoring device, such as a computer and/or display device 1037 that monitors the playing of the instrument 1000 in correspondence to the composed tablature 100. Particularly, in certain instances, where the transmitter 1027*b* is a radio transmitter, the transmitter may be coupled to the microprocessor 1023 and configured for transmitting data, such as over an operating range from about a 2.4 to about a 2.485 GHz frequency, in some instances.

Further, in various embodiments, the control circuitry of the instrument, as depicted in FIGS. 6D and 6E, may include or otherwise be associated with a clock 1028, which clock may include a timer, a counter, and/or an alarm. The clock may be configured for counting up or down, and in some instances may be configured for keeping time and/or tempo with the notated music being or to be played, such as in beats per minute or seconds, e.g., in whole, half, quarter, eight, etc. beats per minute, second, etc. In certain instances, the clock 1028 may be configured for running as a metronome, such as for keeping the speed, tempo, timing, and/or measure of the music. Hence, the clock may work in conjunction with a tone-generating device 1031 so as to facilitate the playing of a composed musical piece.

In various instances, the clock 1028 may be a mechanical or digital time keeping device, may include a timer, a stop watch, one or more alarms, and/or a world clock being able to keep and display time for a multiplicity of countries and/or time zones as well as for one or more associated and/or networked instruments. Additionally, the clock 1028 may be configured for measuring the time for the running of the internal componentry of the musical instrument, associated software, hardware, and electro-mechanical operations of the device 1000. For instance, a timer 1028 may be included where the timer is operably associated with a clock pulse generator such as for generating one or more clock pulse signals, such as where one cycle period may define a minimum unit time for the measure of the musical performance. In such an instance, one cycle of the clock pulse may be configured to correspond to a predetermined note duration and/or the clock frequency of the timer may be set by a tempo switch, which may then be fed to the CPU 1023.

Additionally, in various instances, the instrument 1000 may include a keystroke monitor and/or tone generator and modulator 1031, such as for generating and/or modulating electrical audio pulses or tone signals, e.g., artificial sound frequencies, in response to one or more keystroke data that may be sent to various of the different components of the instrument 1000, such as to the ROM/RAM 1024 and/or sounded through an associated amplifier and/or loud speaker 1036, such as through a wired or wireless connection 1022 therewith. Accordingly, in some embodiments, the tone generator 1031 may include a circuit such as to convert electrical signals, e.g., keystroke data, into a sound. Particularly, one or more keystroke signals generated from the operation of one or more keys and/or strings 240/250 of the keyboard 1010 or data read out from RAM/ROM 1024 may be fed to the musical tone signal generator 1031 so as to generate musical note signals. These note signals are sounded through amplifier and/or loudspeaker 1036. In such an instance, the audio sound signal may be of a pitch such as of a musical note, or may simply be a tone that may be employed in conjunction with a clock 1031 unit so as to act as a metronome for keeping time.

For instance, in response to a key 240/250 being depressed, electrical signals may be generated in any suitable manner, such as by sending an electric current through an oscillating mechanism, e.g., a vacuum tube, so that the current is forced to oscillate in a manner so as to produce an audible compression wave. In other instances, the electronic signal may be passed through a coil in a manner so as to produce a magnetic field as the coil receives a current. In such an instance, the coil is positioned in proximity to a fixed magnet and connected to a flexible membrane, e.g., a paper or plastic membrane, such that when the electrical signal passes through the coil, the magnetic field rapidly changes, causing the signal to either be attracted to or repelled from the magnet, which then causes the magnet and the membrane attached to it to vibrate quickly. These vibrations cause compression waves in the air that propagate in particular frequencies as sound. Such currents may be modified or otherwise modulated by synchronizing various mechanical elements that are configured for keeping the signals so as to be proportional or disproportional with one another as desired.

In particular instances, the tone generator 1031 may be used to convert keystroke data, such as entered through the depressing of the keys of a keyboard 1010, into digitally generated pitches, such as those stored as digital files, e.g. way files, within a register 1029 and/or the memory 1024, which may then be converted into artificial audio sounds. In some instances, the tone generator 1031 may produce pitches in accordance with composed and/or notated music, such that the electronic signals produced may be converted into tones, amplified, and passed through a sound system, such as a loud speaker 1036, as musical sounds. In various embodiments, the tone generator 1031 may be associated with an effects element 1032 so as to impart various effects to the tone signals produced by the tone generator 1031. For example, in particular embodiments, the tone generator may be configured as or may otherwise include a Musical Instrument Digital Interface (MIDI) device 1032, which MIDI may be coupled to one or more of the music tone generator 1031, an accompaniment control unit 1033, as well as an auto play and/or auto correct element 1034.

Particularly, the instrument 1000 may include a MIDI device component 1032 that is configured for employing a protocol that is designed for recording and/or playing music back, such as on an associated digital synthesizer. For instance, where the music tone generator 1031 may be configured for generating musical pitches, the MIDI may be configured to transmit information about how music to be played back may be produced, such as by including command sets such as by producing key movements, or determining note-ons, note-offs, key velocity, pitch bend, and other such methods of controlling an associated keyboard and/or synthesizer associated therewith. In such an instance, the sound waves produced by the MIDI are typically those already stored in a wavetable in the memory 1024 of the instrument 1000 or a sound card, thumb drive, e.g., USB memory stick, SIM card, SD card or other input device that may be associated with the instrument 1000, synthesizer, or the like.

More particularly, in a typical configuration, rather than producing musical pitches directly, the MIDI can be configured for representing musical sound indirectly. For example, the MIDI 1032 may be configured to include data such as a set of instructions that in certain instances may be in the form of a list of events or messages, e.g., impulses, that instruct the tone generator 1031 to generate the various pitches of the composed, notated, played, and/or recorded music 100. As indicated, the typical instructions may include a key movement and/or detection circuit, a "note-on" signal, which signal indicates that a key, e.g., 240/250, has been pressed, the identity of the key that was pressed, as well as the velocity, duration, and/or the pressure with which the key 240/250 was pressed, and in response thereto may produce sounds based on such data. Likewise, the instructions may include a "note-off" signal that indicates a key 240/250 has been released or that a note is done playing, and may include a return velocity, duration, and or a release of pressure measurement. The instructions may also include directions for a key pressure sensor to measure how hard the key 240/250 is pressed once it "bottoms out," which may also be employed to add vibrato or other effects to the note. Further data that may be stored, accounted for, and/or employed may be data for determining or ensuring the correct sequence of notes have been played as required by a given notated piece of music.

Additional instructions may include a control change indicator configured for indicating that a change of control has occurred, such as a musical instrument modulator that has been activated, and/or a pitch wheel change signal that indicates the pitch of a note has been bent or otherwise modulated, such as with an associated pitch wheel of a keyboard 1010. For example, when a MIDI 1032 is employed, such as to record music and/or play data and/or to modulate sound data and/or add effects thereto, the lists of these instructions may be saved within the memory 1024 of the instrument, such as in a .MID file, which file may be played back, such as on an associated tone generator 1031, e.g., employing an internal or external synthesizer, that is configured for implementing the instructions of the MIDI 1032, such as to play back the recorded pitches, for instance through an associated sound system 1036. In certain of such instances, the keyboard 1010 may play or indicate that a particular key is depressed with a certain velocity and that it is held for a specified amount of time in accordance with the stored instructions before moving on to the next note. In particular instances, the MIDI 1032 may be coupled to one or more of an accompaniment control unit 1033 and/or an auto play and/or auto correct module 1034. These may be used for teaching the player the appropriate way to learn to play the music and/or may be used in one or more games and/or in a multiplayer mode.

For instance, in various instances, it may be useful for the instrument 1000 to include one or more of an auto-accompaniment 1033 and/or an autocorrect 1034 module(s) such as for teaching, evaluating, and/or for enhancing the experience of playing the instrument 1000. For such implementations, the MIDI 1032 may be operably connected, e.g., via interconnects 1022 or other input-output bus, to the music tone generator 1031, an accompaniment control unit 1033, an autoplay/correct module 1034, the memory 1024, the timer 1028, a sensor 1026, the CPU 1023, the communications module 1027, sound system 1036, an associated battery or power source 1021, and/or other componentry of the instrument 1000. Accordingly, the various componentry of the instrument 1000 may be configured so as to be compatible with the various MIDI standards. It is to be noted that although the MIDI 1032 may or may not function to store digital music files per se, the tone generator may include such digital music files, such as in an MP3, WAV file format or the like. In some embodiments, the tone generator 1031 may be operably connected to multiple effects generators.

When included, the auto-accompaniment unit 1033 may be configured to produce musical sounds such as pitches that may be emitted, such as via an operably connected tone generator 1031 and/or sound system 1036, so as to accompany the music produced by a person playing the instrument 1000. For instance, the accompaniment control unit 1033 may be coupled to the memory 1024 so as to store one or more accompaniment music pattern data, e.g., within a register 1029, which data may include a plurality of music files, e.g., .MID, .MP3, .WAV, etc., such as correspond to the notated tablature 100 of the system. Particularly, in a digital implementation, a plurality of accompaniment pattern data files may be stored in a dedicated auto-accompaniment pattern data part of the memory, e.g., ROM 1024a, which files may be toggled through and selected from such as by a suitably configured switch input mechanism, such as a knob, button, or other such input device. In such instances, the selected accompaniment pattern data, e.g., digital music files, once selected may be read out of RAM 1024b from the accompaniment control unit under control of the CPU 1023. Such digital data may then be fed into an auto-accompaniment tone generator 1031 so as to generate auto-accompaniment tone signals that are sounded through the sound system 1036, e.g., amplifier 1036a and/or loudspeaker 1036b, such as in conjunction with a person playing the instrument 1000, so as to accompany the playing thereof.

In various instances, the auto accompaniment unit 1033 may function alone or together with an auto-play module 1034 that may be configured to mechanically implement the accompaniment of the playing of the instrument. In other instances, the auto-play module 1034 may function in its own right to automatically play the instrument 1000. For instance, the instrument 1000 may include mechanical actuators that are configured to mechanically manipulate the movements of the keys 240/250 so as to automatically play the instrument 1000, such as in an acoustic manner, such as to mechanically play and/or accompany a person playing the instrument 1000. Particularly, similar to the digital functioning of the auto accompaniment unit 1033, the auto play module 1034 may also include a plurality of auto-play and/or accompaniment pattern data files that may be stored in a dedicated mechanical auto-play pattern data part of the memory, e.g., ROM 1024a, which files may be toggled through and selected from such as by a suitably configured switch input mechanism. In such instances, the selected auto-play pattern data, e.g., stored as key manipulation music files, once selected may be read out from the auto play control module under control of the CPU 1023. Such data may then be fed into the RAM 1024b and/or an auto-play controller 1034 so as to effectuate the mechanical manipulation of the appropriate actuators controlling the respective keys 240/250 that are required to be played as called for by the notated tablature 100 of the music, such as in conjunction with the playing of the instrument 1000. More particularly, the instrument 1000 may include various mechanical control levers, axles, cogs, pulleys, and other mechanical or impulse driven electrical devices configured for manipulating the physical movements of the various keys 240/250 and/or strings of the instrument 1000 so as to play the notated music 100 automatically.

Additionally, the instrument 1000 may include an electronic teaching and/or playing module, such as implemented herein as an indicator sequence controller 1035. For instance, as indicated above, in various embodiments, the instrument 1000, housing 1001, and/or the keys and/or strings 240/250 of the keyboard 1010 may include indicating elements 1114/1119 that may be configured for assisting a person in the playing of the instrument 1000. For example, the instrument 1000 may include indicating elements 1114/1119 that are configured for indicating which key 240/250 resounds which pitch of which octave 260 when manipulated, when said key should be manipulated, for how long, how quickly the key should be depressed, and/or how much pressure should be applied when playing the key 240/250, and in what order. In particular, in some embodiments, the indicating element 1114/1119 may be a lighting element 1020 that is configured for lighting up while the instrument 1000 is being played so as to indicate what pitch of what octave 260 will be sounded when a particular key or string 240/250 is manipulated, and may further be configured to indicate when a particular key 240 or 250 is to be manipulated, for how long, with what pressure, and in what sequence when playing a given notated piece of music 100.

More particularly, since a given instrument 1000 may be configured such that by the manipulation of particular keys and/or strings 240/250 the pitches of several different octaves 260 may be sounded, to make playing the instrument easier, more intuitive, and more fun, the instrument 1000 may include a plurality of indicating elements 1114/1119 such as lighting elements 1020 that light up in a manner so as to indicate what pitch will be sounded when a given key and/or sting 240/250 is played. Hence, by lighting up, the indicating element 1114/1119 may be configured to clearly indicate to the player of the instrument 1000 the pitch of the note that will be sounded when any given key and/or string 240/250 is played. This may be useful such as for helping a player of the instrument know and/or remember what pitches will be sounded by playing any given indicated keys and/or strings 240/250. In a manner such as this, the player will know the pitch of the note that will be sounded when any given indicated key and/or string 240/250 is played or otherwise manipulated.

For example, the keys and/or strings 240/250 that when manipulated result in the sounding of different pitches may be differentiated by being represented by note indicators 1114/1119 that are different in identity, and those pitches that are the same in identity but belong to different octaves, e.g., 260a-h, may be differentially represented in various different manners, such as by use of different colors. Particularly, all of the keys or strings 240/250, or portions thereof, of an instrument 1000 that when manipulated resonate at a given pitch, such as a "C" note, regardless of the octave 260, may be demarcated on the instrument 1000 by a lighting element that is in the shape of a "C." However, where the various different notes are the same in identity, e.g., "C" notes, but from different octaves 260, all the notes that are of the same identity but of the different octaves 260 may be represented by different colors. In likewise fashion, all the "D" notes from all of the various different octaves 260a-h, may be represented by a "D", but where the color of the "D" symbol depends from which particular octave 260 the particular "D" note is derived. This may be repeated for all of the E, F, G, A, and B notes, as well as for the semitones thereof, which as indicated above may be represented as numbers, such as a 1, 2, 3, 4, or 5, but where the notes of the different octaves 260a-h may be represented by numbers of different colors.

In a manner such as this, the keys and/or strings 240/250, or a portion thereof, such as a lighting element 1114/1119 of the instrument 1000, which when manipulated generate pitches that belong to the same octave 260, e.g., one ascending set of a C, D, E, F, G, A, B and/or a 1, 2, 3, 4, and 5 notes, may be represented by the same color, whereas the key and/or strings 240/250 of the instrument 1000 that when manipulated generate pitches that belong to a different octave, e.g., 260 a, b, c, d, g, and/or f, may be represented each by a different color. Accordingly, the lighting element 1114/1119 may not only indicate the identity of the note, e.g., by its alphanumeric designation, but may also indicate to what octave a particular key 240/250 or set of keys belong, such as by lighting up in different colors, hues, shades, and/or in different characters or images. As such, the note indicators 1114/1119 and/or the keyboard 1010 and/or the instrument 1000 itself may be adapted to indicate the pitch identity of all of the individual keys as well as indicate which octave 260 out of a multiplicity of octaves any particular key 240/250 and/or note designator 114/119 corresponds to.

Hence, the note indicators 1114/1119 of the instrument 1000, as herein described, may be configured and/or otherwise employed so as to differentially represent the notes on the instrument 1000 so that it will be clear what pitch and/or of which octave 260 will be sounded by manipulating any particular key and/or string 240/250 of the instrument 1000. Any suitable color may be used to demarcate the different octaves, such as red, orange, yellow, green, blue, indigo, violet and combinations thereof, such as where different colors represent different octaves from which the note indicators 1114/1119 may be derived. Particularly, the keys and/or strings 240/250 of the instrument 1000 may include a lighting element 1020 that is in the shape or form of a symbol 1114/1119, such as an A, B, C, D, E, F, and G, and/or 1, 2, 3, 4, or 5, which symbol may be configured for not only indicating which pitch will be sounded when that particular key or string 240/250 is manipulated, but further indicating to what octave that pitch belongs, and where that key or octave is located relatively on the instrument 1000, e.g., a left or right hand side of the instrument, which in turn may signify with which hand and/or finger that key or string is to be manipulated.

Further, the symbol 1114/1119 employed in or on the instrument 1000 may be selected so as to be the same symbol 114/119 employed in the notation 100 of the music to be played so as to better equate the playing of the instrument 1000 with the reading and/or interpreting of the music 100 composed and now to be played. In such an instance, the note designators 114/119 may be in the shape of letters, e.g., C, D, E, F, G, A, and B, such as to demarcate the natural tone notes, and/or may be in the shape of numbers, e.g., 1, 2, 3, 4, and/or 5, such as to demarcate the semi-tone notes, that are each representative of the pitches to be played in a composition and correspond to the key and/or string indicators 1114/1119 that may be demarcated in the same way with the same symbols and/or same colors, such as where the composition 100 and the instrument 1000 is demarcated using the methods and/or templates described herein. In certain instances, images or other associated avatars, such as cartoons representing the notes to be played can be used to demarcate the pitches to be sounded and the keys or strings to be played.

More particularly, in various embodiments, the tablature 100 of the disclosure may be employed along with the instrument 1000 in such a manner that the symbols used to demarcate the various notes 114/119 of the tablature 100 may be configured so as to correspond to the symbols employed by the instrument 1000, such as implemented by the form of the indicator elements 1114/1119, to demarcate the keys and/or strings 240/250 that are to be played so as to sound the pitches called out by the notes of the notated music 100, e.g., the notated notes 114/119 may be the same as that of the corresponding indicator elements 1114/1119. For instance, the notated tablature 100 may be coupled to the indicator elements 1114/1119, in such a manner that when a person is playing a given notated piece of music 100, prior to playing any given note 114/119 called for by the tablature 100, the indicator element 1114/1119 that represents the key 240/250 that needs to be manipulated in order to sound the pitch represented by the called for note 114/119 is activated, e.g., it lights up, so as to indicate to the player that the given key 240/250 is to be depressed, and in some instances, with what speed, for how long, with what pressure, and/or in what sequence.

For instance, in some embodiments, the tablature 100 may be electronically implemented, such that as a given note 114/119 within the tablature 100 is called out to be played by the player of the instrument 1000, the note 114/119 as notated within the tablature 100 is activated, e.g., lights up, such as within a display 1036 displaying the tablature 100 of the music to be played, and likewise in a corresponding fashion the indicator element 1114/1119 of the instrument activates, e.g., lights up, so as to indicate which key 240/250 of the instrument 1000 is to be depressed so as to play the activated notated note 114/119 as called for by the tablature 100. In a manner such as this, as a called-for note 114/119 is activated within the tablature 100, the corresponding indicating element 1114/1119 is activated, and as the indicated key 240/250 is depressed by the player of the instrument 1000, if the correct note was played, the next note 114/119 in the sequence set forth within the tablature 100 and/or the corresponding indicating element 1114/1119 is activated, e.g., lit up, thereby indicating the next note 114/119 and/or the next key 1114/1119 that is to be played in the sequence of notes 114/119 notated within the tablature 100. In such a manner as this, the tablature 100 is operably connected to the instrument 1000, so as to facilitate the player's ability to play the music on the instrument 1000 as notated within the tablature 100. Further, as described in detail above, where a key 240/250 is not played correctly, the system may track this and change its mode of operation to accommodate for correct or incorrect playing, such as by speeding up the displaying of note designators 114/119, such as in response to the correct playing, or slow the same down, such as in response to incorrect playing.

In some embodiments, the components of the system may be configured so as to not only indicate which notes 114/119 and/or which keys 240/250 to be played, but also to indicate for how long the notes 114/119 and/or keys are to be played, and with what amount of pressure. For example, the note designators 114/119 and/or the indicating elements 1114/1119 may be configured for indicating, e.g., lighting up, for a length of time equivalent to the duration called for by the notated music 100. This may be implemented in any suitable manner, such as by the manner by which the note designators 114/119 are configured within the tablature 100, and/or by the manner by which the note designators 114/119 and/or indicating elements 1114/1119 are configured for indicating, such as by being configured for lighting up for the period of time during which the given keys 240/250 are to be depressed. Particularly, the note designators 114/119 and/or the indicating elements 1114/1119 may be configured for lighting up, sounding, and/or vibrating, e.g., indicating, for a length of time that corresponds to the length of time the indicated key and/or string 240/250 is to be manipulated as called for by the notated composition 100. In a manner such as this, the note designators 114/119 and/or indicating elements 1114/1119 may be configured for indicating the duration during which a given notated pitch is to be sounded, e.g., the length of time a given key and/or string 240/250 is to be played.

Further, in some embodiments, the components of the system may be configured so as to not only indicate which notes 114/119 and/or which keys and/or strings 240/250 are to be played and/or for how long, but also may be configured so as to indicate with what amount of pressure the keys and/or strings 240/250 are to be played with. For instance, the note indicators 114/119 and/or the indicating elements 1114/1119 may be configured for indicating, e.g., lighting up, with an intensity equivalent to the pressure that is to be applied to the indicated key and/or string 240/250 as called for by the notated music 100. This may be implemented in any suitable manner, such as by the manner by which the note designators 114/119 are configured within the tablature 100, and/or by the manner by which the note designators 114/119 and/or note indicating elements 1114/1119 are configured for indicating, such as by being configured for lighting up with a given intensity and/or with a given hue that can be equated to the amount of pressure that is to be applied to the key and/or string 240/250 when playing the composed piece of music 100.

For example, the note designator 114/119 and/or note indicator 1114/1119 may be configured for lighting up for a length of time and/or with an intensity, or in a hue, that indicates the relative amount of pressure that is to be applied to the indicated key and/or string 240/250 so as to be able to appropriately play the musical composition as notated within the tablature 100. Particularly, the more pressure that is required to be applied to the indicated key and/or string 240/250 so as to play the note as notated within the tablature 100 may be indicated by the greater the intensity and/or the darker the hue of the note designator 114/119 and/or the note indicator 1114/1119, such that the greater the intensity and/or the darker the hue, the harder or more pressure with which the key and/or string 240/250 is to be manipulated, and likewise the lesser the intensity and/or lighter the hue, the less pressure is to be applied, or vice versa. This may also be used for indication duration. In some embodiments, the intensity and/or hue may be configured to start at one level and end at another level, such as going from greater intensity and/or darker the hue to lesser intensity and/or lighter the hue or vice versa, so as to indicate a period of time during which the pressure and/or duration is to change, such as from going from greater to lesser pressure, or vice versa. In a manner such as this the amount of pressure with which a note, e.g., a key and or string 240/250, is to be indicated and/or played. The speed of playing may also be indicated in this manner or in a likewise manner such as by flashing so as to indicate speed with which an instrument or component thereof is to be played.

Figure 6G:
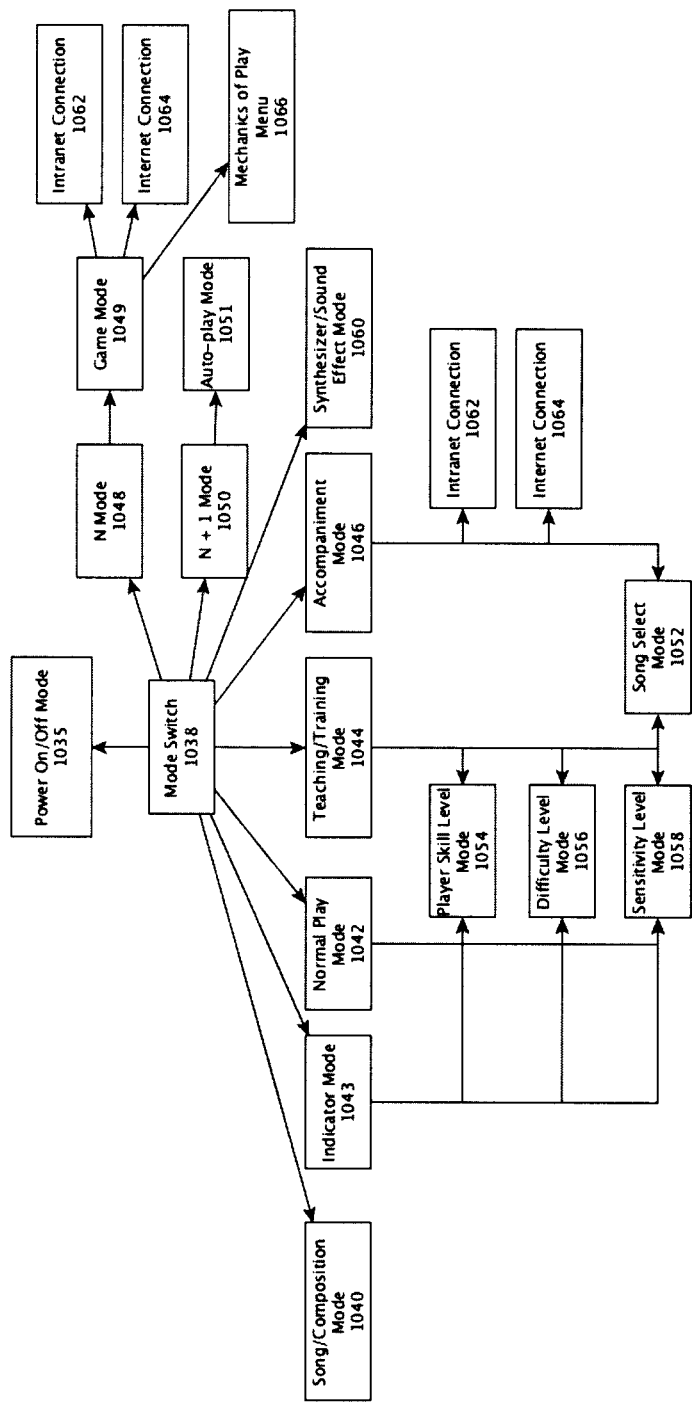
FIG. 6G shows a schematic diagram of a system for an instrument as described in the specification.

Accordingly, as set forth with respect to FIG. 6G, the system 1 may be configured such that a switch input circuit includes a mode switch 1038 for navigating and/or selecting among several different modes, e.g., a power on/off mode 1035, a song and/or composition mode 1040, a normal play 1042 and/or indicator mode 1043, a teaching and/or training mode 1044, accompaniment mode 1046, an N mode 1048 (such as a game mode 1049) and N+1 mode 1050, and the like. For instance, the N mode 1048 and/or N+1 mode 1050 may include one or more of an auto-play mode, a synthesizer/MIDI/sound effect mode, a begin and end mode, and the like. In various instances, the mode switch 1038 allows a player of the instrument 1000 to navigate between various modes such as a song select mode 1052, allowing a player to select one or more songs or compositions from a menu of songs and/or compositions; a normal play mode 1042 for playing the song or composition in its natural form; an indicator mode 1043 for playing in accordance with the activated indicator elements; a teaching and/or training mode 1044, for teaching a person playing the instrument how to play and/or training the person in the correct way to play a given selected piece and/or composition; an auto-accompaniment mode 1046, for accompanying the playing of the instrument, such as by adding embellishing features and the like; a game mode 1049, for selecting to play in one or more game modes; an N mode 1048 and/or an N+1 mode 1050, which may include an auto-play mode 1051 that effectuates the automatic playing of the instrument, such as in accordance with a selected song; a synthesizer/sound effect mode 1060 that allows a player to select among various synthesized and/or sound effects that can be added to the auto-playing or self-playing of the instrument 1000, such as a rhythm, tempo, timbre, or other effect mode; a dual accompaniment mode 1046 that allows multiple players to accompany the self- and/or dual playing of the music, such as by following the key operations of the person playing the notated music; and/or selecting from one or more training modes 1044 for playing the instrument 1000 in conjunction with the notated music 100 and/or with the activation, e.g., lighting up, of the indicator elements 1114/1119 in correspondence therewith. A composition mode 1040 may also be selected where the player is assisted in composing their own piece of music and/or adding embellishments or accompaniments to music already composed.

Particularly, when playing in normal mode 1042, the player may be prompted to select a song and/or its compositional elements; a player skill level mode 1054, such as for selecting from beginner, intermediate, advanced, and/or expert level; and/or a sensitivity level 1058, such as for selecting a sensitivity of play and/or reaction level. The player may also select to optionally have the indicator elements activated if desired. Additionally, when selecting from a teaching and/or training prompt, the player may turn off the self play mode and/or the accompaniment mode and/or the automatic play mode, and the like, or may play with one or combination of these modes turned on. Further, in the teaching and/or training mode, the player may be asked to select a player skill level 1054, such as from beginner, intermediate, and/or advanced; and/or a difficulty level 1056, such as from easy to medium to difficult and very difficult. While in the teaching mode the system may be configured for teaching the player how to play the instrument, e.g., piano, and/or the selected musical composition, such as in accordance with the selected levels of difficulty etc., such as by the indicator elements activating in a manner so as to indicate which key and/or string 240/250 is to be manipulated, when, for how long, with what pressure, and in what order so as to play the selected music with the selected configurations. An analysis of the playing and an evaluation may also occur as well as a teaching dialog that may be presented in response to the analysis and evaluation of the playing. Such teaching may be computer generated or presented by a teacher, such as remotely.

Likewise, when presented with an accompaniment and/or game mode, the player may be prompted to select a single player or multi-player mode and/or among an intranet 1062 or internet connection 1064 to allow multiple players to play within a given location or remotely from one another. For instance, the player may select to play along with computer generated or second or third player accompaniment, or in a dueling play mode against the computer or a second player or more, such as via an intranet or internet connection, each with the ability to select their own configurations and level of difficulties while playing together or against one another. Again, as like in all other modes, the indicating elements 1114/1119 and/or teaching and/or auto play modes may be activated or disabled while in this mode. In such instances, the processor 1023 may be configured for communicating with one or more remote processors such as at a remote, e.g., centralized, server location or at another player's location.

A beginner or easy mode may result in a configuration that allows the player to more easily play the piece such that the system is more forgiving and/or gives more frequent and/or longer lasting prompts, where an intermediate, advanced, and/or expert or more difficult mode may result in increasing levels of difficulty when playing the piece and a shorter number and/or duration of prompts with a more critical scoring of successfully playing the musical composition. Additionally, a user may further select from a menu, such as a mechanics of play menu 1066 that allows the user to select from options such as related to the various mechanics of playing the selected musical composition, such as the pitch or tone modulation, melody or rhythm modulation, sound effects or embellishments added or modulated, as well as the modulation of the other characteristics of the music as herein described. For example, the tone generator 1031 and/or sound effects system 1036 and/or MIDI system may be selectively employed to add various musical characteristics to the song being played either automatically, generated by the system in accordance with the playing or as directed by the user of the instrument.

In various embodiments, the system may be configured for automatic play, which may simply be the generating of the sounds required to play a given piece of music and/or may involve the indicating elements 1114/1119 activating in response to the music played and/or may include the mechanical activators required to actually move the respective keys and/or strings 240/250 that are necessary so as to actually mechanically play the music. In this and other instances, the selected music may come from a library of music, such as stored in the memory 1024 of the system, or it may be downloaded from a remote database, accessible such as over the internet. In such an instance, the system may be configured for receiving the downloaded music, transcribing, e.g., notating, it in accordance with the tablature system presented herein, and may further be configured for employing it within the present system to show and/or teach a user of the instrument 1000 how to play the downloaded and/or transcribed, e.g., noted, song, such as by implementation of the correct indicator elements 1114/1119, automatic play, and/or teaching modes. In various instances, the system may be configured to detect audio signals from the environment, identify the song, and search and locate the song and its composition from an onboard or remote database, such as a music storage and/or play database, e.g., an online music database.

Once a song and a mode by which to play the song has been selected, said selections may be conveyed to the microprocessor 1023, and the deselected song and mode may be uploaded to one or more microprocessors, such as processor 1023, such as from one or more memories, e.g., the memory 1024, the selected song play mode may be initiated. For instance, where an accompaniment 1032, auto-play 1034, and/or teaching 1035 mode, and/or an indicator-on mode is selected, the musical data for the musical piece chosen, such as from a bank of songs stored in the ROM 1024*b* or a remote database of songs, and the control instructions for directing the operations of the designated mode, e.g., the auto-play, self-play, accompaniment, and/or teaching modes may be configured and/or read out into an the RAM 1024*a* for the preparation of playing of the musical piece, e.g., in accordance with its configuration.

During such play modes, the various indicator elements 1114/1119, e.g., lighting elements 1020, for the various keys and/or strings 240/250 corresponding to the notes being played may be successively activated, e.g., lit up. Hence, in such an instance, the player may be assisted in his or her playing of the piece 100 such that prior to manipulating the keys 240/250 called for by the configured and/or notated musical composition 100, the associated indicator elements 1114/1119, and or other associated system and/or musical effects, may be configured, if not already configured with respect to the following, and/or activated so as to indicate that the respective key and/or string 240/250 is to be manipulated, and/or for how long, and/or with what pressure, and/or with what accompaniments, and/or effects.

Figure 6H:
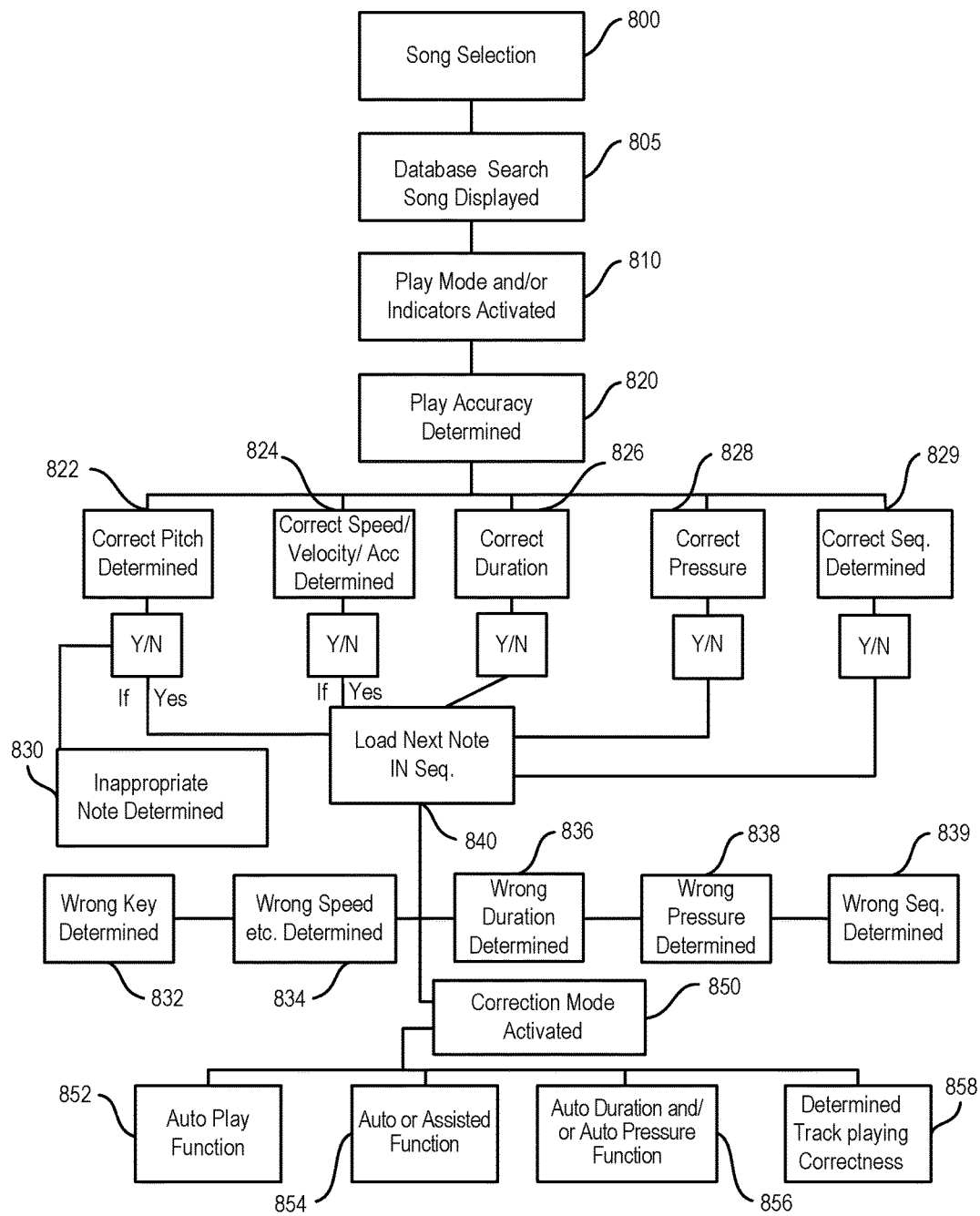
FIG. 6H shows a flow chart of a method used by an instrument as described in the specification.

More particularly, an exemplary method for implementing such a process in accordance with the devices and systems herein described is presented in FIG. 6H, and may include one or more of the following steps. In a beginning step 800 a song 100 to be played by the instrument 1000 may be selected and subsequently displayed, such as on an electronic display device 1037, which may be operably connected to the instrument 1000, such as directly attached therewith, e.g., as to be one piece therewith, and/or over a network 200. Particularly, the instrument 1000 to be played and/or the display device 1037 may include and/or be operably connected to a CPU 1023, which CPU may be configured for retrieving and executing instructions, e.g., from the memory 1024 or other searchable database, such as instructions related to musical and/or performance and/or configuration data. For instance, in step 800, the display device 1037 may display a menu, such as a menu of songs that are capable of being selected such as by an appropriately configured selector switch 1035 and played on or by the instrument 1000 by the player(s) and/or automatically.

Once selected, in a further step 805, the CPU 1023 may operate to search and pull the selected song 100 from a memory 1024, such as a ROM 1024a, and/or the selected song may be transferred to RAM 1024b, such as for rapid access of data and/or executable instructions. For example, once a song 100 is selected from the menu, the tablature 100 for the selected song may be configured and/or presented and displayed on the screen of the display device 1037, e.g., a capacitive sensing and/or touch screen device. Accordingly, the tablature 100 may be represented electronically and may be configured so as to electronically display the various notes 114/119 of the composed musical piece, such as within the tablature 100.

Further, in an additional step 810, the display 1037 and/or tablature 100 may be operably connected to the instrument 1000, such as through a network connection 200, or other connection, e.g., 1022, to the CPU 1023, such that as a note designated 114/119 to be played is activated, e.g., lit up, within the tablature 100, a corresponding indicator element 1114/1119 on the instrument 1000 may be activated, e.g., lit up, so as to indicate to the player which particular key 240/250 is to be played in correspondence to the activated note 114/119 as notated within the music 100. Hence, as a note 114/119 designated to be played is specified within the tablature 100, the indicator element 1114/1119 associated with the key 240/250 that when manipulated sounds the corresponding pitch for that note 114/119 is activated, so as to indicate to the player that the indicated key 240/250 corresponding to the notated note 114/119 should be played. In a manner such as this, a player of the instrument 1000 may be assisted in performing a musical piece 100, such that in one or more additional steps 820, as each particular note 1114/1119 is played on the instrument 1000, the next subsequent note 114/119 is then activated and/or displayed within the tablature 100 and/or further indicated within the instrument 1000 so as to indicate the next key 240/250 within the musical sequence is to be manipulated so as to play the notated musical composition 100.

Particularly, the system may be set up such that as a key 240/250 is manipulated, it may be determined in step 820 whether or not the manipulated key 240/250 was the appropriate key 240/250 to be played, e.g., it may be determined whether the key 240/250 played sounds the pitch called for by the notated tablature 100. For instance, in step 822, as a pitch is sounded by the manipulation of a key 240/250 of the instrument 1000, it may be determined whether that sounded pitch is the note 114/119 called for by the tablature 100. More particularly, the system may be configured such that the identity of a note played may be detected and/or otherwise determined by the system or a component thereof, e.g., the instrument 1000. For example, in step 822, the system may be adapted so as to sense or otherwise determine, if an appropriate or inappropriate pitch has been played, by detecting the movement of the a 240/250, such as via the activation of a suitably configured keystroke activation circuit 1034, or by determining that a note 114/119 having the appropriate pitch has been sounded, or other like manner for determining if the appropriate key 240/250 has been played. Hence, in step 820, once a note 114/119 has been indicated as to be played in the tablature 100, e.g., the electronic tablature, and a player of the instrument 1000 has played a selected key 240/250, the system may then determine in step 822 if the played key 240/250, was the right key to be played as called for by the tablature 100. If the correct key 240/250 was played and/or the correct note was sounded, the system may load and/or otherwise display, in step 840, the next note 114/119 in the sequence of notes within the composition 100 that is to be played, and these steps may be repeated.

Additionally, in various instances, such as in step 824 the system may also determine whether the key 240/250 played was translated with the appropriate acceleration or speed. Further, in step 826, it may be determined whether the key 240/250 was held down for a long enough duration. Further still, in step 828 it may be determined whether the key was pressed with the appropriate pressure. For instance, if the key 240/250 played was the appropriate key to be played as notated as in step 822, and/or it was played with the appropriate speed or acceleration, as in step 824 and/or it was played for the appropriate duration in step 826, and/or played with the appropriate pressure, as in step 828, and/or in step 829 it is determined that the right sequence of keys was played, then the keystroke activation circuit 1034 detects the appropriateness with which the key 240/250 was played and instructs the system, in step 840, to activate and/or display the next note 114/119 to be played within the sequence of notes within the tablature 100 and/or instructs a suitably configured indicator control unit 1036 to activate the next corresponding key 240/250 associated indicator element 1114/1119 so as to indicate the next note 114/119 and/or pitch to be sounded as called for by the notated tablature 100 and/or to be played by one or more of the players or automatically, e.g., in automatic play mode. In such an instance, one or more of these steps may be repeated such as until the song has been completed, an error was determined, and/or the player has ceased playing.

However, if the wrong key 240/250 is played, and/or it is played with the wrong acceleration or speed, and/or is played for the wrong duration, and/or with the wrong pressure, this may be determined in step 830. Particularly, in step 832 it may be determined if the wrong key 240/250 was played and/or the wrong note sounded. In step 834 it may be determined whether the key 240/250 played was translated with the wrong acceleration or speed. Further, in step 836, it may be determined whether the key 240/250 was held down for the wrong duration. Further still, in step 838 it may be determined that the key was pressed with an inappropriate amount of pressure. For instance, if the key 240/250 played was the wrong key to be played as notated, as in step 832, and/or it was played with the wrong speed or acceleration, as in step 834 and/or it was played for an inappropriate duration in step 836, and/or played with the wrong amount of pressure, as in step 838, and/or in a wrong sequence 840, then the keystroke activation circuit 1034 detects the inappropriateness with which the key 240/250 was played and instructs the system, in step 850, to correct or auto-correct and/or to load the next note in the sequence 840, such as once the player and/or playing is back on track, e.g., corrected.

For example, in step 850, the system may include an auto-correct function 1034. The auto-correct control circuit 1034 may be activated so as to correct and/or teach the player the appropriate way to play the instrument for the particular composition being played. For instance, when an inappropriate event occurs in the playing of the composition, as in step 830, a suitably configured register, such as within the processor 1023, may be activated to keep track of the deficiency such that one of several sub-routines may be initiated so as to help the player get back on track and/or better play the song presently or the next time it is selected to be played on the instrument 1000 for that same or a different player.

Particularly, when the player is pressing the keys or otherwise playing too slow or too fast, and/or not for the appropriate duration, and/or not with the appropriate pressure, in step 850, the notation 100 and/or keys 240/250 and/or associated note designators 114/119, and/or note indicators 1114/1119 may be configured to mechanically and/or electronically slow down or speed up and/or apply the right pressure, for the right amount of time, e.g., mechanically or electronically, so that the movements and/or activations of the various components of the system, e.g., keys and/or indicator elements, so as to help the player compensate for such inaccuracies. This may be accomplished in several suitable fashions depending on the type of errors received. An analysis and/or teaching mode may also be initiated whereby the system then instructs, e.g., via a displayed teaching instruction, video, audio, or the like, such as in step 852 by initiating an auto-play function 1033, which in said auto-play function 1033, the appropriate keys 240/250 may be mechanically or electronically operated in the appropriate fashion, e.g., until the player catches up or slows down in his or her playing of the instrument 1000. Or in step 854, by speeding up and/or slowing down and/or changing the activation and/or operation of the note designators 114/119 and/or note indicators 1114/1119 so as to accommodate the player's abilities. In various instances, in step 856 an auto- or self-regulated duration and/or pressure function may be initiated to teach or otherwise ensure the correct key duration and/or pressure is applied to the keys, e.g., in the correct manner and at the correct time. Additionally, in step 858, any deficiencies in playing may be tracked, recorded, and/or played back, such as in the teaching and/or auto-correct and/or auto-play mode 1034.

Figure 7A:
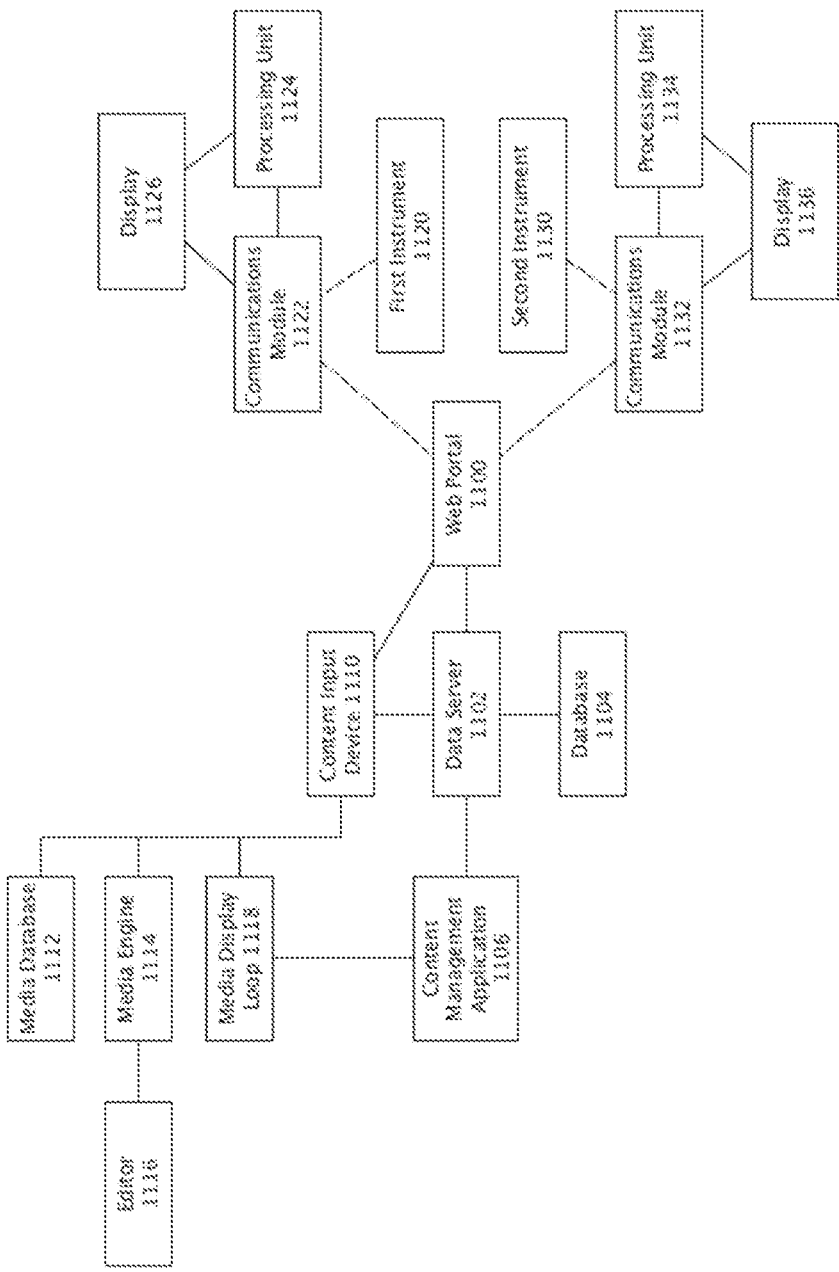
FIG. 7A shows a schematic diagram of a system in which electronic instruments communicate via a network.

In certain embodiments, the electronic devices and/or instruments described herein are capable of communicating with each other via a network (e.g. intranet or internet, e.g., via cloud) that is facilitated by a remote data server hosting a web portal. This network connectivity between electronic devices and instruments may allow interaction between the users of the electronic devices and instruments by providing songs, games, and other scorekeeping or score tallying functions, thereby motivating enhanced enjoyment, increased practice of the electronic instrument, as well as a more firm commitment to mastering the playing of the instrument. For example, as depicted in FIG. 7A, a web portal 1100 hosted by a data server 1102 may allow multiple users to have network access to songs, games, and other media content, as well as the ability to communicate with each other. The data server 1102 is connected with a database 1104 that may hold a variety of data, such as song data, technical play data, embellishment data, and/or user account information and historic play data. In some embodiments, more than one data server 1102 may be utilized, such as a server farm or bank in which some servers are dedicated to hosting the web portal 1100, some contain the database 1104 and/or other databases, and other servers run specific applications, such as the game and/or competition applications described herein or related thereto. Data server 1102 is connected with content management application 1106 that allows an administrative user to add, remove, and/or modify data in database 1104.

First instrument 1120 and second instrument 1130 may be musical instruments, such as those described herein, having keys with indicating, e.g., lighting elements, sensors, receivers, transmitters, etc. (see, e.g. FIG. 6A-H described above). First instrument 1120 may be associated with a processing unit 1124 and a display 1126 via a communications module 1122. Communications module 1122 may be connected with first instrument 1120 with a wired or wireless connection. In some embodiments, the processing unit 1124, communications module 1122, and display 1126 may be part of a single computing device, such as a tablet, smartphone, or laptop, or one or more may be separate devices. In some embodiments, the instrument may include display 1126, or may include another display in addition to display 1126, such as one display depicting the tablature of the music to be played and the other depicting a game mode screen that ties the playing with progress through a game screen, such as a video game. Similarly, second instrument 1130 may be in data communication via a wired or wireless connection with the same or another communications module 1132 that allows communication with processing unit 1134 and display 1136. Communications modules 1122/1132 also allow network access (such as via an internet service provider) to web portal and thus to song tablature, MIDI files, audio files, image files, and other media in database 1104.

An administrative user having a content input device 1110 (e.g. tablet computer, laptop, mobile computing device, phone, etc.) can upload digital content via web portal 1100 for storage in database 1104. Such content may include composed music that has been notated in accordance with the teachings above. Content input device 1110 may be associated with a content input device 1112, containing song tablature, song MIDI files, audio files, image files, game applications, and other media, as well as a media engine 1114, an editor 1116, and a media display loop 1118. In some embodiments, media engine 1114, editor 1116 and media display loop 1118 may be hosted on data server 1102. An administrative user may browse content input device 1112 for content to upload to data server 1102 using media engine 1114. Editor 1116 may be used to create and/or edit media files and content. Once database 1104 has one or more media files, in some embodiments, media display loop 1118 receives media files from media engine 1114 and presents the media files in a streaming display to a user via web portal 1100. For instance, a list of songs to be played may be presented in the data loop indicating to a user that a selected song may be uploaded into the display and be available to play, such as by double-clicking on the image within the media display loop.

A user accessing web portal 1100 via communications module 1122 or 1132 may browse media files in database 1104 using media display loop 1118, or by using a search function. The user may browse for song tablature, MIDI song files, song tablature associated with MIDI song files, audio files, as well as games that may be played using first or second instrument 1120/1130.

Communications modules 1122 and 1132 each communicate data regarding activation of first and second instruments 1120/1130 to web portal 1100, allowing reciprocal display of that activation to the display of the other instrument. For example, activation of a key on first instrument 1120 may cause transmission of data on key activation characteristics (e.g. designation of key pressed, duration, pressure used, etc.) via communications module 1122 to web portal 1100. Web portal 1100 may then transmit data regarding the key activation characteristics of first instrument 1120 to communications module 1132 of second instrument 1130, which in certain instances may be the same communications module. That data may then be shown on display 1136 of second instrument 1130. Communication via web portal 1100 allows two or more users to assess each other's playing of their electronic instruments.

In some embodiments, a user (e.g. a user of first instrument 1120) may access web portal 1100, select a game and/or song from media display loop 1118, and invite at least one other user (e.g. a user of second instrument 1130) to access the same game or song, so as to be displayed and/or played jointly. Game play may be controlled by activation of first electronic instrument 1120 and second electronic instrument 1130, and progress in the game may be assessed via web portal 1100, as master servant relationship may be established as necessary, such as the game initiator being the master device. In certain embodiments, communications module 1122 for first instrument 1120 and communications module 1132 for second instrument 1130 may communicate directly (e.g., via a direct wired or wireless connection or via an intranet network) without web portal 1100.

Figure 7B:
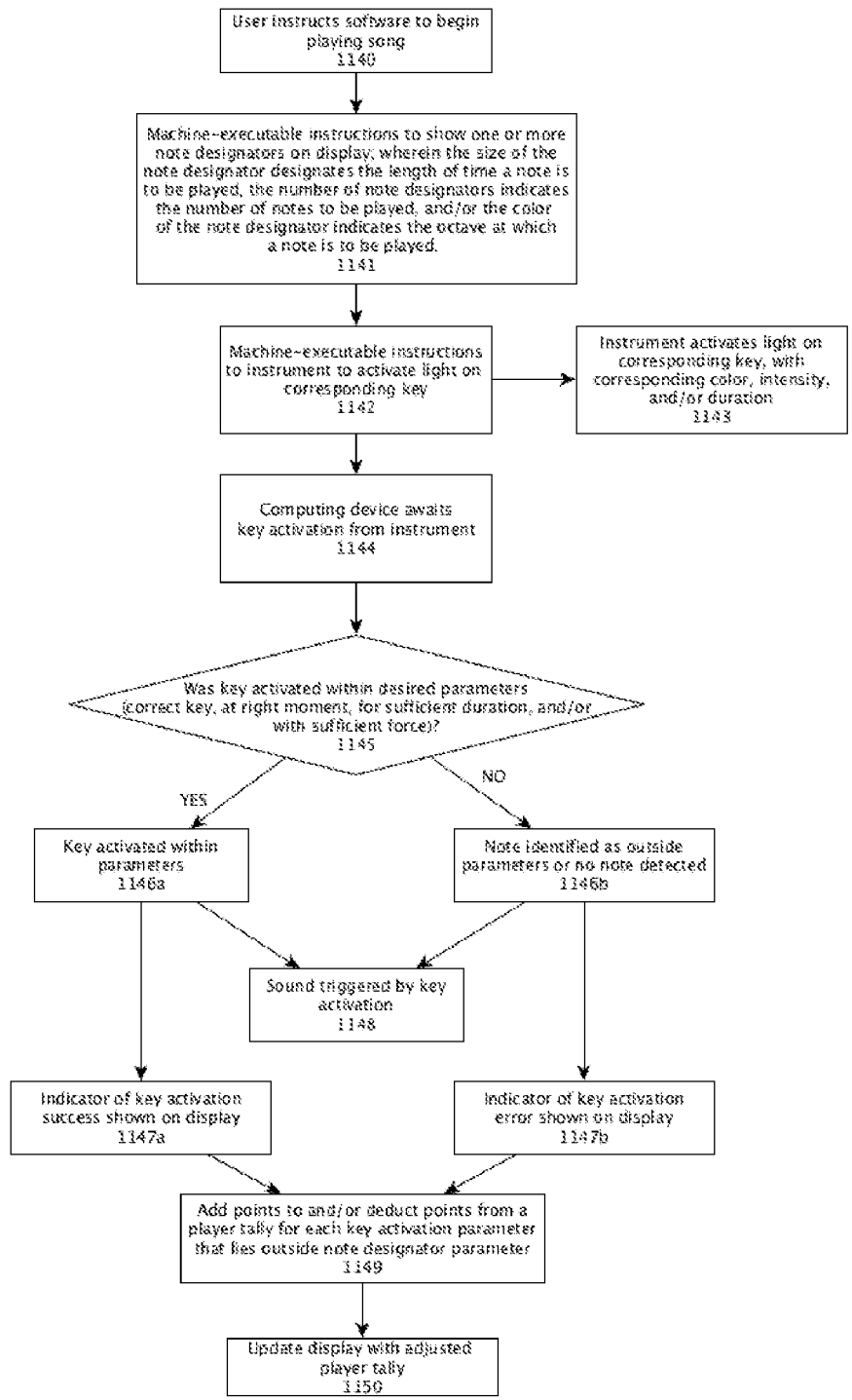
FIG. 7B shows a flow chart for a method of displaying music notation and activating key indicators on an electronic instrument.

In some embodiments of the systems and hardware described herein, musical notation such as that shown in FIGS. 3A-3C and described above may be displayed on a display of a user in conjunction with activating indicator elements, e.g., lights, on the user's display and/or electronic instrument to prompt a user to activate or press the instrument's keys, so as to play the notated composition and/or thereby advance the playing of the game. FIG. 7B shows a flow chart for an exemplary method of displaying music notation and activating key indicators on an electronic instrument. At step 1140, a user instructs an application to begin displaying musical notation at a preselected tempo, either using a button, switch, or key on the electronic instrument, or using a computing device in communication with the electronic instrument (e.g. tablet computer, smartphone, laptop, etc.). The application may be executed by the computing device or by a networked server (see, e.g. FIG. 7A).

At step 1141, the software provides machine-executable instructions for the user's display to show one or more note designators on display in accordance with a selected composition to be played. In certain instances, the size of the note designator designates the length of time a note is to be played, the number of note designators indicates the number of notes to be played, and/or the color of the note designator indicates the octave at which a note is to be played. Pressure with which the note is to be played may be indicated, as above, such as by intensity of color or movement of the note designator.

At step 1142, machine-executable instructions are also sent to an electronic instrument, instructing the electronic instrument to activate one or more indicating, e.g., light, elements associated with one or more corresponding keys on the electronic instrument. The instructions may include parameters that affect the characteristics of the one or more light elements being activated, corresponding with characteristics of the one or more notated notes, such as the intensity, color, and/or length of time the light is activated. At step 1143, the electronic instrument activates one or more light elements on the corresponding key.

The computing device (or server) waits for key activation from the electronic instrument at step 1144. Once a user activates a key on the electronic instrument, the application compares data related to the characteristics of the key activation with desired parameters of key activation associated with the one or more notated notes, such as whether the correct key was activated, whether the key was activated at the right moment in time, for a sufficient duration, and/or with sufficient amount of force. In some instances, activation of any key on the electronic instrument may result in a sound being triggered by key activation at step 1148, either by the electronic or acoustic instrument and/or by the computing device.

If the application determines that the key was activated within certain defined parameters at step 1146*a*, then at step 1147*a*, an indicator of key activation success may be shown on the display. Indicators of key activation success may include an increase in a point tally, the appearance or disappearance of an icon, and/or movement of images on the display. If the application assesses that the key was not activated within certain defined parameters (or not activated at all) at step 1146*b*, then at step 1147*b*, an indicator of key activation failure may be shown on the display or otherwise indicated on the instrument. Indicators of key activation failure may include a flash of the display, a deduction (or no increase) from a player tally, display or disappearance of an icon, or avatar, and/or non-movement of images on the display. At step 1149, the application may add points to and/or deduct points from a player tally for key activation data that lies within and/or outside of each note designator parameter, respectively. At step 1150, the player tally may then be updated on the display associated with the electronic instrument to notify the user of his or her progress.

In some embodiments, the application may identify how far outside each of the parameters the key activation data lies. The application may adjust the display corresponding to the degree to which key activation data is outside a given parameter. For example, the application may provide more points to a player tally for a key activated with force that is slightly below the force parameter, than a key activated with force much farther below the force parameter.

A number of parameters may be met to be awarded full points. The number of measured parameters may be any suitable number but will generally include characteristics such as playing the correct note, playing the note at the correct time for the correct duration and with the correct amount of pressure. In such an instance, where points are to be allocated for activating a key on the electronic instrument, full points or more points are awarded for meeting all characteristic parameters, whereas less or no points will be awarded for not meeting all of the characteristic parameters. For example, if there are four characteristic parameters that must be met to play a note correctly, there may be a quarter point allocated for each parameter met; thus if all four parameters are met, then a full point may be awarded. If any parameter is missed, there may be a respective decrease in the points awarded, or no points awarded at all depending on the difficulty setting selected.

Figure 7C:
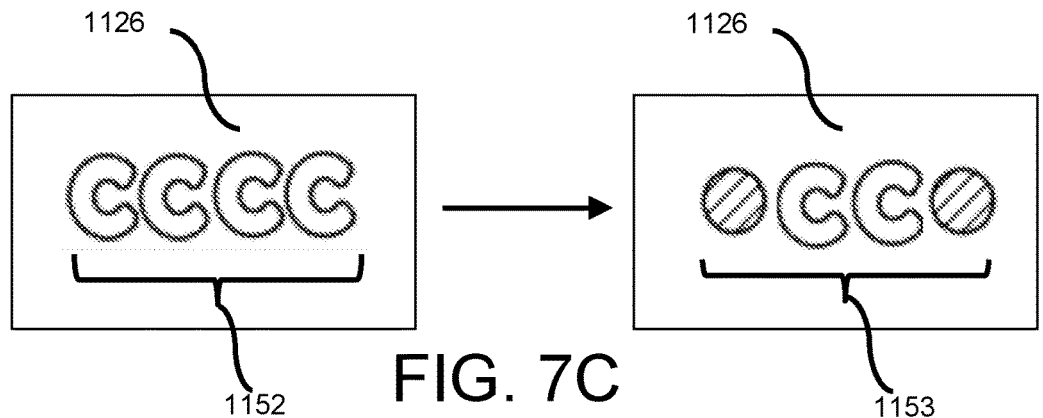
FIG. 7C shows an embodiment of tablature presented on a display over time.
Figure 7D:
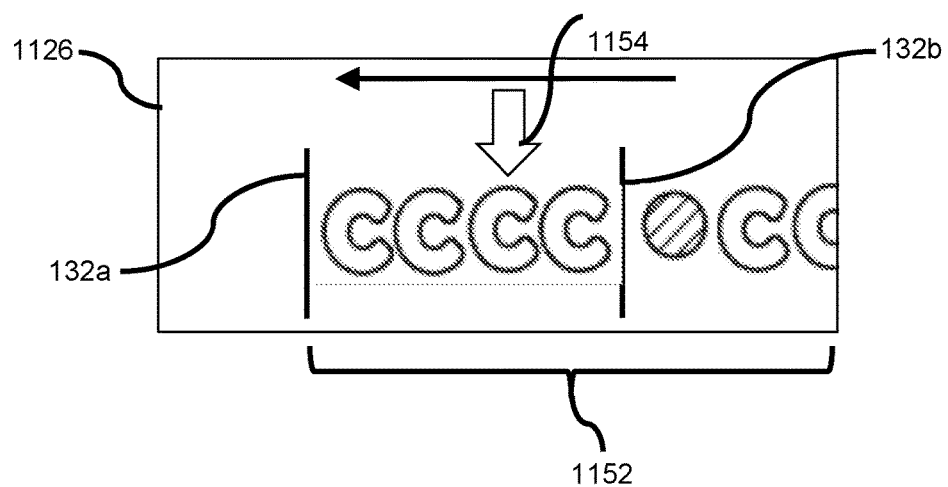
FIG. 7D shows another embodiment of how tablature may be presented on a display.
Figure 7E:
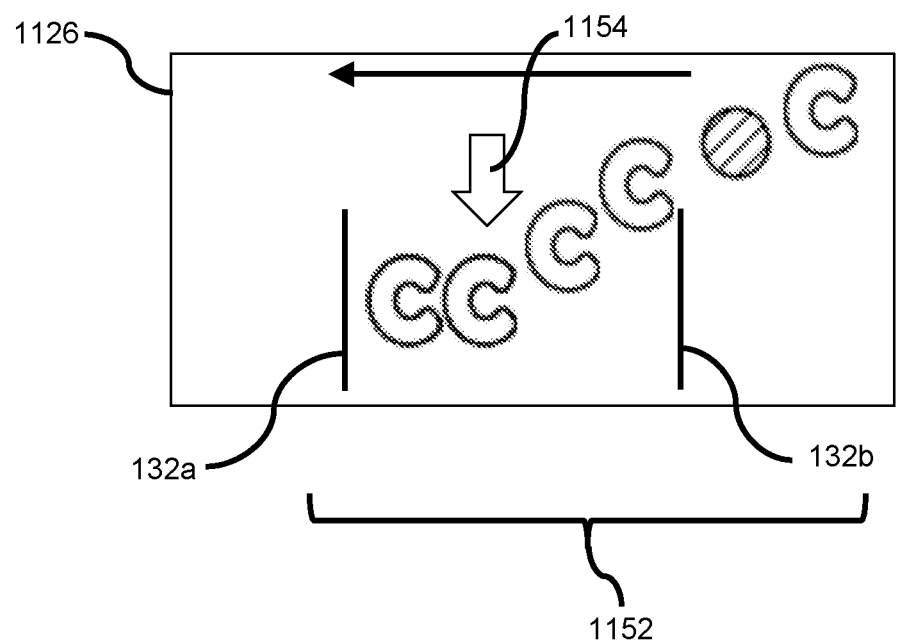
FIG. 7E shows yet another embodiment of how tablature may be presented on a display.

The music notation or tablature may be shown on in a display in a variety of methods, as shown in FIGS. 7C-7E. For example, as shown in FIG. 7C, in some embodiments, music notation may be shown semi-statically, and presented on the display 1126 in sequential portions, such as showing first notation portion 1152a for a period of time, then removing first notation portion 1152a and showing second notation portion 1152b. In certain embodiments, only individual tablature notes may be shown on display 1126. In some embodiments, depicted in FIG. 7D, the notation 1152 may stream from the right side to left side of display 1126 (see arrow pointing left), thereby presenting the notation to a user from left to right at a rate reflecting a selected tempo, or it may stream downwards, from top to bottom, as if falling.

In the embodiment depicted in FIG. 7D, bar lines 132a and 132b separate measures of the notation 1152. Such embodiments may include a note-moment indicator 1154 that emphasizes one or more notes and/or rests for a user to play (or not play, in the case of rests) at a specific time that reflects a selected tempo for the notated song. Note-moment indicator 1154 is depicted in FIG. 7D as a downward-pointing arrow, but may be a bracket or other symbol, an area of increased brightness on the display, an area where the notes are presented as more in-focus than other nearby notes, and/or an area in which each individual note increases in size and/or intensity as the tablature streams across the display. In other embodiments, the note-moment indicator may move horizontally or vertically along static musical notation being displayed. FIG. 7E shows a diagram of another embodiment of a streaming display in which notation 1152 streams from the right side to the left side of display as well as moving from the top of display 1126 towards note-moment indicator 1154, but this may be implemented vertically as well. In certain embodiments, notation may also move from the top or bottom of display 1126 towards note-moment indicator 1154.

As described above in FIG. 7A, users may utilize a remote web portal and server to interact with each other using electronic instruments as described herein. For example, users may interact via a web portal to compete or cooperate in games, as well as play music in cooperative or teaching modes. Users may also play an electronic instrument cooperatively with a virtual instrument in a game or song. The various modes of game play and their relationships are shown in the flow chart of FIG. 8A. For example, a user may be able to select the gaming mode at step 1200, either single player mode at step 1202, in which only a single player using a single instrument connects with a gaming system, or multi-player mode at step 1208, in which two or more players connect with a gaming system.

If the user has selected single player mode at step 1202, the user may be able to select a variety of different modes of play from the single player mode. For example, at step 1203, a teaching mode may be selected that allows a user to choose lessons and/or songs to learn. The teaching mode may display a digital tablature to a user, such as the tablature described above, and/or play audio that reflects the tablature displayed. The teaching mode at step 1203 may include one or more tests in which the user plays an electronic instrument in response to displayed tablature; if the user succeeds in playing the notes of the tablature correctly at a given tempo, the user may unlock and gain access to additional lessons, game levels, acquire prizes, tokens, in-game aids, or other items. In some embodiments, the teaching mode at step 1203 may only present tablature for specific passages of a longer song. At step 1204 a game mode may be selected that allows a user to play along with displayed tablature; the more accurately the user plays the displayed tablature with their electronic instrument, the better the user performs in a game that is displayed along with the tablature. In some embodiments, a competition mode may be selected at step 1205, in which the user uses displayed tablature and an electronic instrument to play a co-displayed game against a virtual opponent. An accuracy mode may also be selected at step 1206, which measures and rates the accuracy of a user playing an electronic instrument to match displayed tablature and/or a recording of a song. In some embodiments, the rating of a user's attempt to play a song or passage of a song may be displayed as a tally of points. In some embodiments, a user's score or tally may be ranked with those of other users playing tablature for the same song.

A variety of gaming modes may also be selected once multi-player mode is selected at step 1208. For example, a cooperative team mode may be selected at step 1210. The cooperative game mode allows multiple users to play songs and/or games using their networked electronic instruments in a cooperative manner. At step 1211, a plurality of users may enter an ensemble song mode, in which a chosen song is played with complementary song tablature being displayed for multiple users, allowing them to play a single song as group. Ensemble song mode may allow multiple users to play as duos (two users), trios (three users), quartets (four users), quintets (five users), or even larger ensembles. The tablature for each user may be identical, to allow one user to teach another while playing together, or the may be complementary, such as complementary parts written for multiple users to play as duet, trio, etc. At step 1212, two or more users may enter a computer competition mode, in which the two or more users play the same or complementary tablature together to manipulate a game displayed along with the tablature, and compete against a computerized opponent. At step 1213, a plurality of users may enter cooperative game mode, in which the plurality of users must play together with sufficient congruity to manipulate a puzzle or game that does not require a virtual opponent, such as TETRIS.

At step 1214, two or more users may enter a competitive group mode and choose among several sub-modes that allow for users to compete with one another. For example, at step 1215, two or more users may be able to select a player vs. player mode in which the users compete against one another simultaneously within a game or puzzle. Each user in the player vs. player mode may play their electronic instrument in response to displayed tablature and/or corresponding audio output to manipulate a corresponding character or object displayed in the game, so as to progress the character through the game environment.

At step 1216, multiple users may select a team vs. team mode, in which groups of users compete against one another, with each group playing together to maximize accuracy and therefore their team's tally or score. In some embodiments, users may select a multi-player vs. recording mode at step 1217, in which two or more users play along with a recording and try to maximize their score or tally by trying to maximize their accuracy in matching a recording, with or without a displayed tablature.

In certain embodiments of the multi-player modes selected at step 1208, the users may play their electronic instruments simultaneously or may take turns playing their electronic instruments to accumulate points and/or manipulate tokens or characters on a game display. In embodiments of each of the gaming modes described above, tablature may or may not be displayed along with the game or may be displayed on the same or different monitors. In such instances, the user or plurality of users may need to memorize the tablature for a given song or passage and play along with a visual or auditory cue that indicates a tempo.

Figure 8A:
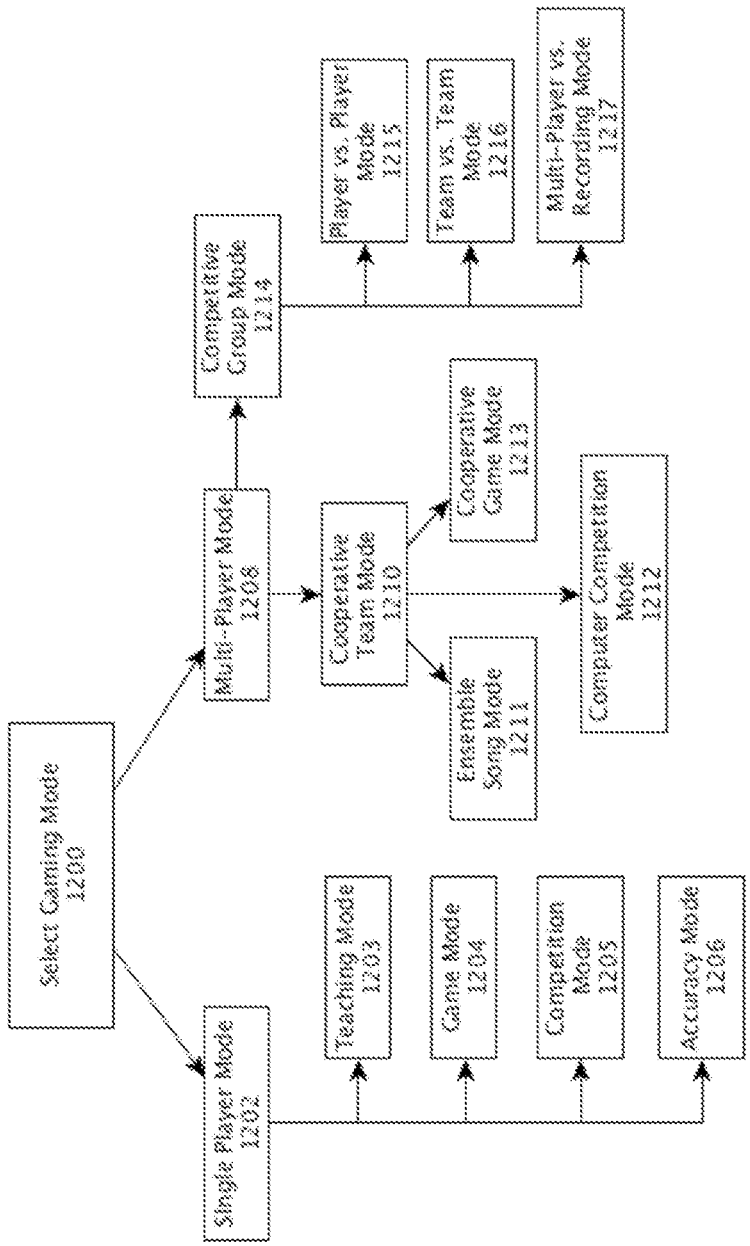
FIG. 8A shows a flow chart of the selection of gaming modes in systems described herein.
Figure 8B:
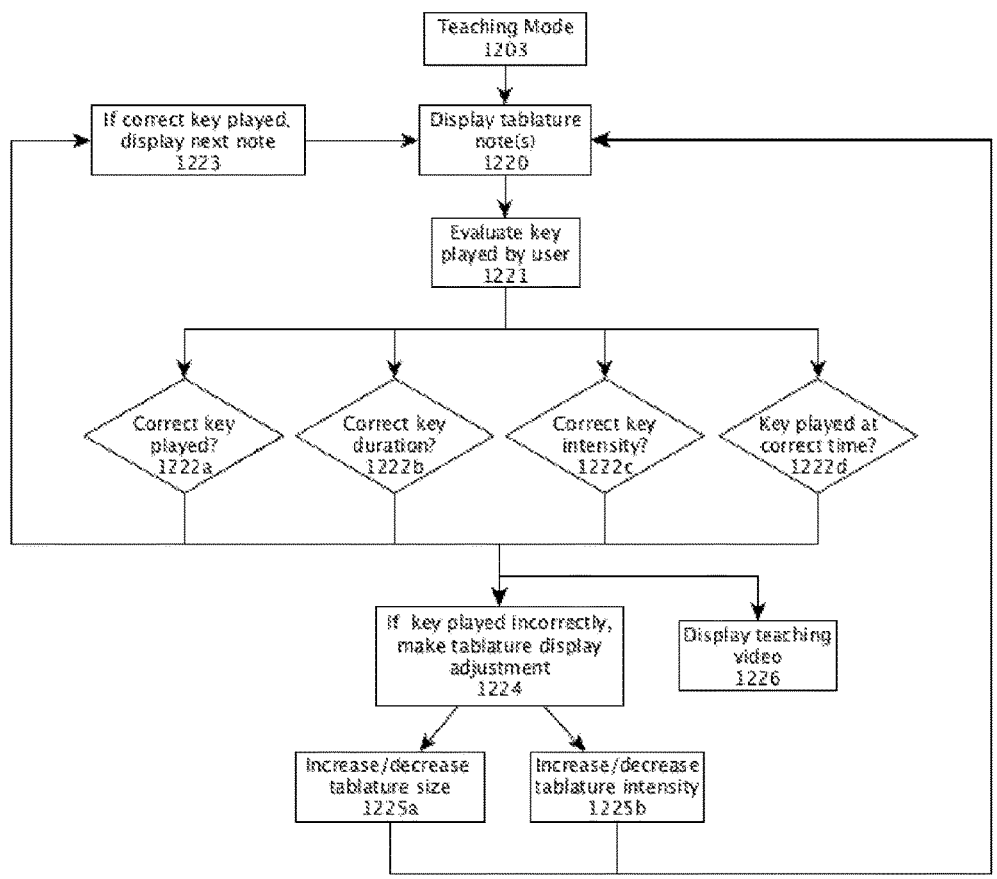
FIG. 8B shows a flow chart of a method using the teaching mode for electronic instrument systems as described herein.

FIG. 8B shows a flow chart for an exemplary method of implementing a teaching mode at step 1203 in FIG. 8A. One or more tablature notes may be displayed to a user at step 1220 (see, e.g. FIGS. 7C-E), prompting the user to activate a corresponding key on the user's electronic instrument. At step 1221, the software evaluates the key played or activated by the user is against a variety of parameters. For example, at step 1222a, the software may evaluate whether the correct key was played; at step 1222b the software may evaluate whether the key was played for the correct duration; at step 1222c the software may evaluate whether the key was played with the correct intensity or force; and at step 1222d the software may evaluate whether the key was played at the correct time. If the software determines at step 1223 that one or more of the played-key characteristics are within predetermined key activation parameters, then the software returns to step 1220 and continues to display tablature notes and/or advance the game play mode. Adjustment of parameters for played-key characteristics may be used to change the difficulty level of a song and/or associated game, to make it more or less difficult in accordance with the individual's success at playing accuracy. For example, narrowing the window of time in which a key needs to be activated concomitantly increases the required accuracy required for key activation by a user.

If the software evaluates the played-key characteristics and determines that one or more of the played-key characteristics are outside predetermined characteristics or parameters, then at step 1224 the software may make a tablature display adjustment to indicate to the user that the note was incorrect, and/or modify is display characteristics thereby making playing easier. For example, at step 1225a the software may increase or decrease the tablature size. At step 1225b the software may increase or decrease the tablature display speed and/or intensity. Other aspects of the displayed tablature may also be changed as described above, such as a screen flash, color change, an added indicator proximate the incorrect tablature note (such as an arrow or brackets). The software may then return to step 1220 and continue to display tablature notes. In some embodiments, the tablature display may be adjusted for all tablature notes displayed after the software determines that a note (or notes) was played incorrectly in reference to the tablature. For example, the tablature may remain changed in size, the intensity of the tablature may remain changed, and/or the color of the notes or background behind the tablature may remain changed as the tablature is displayed. In certain embodiments, the software may also change the displayed tablature and/or background in response to correct keys being played, e.g. changing the tablature size, intensity, and/or color.

If the software determines that enough played-key characteristics are outside predetermined parameters, at step 1226 the tablature display may be paused or ended, and a teaching video may be displayed to the user. In some embodiments, display of a teaching video at step 1226 may be activated when a predetermined number of keys are activated incorrectly in relation to the displayed tablature (e.g. 2, 3, 4, 5, 6, 7, 8, 9, 10 or more incorrectly activated keys).

Figure 8C:
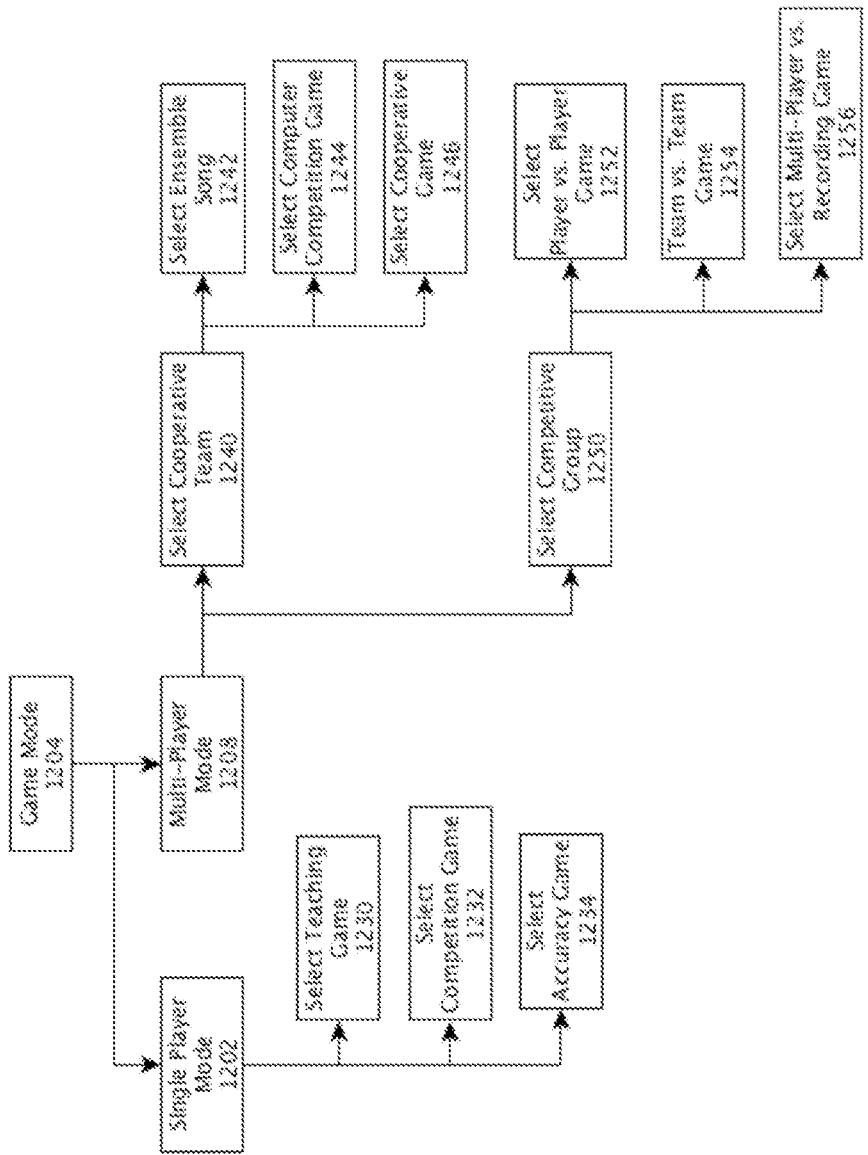
FIG. 8C shows a flow chart of a method using the game mode for electronic instrument systems as described herein.

FIG. 8C shows a flow chart of exemplary steps while in game mode at step 1204 of FIG. 8A. While in game mode at step 1204, a user may enter single player mode at step 1202, or multi-player mode at step 1208. In some embodiments, a selected game may only have a single player mode or only have a multi-player mode. While in single player mode, a user may select a teaching game at step 1230, in which tablature is displayed and/or corresponding audio is output which reflects the displayed tablature. The teaching game permits a user to begin learning to play songs and/or song passages at slower tempos. Completion of tasks within the teaching game (such as on the basis of accurate playing) may allow the user to access additional lessons, games, tokens, prizes, or other items.

A user in single player mode may select a competition game at step 1232, in which a user plays an electronic instrument in response to displayed tablature in order to move characters or items in a game displayed along with the tablature. At step 1234, a user in single player mode may select an accuracy game, which measures and rates the accuracy of a user playing an electronic instrument to match displayed tablature. In some embodiments, the rating of a user's attempt to play a song or passage of a song may be displayed as a tally of points. In some embodiments, a user's score or tally may be ranked with those of other users playing tablature for the same song.

If a user has selected multi-player mode at step 1208, they may then select a cooperative team at step 1240, or a competitive group at step 1250. In some embodiments, a user may be able to view a listing of available multi-player games that need additional players in order to begin. In certain embodiments, a user can invite other users to a cooperative game. A user participating with a cooperative team at step 1240 may be able to select an ensemble song at step 1242, allowing two or more users to play a single song together, increasing the cooperative team's score or tally by playing the song accurately. Ensemble mode may allow multiple users to play as duos (two users), trios (three users), quartets (four users), quintets (five users), or even larger ensembles. At step 1244, a user may select a computer competition game, in which a group of users compete in a game against a computer opponent by playing identical or ensemble tablature for a song as accurately as possible. At step 1246, a user may select a cooperative game or puzzle in which each user plays identical or ensemble tablature to manipulate a puzzle or game that does not require a virtual opponent, such as TETRIS.

If a user selects a competitive group at step 1250, a user may select a player vs. player game at step 1252. In a player vs. player game, two or more users may play their electronic instrument in response to displayed tablature and/or corresponding audio output to manipulate a corresponding character or object displayed in the game. Users may also select a team vs. team game at step 1254, in which two or more teams of users compete within the game by accurately playing tablature displayed in the game along with the gaming display. Users within a given team cooperate with each other to beat another team. The song tablature displayed may be identical for players within a team, or across all participating teams. In certain embodiments, ensemble tablature may be assigned or chosen by users when playing the team vs. team game. At step 1256, users may select a multi-player vs. recording game, in which two or more users play along with a recording and try to maximize their score or tally by trying to maximize their accuracy in matching a recording, with or without a displayed tablature.

Figure 8D:
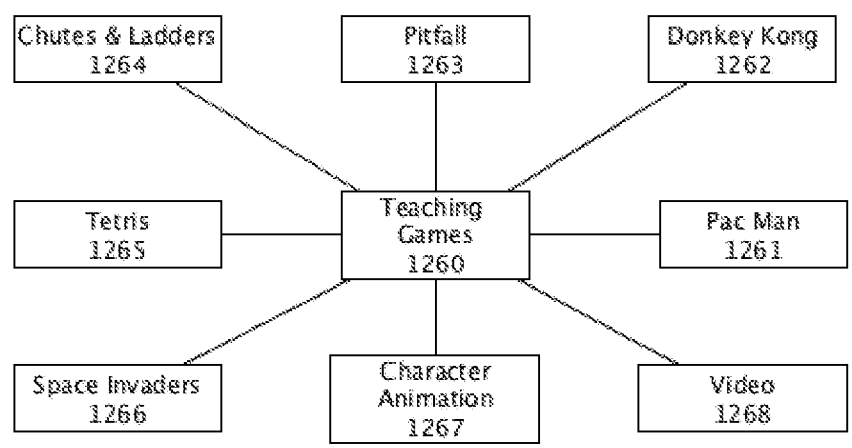
FIG. 8D shows a schematic diagram of the types of teaching games that may be selected by a user of electronic instrument systems described herein.

FIG. 8D shows a schematic diagram of exemplary teaching games 1260. Teaching games 1260 may be displayed along with song tablature, and may include items or avatars that successfully navigate obstacles or opponent characters with sufficiently accurate playing of an electronic instrument to correspond with the displayed song tablature. Teaching games 1260 may include games such as PACMAN 1261, in which a user's character or avatar moves around a maze eating dots while avoiding non-user characters that attack the user's character. Increased playing accuracy by a user may be interpreted by the game as movement to eat the objects and avoidance of the non-user characters. Another exemplary game is DONKEY KONG 1262, in which a user's avatar avoids objects falling down a series of ramps in order to reach the top of the screen. PITFALL 1263 is another obstacle-avoidance game that may be used as a teaching game. In PITFALL 1263, a user's avatar jumps and swings over obstacles and opens doors and chests to find treasure. CHUTES AND LADDERS 1264 is yet another game that may be utilized as a teaching game. Increased playing accuracy may lead a user's avatar to climb up successive levels to the top of the display, while decreased playing accuracy by a user may allow the user's avatar to fall down chutes or slides. TETRIS 1265 is a tile-matching game in which groups of four blocks in different configurations move from the top to the bottom of a display and must be matched to form at least one solid block. Increased playing accuracy by a user may increase the effective matching of falling blocks while decreased playing accuracy may decrease the effective matching of the falling blocks. SPACE INVADERS 1266 is still another game that may be used as a teaching game. In SPACE INVADERS 1266, a user's avatar shoots groups of non-user characters in order to acquire points and advance to further levels. Game play of SPACE INVADERS 1266 may allow increased movement and more accurate shooting of non-player characters with increased playing accuracy, as well as decreased movement and less accurate shooting of non-player characters with decreased playing accuracy. Other suitable game modes may include CANDY CRUSH, WORLD OF WARCRAFT, POKEMON GO, and the like, where advancement through the game is conditioned upon the accuracy of playing. In some embodiments, teaching game 1260 may be a character or scene animation 1267 that is displayed as playing accuracy increases. In certain embodiments, a video 1268 may be displayed when a user's playing accuracy rises above a certain threshold level. In some embodiments, the complexity of an abstract design 1269 may increase with increased playing accuracy by a user, and decrease with decreased playing accuracy of a user.

Figure 8E:
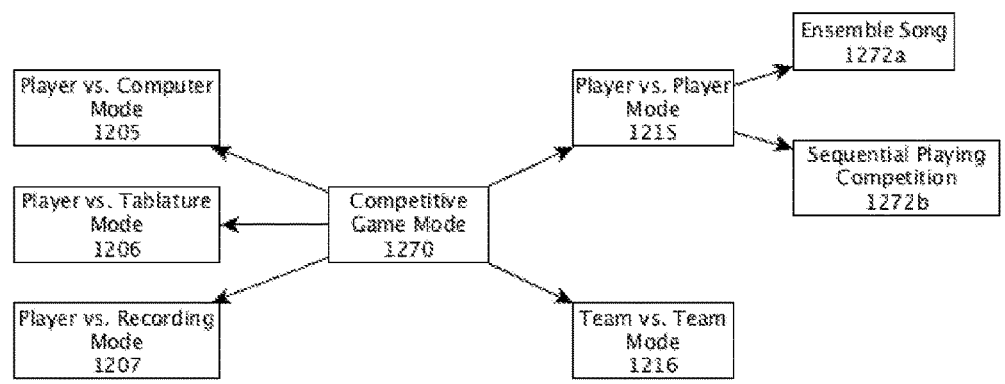
FIG. 8E shows a flow chart of an exemplary method for selecting types of competition games for electronic instrument systems as described herein.

In various embodiments of the systems described herein, competitive games between multiple users or between a user and a computer may be accessed via a cloud network. FIG. 8E shows a flow chart of an exemplary method for a user to select competitive games using systems described herein. A competitive game mode may be selected at step 1270, allowing the user to further select from several gaming options. At step 1205, a user may select a player vs. computer mode, in which the user plays an electronic instrument in response to displayed tablature to accumulate points and/or move avatars and objects on a co-displayed game screen, while competing against a computer-generated opponent. At step 1206, a user may select a player vs. tablature mode, in which the user activates the keys of an electronic instrument in response to displayed tablature while trying to maximize the accuracy of the notes being played. L. In some embodiments of a player vs. tablature mode, the speed or rate at which the tablature is displayed may increase as the user advances to higher levels. In certain embodiments, of player vs. tablature mode, the difficulty of the song may increase as the user advances to higher levels. At step 1207, a user may choose a player vs. recording mode, in which the user tries to play along with a recording of a previously memorized song. A user in player vs. recording mode may acquire points with increased accuracy of playing along with the recording, or the user may lose or fail to gain additional points for decreased accuracy of playing along with the recording.

At step 1215, a user may enter a player vs. player mode, in which two or more users may compete against each other by playing their electronic instruments or devices. For example, at step 1272*a*, two or more users may select an ensemble song (such as a song with multiple parts, or even the same song) to play together while trying to maximize playing accuracy in relation to displayed tablature. At step 1272*b*, two or more users may compete against one another by one user playing a song for accuracy with displayed tablature, and then the other user playing a song for accuracy with displayed tablature. The songs played by each user may be transmitted to the non-playing user as key activation data (e.g. MIDI data) or a sound file. In some embodiments, the non-playing user may also see the playing user's tablature as it streams, a representation of keys being activated by the playing user, and changes in the playing user's tally or score. The songs played by the two or more users may be the same song or different songs, and may have the same or different difficulty levels. In addition to player vs. player, at step 1216, a user may select a team vs. team mode, in which groups of users play together as a team and compete against other teams. The songs played by each team may be a song having a single part that is played in unison, or it may be an ensemble song having different parts.

Figure 9A:
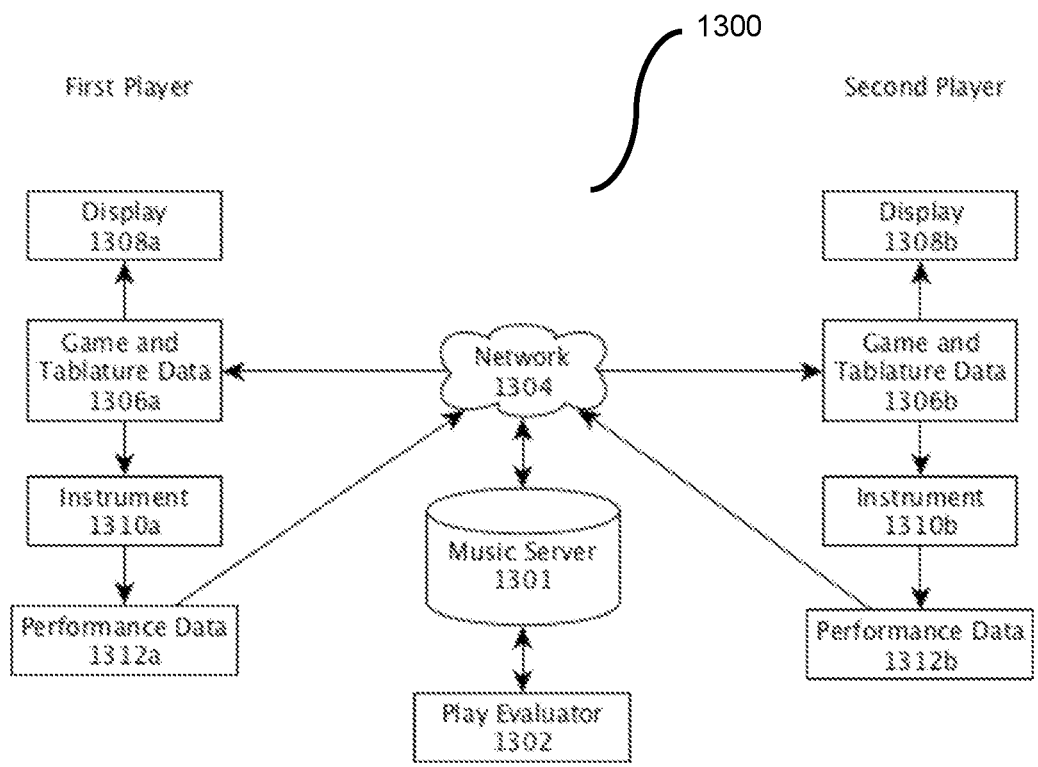
FIG. 9A shows a schematic diagram of electronic instruments controlled by a first player and a second player, the electronic instruments interacting with a music server via a network.

FIG. 9A shows a schematic diagram of a music gaming system 1300, the system including a music server 1301 that communicates with instruments 1310*a* (controlled by a first player) and 1310*b* (controlled by a second player). Music server 1301 provides game and tablature data 1306*a* and 1306*b* to the respective first and second players via network 1304. The game and tablature data may be provided directly to instruments 1310*a* and 1310*b*, or via a separate computing device such as a tablet or laptop computer. In some embodiments, the game and tablature data 1306*a/b* may pass through instruments 1310*a* and 1310*b* to a separate computing device (e.g. tablet or laptop computer). The game and tablature data 1306*a* and 1306*b* may be provided to displays 1308*a* and 1308*b* of the first and second players, allowing the first and second players to see and react to the tablature and/or game. The game and tablature data 1306*a* and 1306*b* may also be provided to instruments 1310*a* and 1310*b*, thereby activating, e.g., lighting, and/or mechanical feedback mechanisms on instruments 1310*a/b*. As the first and second players activate keys on their respective instruments 1310*a/b*, performance data corresponding to the instrument key activation is communicated back to music server 1301 via network 1304. In some embodiments, the performance data 1312*a/b* may communicate indirectly with music server 1301 via a separate computing device. Music server 1301 may then communicate performance data 1312*a/b* with a play evaluator 1302 (such as an application either executed by music server 1301 or another server or computing device). The play evaluator 1302 then evaluates performance data 1312*a/b* against tablature data 1306*a/b*, allocates points to each player based on playing accuracy, and then modifies the game play and/or a displayed tally for the first and second player via network 1304 to displays 1308*a/b*.

Figure 9B:
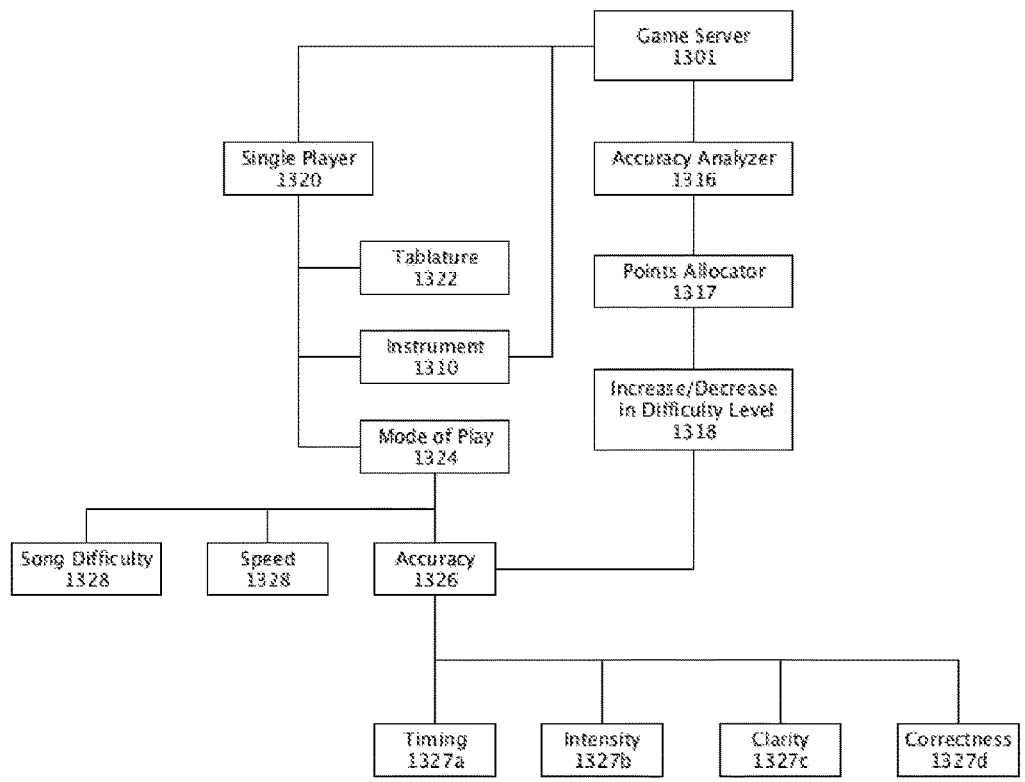
FIG. 9B shows a schematic diagram of a system for playing games, having a single player connected to a game server.

FIG. 9B shows a schematic diagram of an exemplary instance of single player 1320 interacting with a game server 1301. Game server 1301 provides single player 1320 with tablature 1322, for example to a computing device with a display (not shown). Single player 1320 activates keys on the instrument 1310 that correspond with tablature 1322, and send activation data regarding the accuracy 1326 of single player 1320. Accuracy data regarding the timing 1327a of keys activated (either in relation to each other and/or in relation to a metronomic timing signal), the intensity 1327b or force exerted on activated keys, the clarity 1327c of keys activated on instrument 1310 (e.g. the combination of intensity 1327b and timing 1327a), and/or the correctness 1327d of the keys activated may be communicated back to game server 1301. Accuracy 1326 is communicated back to game server 1301 and analyzed by accuracy analyzer 1316 (e.g. an application or set of machine-readable instructions on game server 1301).

Points are allocated by points allocator 1317 (e.g. an application or set of machine-readable instructions on game server 1301) to a tally based on the results from accuracy analyzer 1316. The number of points allocated may vary based on speed 1328 selected by single player 1320 in mode of play 1324, as well as song difficulty 1330. For example, single player 1320 playing a song with higher song difficulty 1330 and/or speed 1328 may be allocated as many or more points than if single player 1320 were to play a song with lower song difficulty and/or at a slower speed 1328. In some embodiments, game server 1301 may increase or decrease the difficulty level 1318 of the tablature being streamed to single player 1320 based on corresponding increases or decreases in accuracy detected by accuracy analyzer 1316 and/or points allocated by points allocator 1317. In some embodiments, the difficulty of songs and tablature may be changed by reducing or adding notes to the song, without changing the basic melody and/or harmony of the song. By increasing song difficulty without using a completely different song, a user may be able to increase his or her playing skills, such as by adding embellishments and flourishes, without having to learn or read completely different songs.

Figure 9C:
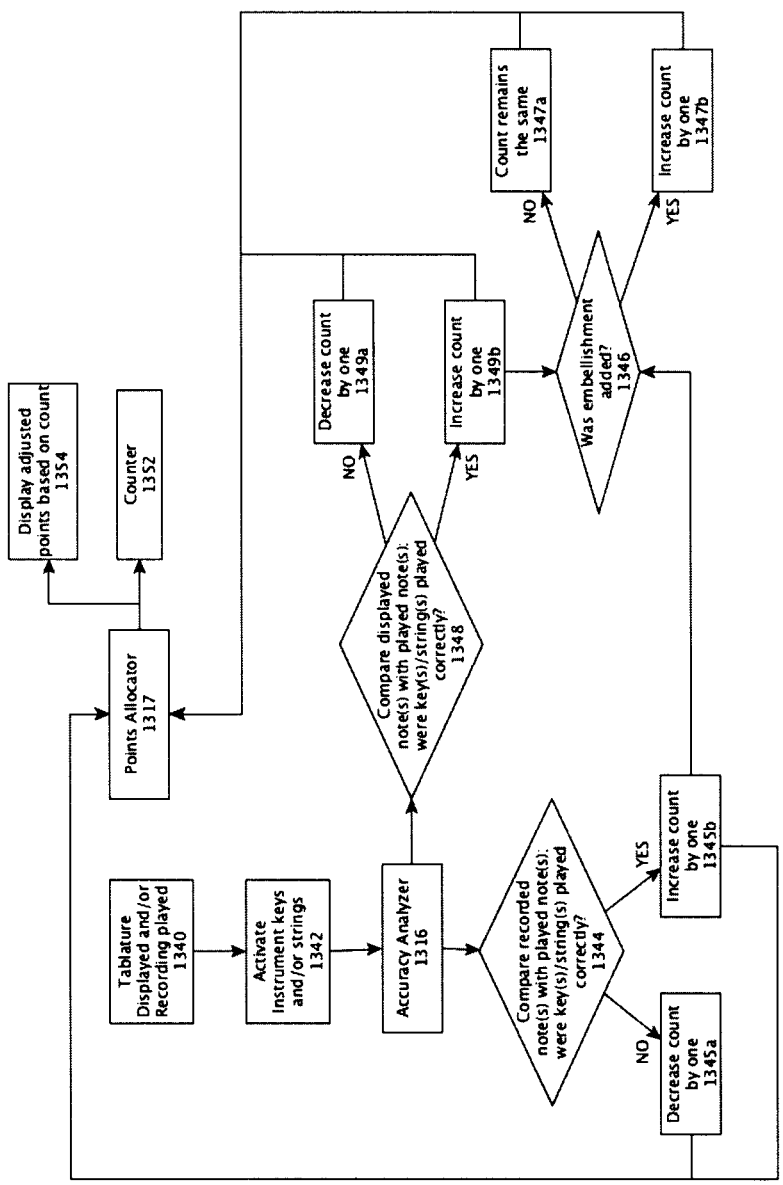
FIG. 9C shows a flow chart for a method of allocating points to a player's score for gaming systems as described herein.

FIG. 9C shows a flow chart illustrating exemplary interactions of the points allocator 1317 and accuracy analyzer 1316 of FIG. 9B. Tablature is displayed and/or a recording is played at step 1340, such as on a user's tablet or laptop computer. A user (e.g. single player 1320) then interprets the displayed tablature and activates instrument keys and/or strings at step 1342. Data from the key and/or string activation is communicated to accuracy analyzer 1316. At step 1344, accuracy analyzer 1316 may compare the displayed note(s) (from the tablature) with the played note(s) and determine whether the key(s) and/or string(s) were played correctly. If the note or notes were not played correctly, i.e. played outside predetermined parameters, then at step 1345a the accuracy analyzer 1316 may communicate with points allocator 1317 to decrease the count in counter 1352 by one. In some embodiments, the count may not be changed at step 1345a, instead of decreasing the count. In certain embodiments, the count may be reduced by more than one at step 1345a, to reflect the reduced level of accuracy of the user. If the key(s) and/or string(s) are determined to have been played correctly, then at step 1345b the accuracy analyzer 1316 may communicate with points allocator 1317 to increase the count in counter 1352 by one. In various embodiments, at step 1345b the count may be increased by more than one, to reflect the high level of accuracy of the user.

In some instances, recorded music may be played to a user instead of, or along with, displayed tablature. In such instances, at step 1348 accuracy analyzer 1316 may compare the record note(s) with played note(s) to determine if the key(s) and/or string(s) of the user's musical instrument were played correctly, such as in accordance with the composed song. If the key(s) and/or string(s) were not played correctly, then at step 1349a the accuracy analyzer 1316 may communicate with points allocator 1317 to decrease the count by one. In some embodiments, the count may not be changed at step 1349a, instead of decreasing the count. In some embodiments, the count may be reduced by more than one, to reflect the reduced level of accuracy of the user. If the key(s) and/or string(s) were played correctly, then at step 1349b the accuracy analyzer 1316 may communicate with points allocator 1317 to increase the count by one. In certain embodiments, the count may be increased by more than one, to reflect the high level of accuracy of the user.

In some embodiments, the accuracy analyzer may also determine if a musical embellishment was added at step 1346, whether analyzing played notes against tablature or a recording. Embellishment or ornamentation refers to notated or improvised musical flourishes around a given note or group of notes, such as a trill, mordent, turn, appoggiatura, acciaccatura, glissando, schleifer, bends, ghost note, or other ornamentation. If the accuracy analyzer determines that embellishment was not added, then at step 1349a, no count is added to counter 1352. If the accuracy analyzer does determine that an embellishment was added, then the count may be increased by one at step 1347b. In some embodiments, the count may be increased by more than one at step 1347b.

Points allocator 1317 receives communications from accuracy analyzer 1316 and adjust points accordingly in counter 1352, as described above. As counter 1352 is modified to reflect increases and decreases in user playing accuracy, the server (not shown) may communicate with a computing device or the instrument of the user to display adjusted points total based on the count at step 1354.

Some or all of the steps and operations associated with the techniques or methods introduced here may be performed by hardware components or may be embodied in non-transitory machine-executable instructions that cause one or more general purpose or special purpose computer processors programmed with the instructions to perform the steps. The machine-executable instructions may be stored on a computer-readable or machine-readable medium. The steps may be performed by a combination of hardware, software, and/or firmware. In some cases the machine-executable instructions may be downloaded from a server, from a website, and/or from an application store or an app store.

While this disclosure contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Although embodiments of various methods, apparatuses, devices, and systems are described herein in detail with reference to certain versions, it should be appreciated that other versions, methods of use, embodiments, and combinations thereof are also possible. Therefore the spirit and scope of the appended claims should not be limited to the description of the embodiments contained herein.

The phrases "in some embodiments," "according to some embodiments," "in the embodiments shown," "in other embodiments," "in some examples," "in some cases," "in some situations," "in some configurations," "in another configuration," and the like, generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

The term "about" is used herein to refer to +/−10% of a given measurement, range, or dimension unless otherwise indicated.

The invention claimed is:

1. A musical system for the teaching and playing of music, the musical system comprising:
   a first instrument configured for being played by a first user, the instrument having:
      musical componentry that produces musical note sounds in response to an activating event;
      a keyboard having a plurality of keys to produce the activating event that in turn activates the musical componentry to produce the musical note sounds;
      a communications module comprising a transmitter for communicating the musical note sounds to a remote server via a network; and
      a housing, for encasing the musical componentry and the keyboard having the plurality of keys, the housing having a plurality of indicator elements positioned adjacent the housing and proximate the keys of the keyboard for being activated to indicate which key of the keyboard is to be played at any given time when playing a musical composition;
   a display, communicably coupled to the first instrument, that displays a digital representation of tablature comprising a displayed note to be played prior to the activating event;
   an electronic controller, communicably coupled to the first instrument and the display, and configured for corresponding the activation of the indicating element with the display of the musical note, and
   a remote server connected to the network and accessible through a cloud based interface, the server comprising a processor configured for receiving the musical note sounds of the keyboard, and for evaluating accuracies of the playing of the keyboard of the first user.

2. The musical system according to claim 1, wherein the communications module is configured for transmitting to the remote server one or more non-musical note sound characteristics resulting from playing of a musical composition on the first instrument by a first user.

3. The musical system according to claim 2, wherein the system further comprises a second instrument, the second instrument having:
   musical componentry that produces musical note sounds in response to an activating event;
   a keyboard having a plurality of keys to produce the activating event that activates the musical componentry so as to produce the musical note sounds;
   a communications module configured for transmitting to the remote server one or more characteristics resulting from playing of the musical composition on the second instrument by a second user; and
   a housing, for encasing the electronic musical componentry, and including the keyboard having the plurality of keys, the housing having a plurality of indicator elements positioned adjacent the housing and proximate the keys of the keyboard for being activated and thereby indicating which key of the keyboard is to be played at any given time when playing a musical composition, wherein the processor of the remote server is further configured for receiving the musical note sounds of the keyboard, and for evaluating accuracies of the playing of the keyboard of the second user, and for comparing the evaluation of the first user with the evaluation of the second user.

4. The musical system according to claim 3, wherein the display is accessible by both the first and second instruments.

5. The musical system according to claim 4, wherein the system comprises a digital representation of a game environment comprising avatars of the first and second users, wherein the avatars interact in a manner that is based on the accuracy of the playing of the first and second instruments by respective first and second users.

* * * * *